(12) United States Patent
Vandike et al.

(10) Patent No.: US 12,520,759 B2
(45) Date of Patent: *Jan. 13, 2026

(54) SYSTEMS AND METHODS FOR PREDICTING MATERIAL DYNAMICS

(71) Applicant: Deere & Company, Moline, IL (US)

(72) Inventors: Nathan R. Vandike, Geneseo, IL (US); Bhanu Kiran Reddy Palla, Bettendorf, IA (US)

(73) Assignee: Deere & Company, Moline, IL (US)

( * ) Notice: Subject to any disclaimer, the term of this patent is extended or adjusted under 35 U.S.C. 154(b) by 518 days.

This patent is subject to a terminal disclaimer.

(21) Appl. No.: 17/585,186

(22) Filed: Jan. 26, 2022

(65) Prior Publication Data
US 2023/0232739 A1    Jul. 27, 2023

(51) Int. Cl.
*A01D 41/127*    (2006.01)
*G05B 13/04*    (2006.01)
*G05B 17/02*    (2006.01)

(52) U.S. Cl.
CPC ..... *A01D 41/1273* (2013.01); *A01D 41/1275* (2013.01); *A01D 41/1277* (2013.01); *G05B 13/048* (2013.01); *G05B 17/02* (2013.01)

(58) Field of Classification Search
CPC ............ A01D 41/1273; A01D 41/1275; A01D 41/1277; A01D 41/127; A01D 75/182; A01D 43/085; A01D 75/00; G05B 13/048; G05B 17/02; A01B 79/005; G05D 1/0088; H04W 4/38
See application file for complete search history.

(56) References Cited

U.S. PATENT DOCUMENTS

| | | | |
|---|---|---|---|
| 3,568,157 A | 3/1971 | Downing et al. | |
| 3,580,257 A | 5/1971 | Teague | |
| 3,599,543 A | 8/1971 | Kerridge | |
| 3,775,019 A | 11/1973 | Konig et al. | |

(Continued)

FOREIGN PATENT DOCUMENTS

| | | |
|---|---|---|
| AR | 108898 A1 | 10/2018 |
| AU | 20100224431 A1 | 4/2011 |

(Continued)

OTHER PUBLICATIONS

Extended European Search Report and Written Opinion issued in European Patent Application No. 20208171.7, dated May 11, 2021, in 05 pages.

(Continued)

*Primary Examiner* — Eric J Yoon
(74) *Attorney, Agent, or Firm* — Kelly, Holt & Christenson; Joseph R. Kelly

(57) ABSTRACT

A first in-situ sensor detects a characteristic value as a mobile machine operates at a worksite. A second in-situ sensor detects a material dynamics characteristic value as the mobile machine operates at the worksite. A predictive model generator generates a predictive model that models a relationship between the characteristic and the materials dynamics characteristic based on the characteristic value detected by the first in-situ sensor and the material dynamics characteristic value detected by the second in-situ sensor. The predictive model can be output and used in automated machine control.

13 Claims, 22 Drawing Sheets

(56) References Cited

U.S. PATENT DOCUMENTS

| | | |
|---|---|---|
| 3,856,754 A | 12/1974 | Habermeier et al. |
| 4,129,573 A | 12/1978 | Bellus et al. |
| 4,166,735 A | 9/1979 | Pilgram et al. |
| 4,183,742 A | 1/1980 | Sasse et al. |
| 4,268,679 A | 5/1981 | Lavanish |
| 4,349,377 A | 9/1982 | Durr et al. |
| 4,360,677 A | 11/1982 | Doweyko et al. |
| 4,435,203 A | 3/1984 | Funaki et al. |
| 4,493,726 A | 1/1985 | Burdeska et al. |
| 4,527,241 A | 7/1985 | Sheehan et al. |
| 4,566,901 A | 1/1986 | Martin et al. |
| 4,584,013 A | 4/1986 | Brunner |
| 4,687,505 A | 8/1987 | Sylling et al. |
| 4,857,101 A | 8/1989 | Musco et al. |
| 4,911,751 A | 3/1990 | Nyffeler et al. |
| 5,059,154 A | 10/1991 | Reyenga |
| 5,089,043 A | 2/1992 | Hayase et al. |
| 5,246,164 A | 9/1993 | McCann et al. |
| 5,246,915 A | 9/1993 | Lutz et al. |
| 5,250,690 A | 10/1993 | Turner et al. |
| 5,296,702 A | 3/1994 | Beck et al. |
| 5,300,477 A | 4/1994 | Tice |
| 5,416,061 A | 5/1995 | Hewett et al. |
| 5,477,459 A | 12/1995 | Clegg et al. |
| 5,488,817 A | 2/1996 | Paquet et al. |
| 5,529,537 A | 6/1996 | Johnson |
| 5,563,112 A | 10/1996 | Barnes, III |
| 5,585,626 A | 12/1996 | Beck et al. |
| 5,586,033 A | 12/1996 | Hall |
| 5,592,606 A | 1/1997 | Myers |
| 5,606,821 A | 3/1997 | Sadjadi et al. |
| 5,666,793 A | 9/1997 | Bottinger |
| 5,712,782 A | 1/1998 | Weigelt et al. |
| 5,721,679 A | 2/1998 | Monson |
| 5,767,373 A | 6/1998 | Ward et al. |
| 5,771,169 A | 6/1998 | Wendte |
| 5,789,741 A | 8/1998 | Kinter et al. |
| 5,809,440 A | 9/1998 | Beck et al. |
| 5,841,282 A | 11/1998 | Christy et al. |
| 5,849,665 A | 12/1998 | Gut et al. |
| 5,878,821 A | 3/1999 | Flenker et al. |
| 5,899,950 A | 5/1999 | Milender et al. |
| 5,902,343 A | 5/1999 | Hale et al. |
| 5,915,492 A | 6/1999 | Yates et al. |
| 5,957,304 A | 9/1999 | Dawson |
| 5,974,348 A | 10/1999 | Rocks |
| 5,978,723 A | 11/1999 | Hale et al. |
| 5,991,687 A | 11/1999 | Hale et al. |
| 5,991,694 A | 11/1999 | Gudat et al. |
| 5,995,859 A | 11/1999 | Takahashi |
| 5,995,894 A | 11/1999 | Wendte |
| 5,995,895 A | 11/1999 | Watt et al. |
| 6,004,076 A | 12/1999 | Cook et al. |
| 6,016,713 A | 1/2000 | Hale |
| 6,029,106 A | 2/2000 | Hale et al. |
| 6,037,901 A | 3/2000 | Devier et al. |
| 6,041,582 A | 3/2000 | Tiede et al. |
| 6,073,070 A | 6/2000 | Diekhans |
| 6,073,428 A | 6/2000 | Diekhans |
| 6,085,135 A | 7/2000 | Steckel |
| 6,119,442 A | 9/2000 | Hale et al. |
| 6,119,531 A | 9/2000 | Wendte et al. |
| 6,128,574 A | 10/2000 | Diekhans |
| 6,141,614 A | 10/2000 | Janzen et al. |
| 6,178,253 B1 | 1/2001 | Hendrickson et al. |
| 6,185,990 B1 | 2/2001 | Missotten et al. |
| 6,188,942 B1 | 2/2001 | Corcoran et al. |
| 6,199,000 B1 | 3/2001 | Keller et al. |
| 6,204,856 B1 | 3/2001 | Wood et al. |
| 6,205,381 B1 | 3/2001 | Motz et al. |
| 6,205,384 B1 | 3/2001 | DeFrance |
| 6,216,071 B1 | 4/2001 | Motz |
| 6,236,924 B1 | 5/2001 | Motz et al. |
| 6,272,819 B1 | 8/2001 | Wendte et al. |
| 6,327,569 B1 | 12/2001 | Reep |
| 6,360,179 B1 | 3/2002 | Reep |
| 6,374,173 B1 | 4/2002 | Ehlbeck |
| 6,380,745 B1 | 4/2002 | Anderson |
| 6,431,790 B1 | 8/2002 | Anderegg et al. |
| 6,451,733 B1 | 9/2002 | Pidskalny et al. |
| 6,505,146 B1 | 1/2003 | Blackmer |
| 6,505,998 B1 | 1/2003 | Bullivant |
| 6,539,102 B1 | 3/2003 | Anderson et al. |
| 6,549,849 B2 | 4/2003 | Lange et al. |
| 6,584,390 B2 | 6/2003 | Beck |
| 6,587,772 B2 | 7/2003 | Behnke |
| 6,591,145 B1 | 7/2003 | Hoskinson et al. |
| 6,591,591 B2 | 7/2003 | Coers et al. |
| 6,592,453 B2 | 7/2003 | Coers et al. |
| 6,604,432 B1 | 8/2003 | Hamblen et al. |
| 6,681,551 B1 | 1/2004 | Sheidler et al. |
| 6,682,416 B2 | 1/2004 | Behnke et al. |
| 6,687,616 B1 | 2/2004 | Peterson et al. |
| 6,729,189 B2 | 5/2004 | Paakkinen |
| 6,735,568 B1 | 5/2004 | Buckwalter et al. |
| 6,834,550 B2 | 12/2004 | Upadhyaya et al. |
| 6,838,564 B2 | 1/2005 | Edmunds et al. |
| 6,846,128 B2 | 1/2005 | Sick |
| 6,932,554 B2 | 8/2005 | Isfort et al. |
| 6,999,877 B1 | 2/2006 | Dyer et al. |
| 7,073,374 B2 | 7/2006 | Berkman |
| 7,155,888 B2 | 1/2007 | Diekhans |
| 7,167,797 B2 | 1/2007 | Faivre et al. |
| 7,167,800 B2 | 1/2007 | Faivre et al. |
| 7,191,062 B2 | 3/2007 | Chi et al. |
| 7,194,965 B2 | 3/2007 | Hickey et al. |
| 7,211,994 B1 | 5/2007 | Mergen et al. |
| 7,248,968 B2 | 7/2007 | Reid |
| 7,255,016 B2 | 8/2007 | Burton |
| 7,261,632 B2 | 8/2007 | Pirro et al. |
| 7,302,837 B2 | 12/2007 | Wendt |
| 7,308,326 B2 | 12/2007 | Maertens et al. |
| 7,313,478 B1 | 12/2007 | Anderson et al. |
| 7,318,010 B2 | 1/2008 | Anderson |
| 7,347,168 B2 | 3/2008 | Reckels et al. |
| 7,408,145 B2 | 8/2008 | Holland |
| 7,458,428 B2 | 12/2008 | Laudick et al. |
| 7,480,564 B2 | 1/2009 | Metzler et al. |
| 7,483,791 B2 | 1/2009 | Anderegg et al. |
| 7,537,519 B2 | 5/2009 | Huster et al. |
| 7,555,283 B2 | 6/2009 | Fitzner et al. |
| 7,557,066 B2 | 7/2009 | Hills et al. |
| 7,562,167 B2 | 7/2009 | Anderson |
| 7,628,059 B1 | 12/2009 | Scherbring |
| 7,665,285 B1 | 2/2010 | Harada et al. |
| 7,687,435 B2 | 3/2010 | Witschel et al. |
| 7,703,036 B2 | 4/2010 | Satterfield et al. |
| 7,725,233 B2 | 5/2010 | Hendrickson et al. |
| 7,733,416 B2 | 6/2010 | Gal |
| 7,756,624 B2 | 7/2010 | Diekhans et al. |
| 7,798,894 B2 | 9/2010 | Isfort |
| 7,827,042 B2 | 11/2010 | Jung et al. |
| 7,832,126 B2 | 11/2010 | Koellner et al. |
| 7,915,200 B2 | 3/2011 | Epp et al. |
| 7,945,364 B2 | 5/2011 | Schricker et al. |
| 7,993,188 B2 | 8/2011 | Ritter |
| 8,024,074 B2 | 9/2011 | Stelford |
| 8,060,283 B2 | 11/2011 | Mott et al. |
| 8,107,681 B2 | 1/2012 | Gaal |
| 8,145,393 B2 | 3/2012 | Foster et al. |
| 8,147,176 B2 | 4/2012 | Coers et al. |
| 8,152,610 B2 | 4/2012 | Harrington |
| 8,170,756 B2 | 5/2012 | Morey et al. |
| 8,190,335 B2 | 5/2012 | Vik et al. |
| 8,195,342 B2 | 6/2012 | Anderson |
| 8,195,358 B2 | 6/2012 | Anderson |
| 8,213,964 B2 | 7/2012 | Fitzner et al. |
| 8,224,500 B2 | 7/2012 | Anderson |
| 8,229,631 B2 | 7/2012 | Morey et al. |
| 8,252,723 B2 | 8/2012 | Jakobi et al. |
| 8,254,351 B2 | 8/2012 | Fitzner et al. |
| 8,280,595 B2 | 10/2012 | Foster et al. |
| 8,321,365 B2 | 11/2012 | Anderson |
| 8,329,717 B2 | 12/2012 | Minn et al. |

(56) References Cited

U.S. PATENT DOCUMENTS

| | | |
|---|---|---|
| 8,332,105 B2 | 12/2012 | Laux |
| 8,338,332 B1 | 12/2012 | Hacker et al. |
| 8,340,862 B2 | 12/2012 | Baumgarten et al. |
| 8,407,157 B2 | 3/2013 | Anderson et al. |
| 8,428,829 B2 | 4/2013 | Brunnert et al. |
| 8,437,901 B2 | 5/2013 | Anderson |
| 8,478,493 B2 | 7/2013 | Anderson |
| 8,488,865 B2 | 7/2013 | Hausmann et al. |
| 8,494,727 B2 | 7/2013 | Green et al. |
| 8,527,157 B2 | 9/2013 | Imhof et al. |
| 8,544,397 B2 | 10/2013 | Bassett |
| 8,577,561 B2 | 11/2013 | Green et al. |
| 8,606,454 B2 | 12/2013 | Wang et al. |
| 8,626,406 B2 | 1/2014 | Schleicher et al. |
| 8,635,903 B2 | 1/2014 | Oetken et al. |
| 8,639,408 B2 | 1/2014 | Anderson |
| 8,649,940 B2 | 2/2014 | Bonefas |
| 8,656,693 B2 | 2/2014 | Madsen et al. |
| 8,662,972 B2 | 3/2014 | Behnke et al. |
| 8,671,760 B2 | 3/2014 | Wallrath et al. |
| 8,677,724 B2 | 3/2014 | Chaney et al. |
| 8,738,238 B2 | 5/2014 | Rekow et al. |
| 8,738,244 B2 | 5/2014 | Lenz et al. |
| 8,755,976 B2 | 6/2014 | Peters et al. |
| 8,781,692 B2 | 7/2014 | Kormann |
| 8,789,563 B2 | 7/2014 | Wenzel |
| 8,814,640 B2 | 8/2014 | Behnke et al. |
| 8,843,269 B2 | 9/2014 | Anderson et al. |
| 8,868,304 B2 | 10/2014 | Bonefas |
| 8,909,389 B2 | 12/2014 | Meyer |
| D721,740 S | 1/2015 | Schmaltz |
| 8,942,860 B2 | 1/2015 | Morselli |
| 8,962,523 B2 | 2/2015 | Rosinger et al. |
| 9,002,591 B2 | 4/2015 | Wang et al. |
| 9,008,918 B2 | 4/2015 | Missotten et al. |
| 9,009,087 B1 | 4/2015 | Mewes et al. |
| 9,011,222 B2 | 4/2015 | Johnson et al. |
| 9,014,901 B2 | 4/2015 | Wang et al. |
| 9,043,096 B2 | 5/2015 | Zielke et al. |
| 9,043,129 B2 | 5/2015 | Bonefas et al. |
| 9,066,465 B2 | 6/2015 | Hendrickson et al. |
| 9,072,227 B2 | 7/2015 | Wenzel |
| 9,095,090 B2 | 8/2015 | Casper et al. |
| 9,119,342 B2 | 9/2015 | Bonefas |
| 9,127,428 B2 | 9/2015 | Meier |
| 9,131,644 B2 | 9/2015 | Osborne |
| 9,152,938 B2 | 10/2015 | Lang et al. |
| 9,173,339 B2 | 11/2015 | Sauder et al. |
| 9,179,599 B2 | 11/2015 | Bischoff |
| 9,188,518 B2 | 11/2015 | Snyder et al. |
| 9,188,986 B2 | 11/2015 | Baumann |
| 9,226,449 B2 | 1/2016 | Bischoff |
| 9,234,317 B2 | 1/2016 | Chi |
| 9,235,214 B2 | 1/2016 | Anderson |
| 9,301,447 B2 | 4/2016 | Kormann |
| 9,301,466 B2 | 4/2016 | Kelly |
| 9,313,951 B2 | 4/2016 | Herman et al. |
| 9,326,443 B2 | 5/2016 | Zametzer et al. |
| 9,326,444 B2 | 5/2016 | Bonefas |
| 9,392,746 B2 | 7/2016 | Darr et al. |
| 9,405,039 B2 | 8/2016 | Anderson |
| 9,410,840 B2 | 8/2016 | Acheson et al. |
| 9,439,342 B2 | 9/2016 | Pasquier |
| 9,457,971 B2 | 10/2016 | Bonefas et al. |
| 9,463,939 B2 | 10/2016 | Bonefas et al. |
| 9,485,905 B2 | 11/2016 | Jung et al. |
| 9,489,576 B2 | 11/2016 | Johnson et al. |
| 9,497,898 B2 | 11/2016 | Dillon |
| 9,510,508 B2 | 12/2016 | Jung |
| 9,511,633 B2 | 12/2016 | Anderson et al. |
| 9,511,958 B2 | 12/2016 | Bonefas |
| 9,516,812 B2 | 12/2016 | Baumgarten et al. |
| 9,521,805 B2 | 12/2016 | Muench et al. |
| 9,522,791 B2 | 12/2016 | Bonefas et al. |
| 9,522,792 B2 | 12/2016 | Bonefas et al. |
| 9,523,180 B2 | 12/2016 | Deines |
| 9,529,364 B2 | 12/2016 | Foster et al. |
| 9,532,504 B2 | 1/2017 | Herman et al. |
| 9,538,714 B2 | 1/2017 | Anderson |
| 9,563,492 B2 | 2/2017 | Bell et al. |
| 9,563,848 B1 | 2/2017 | Hunt |
| 9,563,852 B1 | 2/2017 | Wiles et al. |
| 9,578,808 B2 | 2/2017 | Dybro et al. |
| 9,605,583 B2 | 3/2017 | Goering et al. |
| 9,605,994 B2 | 3/2017 | Jensen |
| 9,629,308 B2 | 4/2017 | Schøler et al. |
| 9,631,964 B2 | 4/2017 | Gelinske et al. |
| 9,642,305 B2 | 5/2017 | Nykamp et al. |
| 9,648,807 B2 | 5/2017 | Escher et al. |
| 9,675,008 B1 | 6/2017 | Rusciolelli et al. |
| 9,681,605 B2 | 6/2017 | Noonan et al. |
| 9,694,712 B2 | 7/2017 | Healy |
| 9,696,162 B2 | 7/2017 | Anderson |
| 9,699,967 B2 | 7/2017 | Palla |
| 9,714,856 B2 | 7/2017 | Myers |
| 9,717,178 B1 | 8/2017 | Sauder et al. |
| 9,721,181 B2 | 8/2017 | Guan et al. |
| 9,723,790 B2 | 8/2017 | Berry et al. |
| 9,740,208 B2 | 8/2017 | Sugumaran et al. |
| 9,767,521 B2 | 9/2017 | Stuber et al. |
| 9,772,625 B2 | 9/2017 | Gilmore et al. |
| 9,807,934 B2 | 11/2017 | Rusciolelli et al. |
| 9,807,940 B2 | 11/2017 | Roell et al. |
| 9,810,679 B2 | 11/2017 | Kimmel |
| 9,829,364 B2 | 11/2017 | Wilson et al. |
| 9,848,528 B2 | 12/2017 | Werner et al. |
| 9,856,609 B2 | 1/2018 | Dehmel |
| 9,856,612 B2 | 1/2018 | Oetken |
| 9,861,040 B2 | 1/2018 | Bonefas |
| 9,872,433 B2 | 1/2018 | Acheson et al. |
| 9,903,077 B2 | 2/2018 | Rio |
| 9,903,979 B2 | 2/2018 | Dybro et al. |
| 9,904,963 B2 | 2/2018 | Rupp et al. |
| 9,915,952 B2 | 3/2018 | Dollinger et al. |
| 9,922,405 B2 | 3/2018 | Sauder et al. |
| 9,924,636 B2 | 3/2018 | Lisouski et al. |
| 9,928,584 B2 | 3/2018 | Jens et al. |
| 9,933,787 B2 | 4/2018 | Story |
| 9,974,226 B2 | 5/2018 | Rupp et al. |
| 9,982,397 B2 | 5/2018 | Korb et al. |
| 9,984,455 B1 | 5/2018 | Fox et al. |
| 9,992,931 B2 | 6/2018 | Bonefas et al. |
| 9,992,932 B2 | 6/2018 | Bonefas et al. |
| 10,004,176 B2 | 6/2018 | Mayerle |
| 10,015,928 B2 | 7/2018 | Nykamp et al. |
| 10,019,018 B2 | 7/2018 | Hulin |
| 10,019,790 B2 | 7/2018 | Bonefas et al. |
| 10,025,983 B2 | 7/2018 | Guan et al. |
| 10,028,435 B2 | 7/2018 | Anderson et al. |
| 10,028,451 B2 | 7/2018 | Rowan et al. |
| 10,034,427 B2 | 7/2018 | Krause et al. |
| 10,039,231 B2 | 8/2018 | Anderson et al. |
| 10,064,331 B2 | 9/2018 | Bradley |
| 10,064,335 B2 | 9/2018 | Byttebier et al. |
| 10,078,890 B1 | 9/2018 | Tagestad et al. |
| 10,085,372 B2 | 10/2018 | Noyer et al. |
| 10,091,925 B2 | 10/2018 | Aharoni et al. |
| 10,126,153 B2 | 11/2018 | Bischoff et al. |
| 10,126,282 B2 | 11/2018 | Anderson et al. |
| 10,129,528 B2 | 11/2018 | Bonefas et al. |
| 10,143,132 B2 | 12/2018 | Inoue et al. |
| 10,152,035 B2 | 12/2018 | Reid et al. |
| 10,154,624 B2 | 12/2018 | Guan et al. |
| 10,165,725 B2 | 1/2019 | Sugumaran et al. |
| 10,178,823 B2 | 1/2019 | Kovach et al. |
| 10,183,667 B2 | 1/2019 | Anderson et al. |
| 10,188,037 B2 | 1/2019 | Bruns et al. |
| 10,201,121 B1 | 2/2019 | Wilson |
| 10,209,179 B2 | 2/2019 | Hollstein |
| 10,231,371 B2 | 3/2019 | Dillon |
| 10,254,147 B2 | 4/2019 | Vermue et al. |
| 10,254,765 B2 | 4/2019 | Rekow et al. |
| 10,255,670 B1 | 4/2019 | Wu et al. |
| 10,275,550 B2 | 4/2019 | Lee |

(56) References Cited

U.S. PATENT DOCUMENTS

| | | |
|---|---|---|
| 10,295,703 B2 | 5/2019 | Dybro et al. |
| 10,310,455 B2 | 6/2019 | Blank et al. |
| 10,314,232 B2 | 6/2019 | Isaac et al. |
| 10,315,655 B2 | 6/2019 | Blank et al. |
| 10,317,272 B2 | 6/2019 | Bhavsar et al. |
| 10,351,364 B2 | 7/2019 | Green et al. |
| 10,368,488 B2 | 8/2019 | Becker et al. |
| 10,398,084 B2 | 9/2019 | Ray et al. |
| 10,408,545 B2 | 9/2019 | Blank et al. |
| 10,412,889 B2 | 9/2019 | Palla et al. |
| 10,426,086 B2 | 10/2019 | Van de Wege et al. |
| 10,437,243 B2 | 10/2019 | Blank et al. |
| 10,477,756 B1 | 11/2019 | Richt et al. |
| 10,485,178 B2 | 11/2019 | Mayerle |
| 10,521,526 B2 | 12/2019 | Haaland et al. |
| 10,537,061 B2 | 1/2020 | Farley et al. |
| 10,568,316 B2 | 2/2020 | Gall et al. |
| 10,631,462 B2 | 4/2020 | Bonefas |
| 10,677,637 B1 | 6/2020 | Von Muenster |
| 10,681,872 B2 | 6/2020 | Viaene et al. |
| 10,701,861 B2 | 7/2020 | Gould et al. |
| 10,703,277 B1 | 7/2020 | Schroeder |
| 10,729,067 B2 | 8/2020 | Hammer et al. |
| 10,733,752 B2 | 8/2020 | Hageman et al. |
| 10,740,703 B2 | 8/2020 | Story |
| 10,745,868 B2 | 8/2020 | Laugwitz et al. |
| 10,760,946 B2 | 9/2020 | Meier et al. |
| 10,809,118 B1 | 10/2020 | Von Muenster |
| 10,830,634 B2 | 11/2020 | Blank et al. |
| 10,866,109 B2 | 12/2020 | Madsen et al. |
| 10,890,922 B2 | 1/2021 | Ramm et al. |
| 10,909,368 B2 | 2/2021 | Guo et al. |
| 10,912,249 B1 | 2/2021 | Wilson |
| 10,966,071 B2 | 3/2021 | Suleman et al. |
| 11,008,177 B2 | 5/2021 | Banthia et al. |
| 11,112,262 B2 | 9/2021 | Anderson |
| 11,308,738 B2 | 4/2022 | Thomas et al. |
| 11,314,213 B1 * | 4/2022 | Harweger ............ F26B 25/002 |
| 2002/0011061 A1 | 1/2002 | Lucand et al. |
| 2002/0083695 A1 | 7/2002 | Behnke et al. |
| 2002/0091458 A1 | 7/2002 | Moore |
| 2002/0099471 A1 | 7/2002 | Benneweis |
| 2002/0133309 A1 | 9/2002 | Hardt |
| 2002/0173893 A1 | 11/2002 | Blackmore et al. |
| 2002/0193928 A1 | 12/2002 | Beck |
| 2002/0193929 A1 | 12/2002 | Beck |
| 2002/0198654 A1 | 12/2002 | Lange et al. |
| 2003/0004630 A1 | 1/2003 | Beck |
| 2003/0014171 A1 | 1/2003 | Ma et al. |
| 2003/0015351 A1 | 1/2003 | Goldman et al. |
| 2003/0024450 A1 | 2/2003 | Juptner |
| 2003/0060245 A1 | 3/2003 | Coers et al. |
| 2003/0069680 A1 | 4/2003 | Cohen et al. |
| 2003/0075145 A1 | 4/2003 | Sheidler et al. |
| 2003/0174207 A1 | 9/2003 | Alexia et al. |
| 2003/0182144 A1 | 9/2003 | Pickett et al. |
| 2003/0187560 A1 | 10/2003 | Keller et al. |
| 2003/0216158 A1 | 11/2003 | Bischoff |
| 2003/0229432 A1 | 12/2003 | Ho et al. |
| 2003/0229433 A1 | 12/2003 | van den Berg et al. |
| 2003/0229435 A1 | 12/2003 | Van der Lely |
| 2004/0004544 A1 | 1/2004 | William Knutson |
| 2004/0054457 A1 | 3/2004 | Kormann |
| 2004/0073468 A1 | 4/2004 | Vyas et al. |
| 2004/0116169 A1 | 6/2004 | Isfort et al. |
| 2004/0193348 A1 | 9/2004 | Gray et al. |
| 2005/0059445 A1 | 3/2005 | Niermann et al. |
| 2005/0066738 A1 | 3/2005 | Moore |
| 2005/0149235 A1 | 7/2005 | Seal et al. |
| 2005/0150202 A1 | 7/2005 | Quick |
| 2005/0197175 A1 | 9/2005 | Anderson |
| 2005/0241285 A1 | 11/2005 | Maertens et al. |
| 2005/0279070 A1 | 12/2005 | Pirro et al. |
| 2005/0283314 A1 | 12/2005 | Hall |
| 2005/0284119 A1 | 12/2005 | Brunnert |
| 2006/0014489 A1 | 1/2006 | Fitzner et al. |
| 2006/0014643 A1 | 1/2006 | Hacker et al. |
| 2006/0047377 A1 | 3/2006 | Ferguson et al. |
| 2006/0047418 A1 | 3/2006 | Metzler et al. |
| 2006/0058896 A1 | 3/2006 | Pokorny et al. |
| 2006/0074560 A1 | 4/2006 | Dyer et al. |
| 2006/0094487 A1 | 5/2006 | Huster et al. |
| 2006/0155449 A1 | 7/2006 | Dammann |
| 2006/0162631 A1 | 7/2006 | Hickey et al. |
| 2006/0196158 A1 | 9/2006 | Faivre et al. |
| 2006/0200334 A1 | 9/2006 | Faivre et al. |
| 2007/0005209 A1 | 1/2007 | Fitzner et al. |
| 2007/0021948 A1 | 1/2007 | Anderson |
| 2007/0037621 A1 | 2/2007 | Isfort |
| 2007/0056258 A1 | 3/2007 | Behnke |
| 2007/0068238 A1 | 3/2007 | Wendte |
| 2007/0073700 A1 | 3/2007 | Wippersteg et al. |
| 2007/0089390 A1 | 4/2007 | Hendrickson et al. |
| 2007/0135190 A1 | 6/2007 | Diekhans et al. |
| 2007/0185749 A1 | 8/2007 | Anderson et al. |
| 2007/0199903 A1 | 8/2007 | Denny |
| 2007/0208510 A1 | 9/2007 | Anderson et al. |
| 2007/0233348 A1 | 10/2007 | Diekhans et al. |
| 2007/0233374 A1 | 10/2007 | Diekhans et al. |
| 2007/0239337 A1 | 10/2007 | Anderson |
| 2007/0282523 A1 | 12/2007 | Diekhans et al. |
| 2007/0298744 A1 | 12/2007 | Fitzner et al. |
| 2008/0005938 A1 | 1/2008 | Aebischer et al. |
| 2008/0030320 A1 | 2/2008 | Wilcox et al. |
| 2008/0098035 A1 | 4/2008 | Wippersteg et al. |
| 2008/0140431 A1 | 6/2008 | Anderson et al. |
| 2008/0162004 A1 | 7/2008 | Price et al. |
| 2008/0177449 A1 | 7/2008 | Pickett et al. |
| 2008/0245042 A1 | 10/2008 | Brunnert et al. |
| 2008/0248843 A1 | 10/2008 | Birrell et al. |
| 2008/0268927 A1 | 10/2008 | Farley et al. |
| 2008/0269052 A1 | 10/2008 | Rosinger et al. |
| 2008/0289308 A1 | 11/2008 | Brubaker |
| 2008/0312085 A1 | 12/2008 | Kordes et al. |
| 2009/0002187 A1 | 1/2009 | Kriel et al. |
| 2009/0044505 A1 | 2/2009 | Huster et al. |
| 2009/0074243 A1 | 3/2009 | Missotten et al. |
| 2009/0084173 A1 | 4/2009 | Gudat et al. |
| 2009/0143941 A1 | 6/2009 | Tarasinski et al. |
| 2009/0192654 A1 | 7/2009 | Wendte et al. |
| 2009/0216410 A1 | 8/2009 | Allen et al. |
| 2009/0226036 A1 | 9/2009 | Gaal |
| 2009/0259483 A1 | 10/2009 | Hendrickson et al. |
| 2009/0265098 A1 | 10/2009 | Dix |
| 2009/0306835 A1 | 12/2009 | Ellermann et al. |
| 2009/0311084 A1 | 12/2009 | Coers et al. |
| 2009/0312919 A1 | 12/2009 | Foster et al. |
| 2009/0312920 A1 | 12/2009 | Boenig et al. |
| 2009/0325658 A1 | 12/2009 | Phelan et al. |
| 2010/0036696 A1 | 2/2010 | Lang et al. |
| 2010/0042297 A1 | 2/2010 | Foster et al. |
| 2010/0063626 A1 | 3/2010 | Anderson |
| 2010/0063648 A1 | 3/2010 | Anderson |
| 2010/0063651 A1 | 3/2010 | Anderson |
| 2010/0063664 A1 | 3/2010 | Anderson |
| 2010/0063954 A1 | 3/2010 | Anderson |
| 2010/0070145 A1 | 3/2010 | Foster et al. |
| 2010/0071329 A1 | 3/2010 | Hindryckx et al. |
| 2010/0094481 A1 | 4/2010 | Anderson |
| 2010/0121541 A1 | 5/2010 | Behnke et al. |
| 2010/0137373 A1 | 6/2010 | Hungenberg et al. |
| 2010/0145572 A1 | 6/2010 | Steckel et al. |
| 2010/0152270 A1 | 6/2010 | Suty-Heinze et al. |
| 2010/0152943 A1 | 6/2010 | Matthews |
| 2010/0217474 A1 | 8/2010 | Baumgarten et al. |
| 2010/0245542 A1 | 9/2010 | Kim et al. |
| 2010/0268562 A1 | 10/2010 | Anderson |
| 2010/0268679 A1 | 10/2010 | Anderson |
| 2010/0285964 A1 | 11/2010 | Waldraff et al. |
| 2010/0317517 A1 | 12/2010 | Rosinger et al. |
| 2010/0319941 A1 | 12/2010 | Peterson |
| 2010/0332051 A1 | 12/2010 | Kormann |
| 2011/0022273 A1 | 1/2011 | Peters et al. |
| 2011/0056178 A1 | 3/2011 | Sauerwein et al. |

(56) References Cited

U.S. PATENT DOCUMENTS

| | | |
|---|---|---|
| 2011/0059782 A1 | 3/2011 | Harrington |
| 2011/0061762 A1 | 3/2011 | Madsen et al. |
| 2011/0066337 A1 | 3/2011 | Kormann |
| 2011/0072773 A1 | 3/2011 | Schroeder et al. |
| 2011/0084851 A1 | 4/2011 | Peterson et al. |
| 2011/0086684 A1 | 4/2011 | Luellen et al. |
| 2011/0160961 A1 | 6/2011 | Wollenhaupt et al. |
| 2011/0205084 A1 | 8/2011 | Morselli et al. |
| 2011/0213531 A1 | 9/2011 | Farley et al. |
| 2011/0224873 A1 | 9/2011 | Reeve et al. |
| 2011/0227745 A1 | 9/2011 | Kikuchi et al. |
| 2011/0257850 A1 | 10/2011 | Reeve et al. |
| 2011/0270494 A1 | 11/2011 | Imhof et al. |
| 2011/0270495 A1 | 11/2011 | Knapp |
| 2011/0295460 A1 | 12/2011 | Hunt et al. |
| 2011/0307149 A1 | 12/2011 | Pighi et al. |
| 2012/0004813 A1 | 1/2012 | Baumgarten et al. |
| 2012/0029732 A1 | 2/2012 | Meyer |
| 2012/0085458 A1 | 4/2012 | Wenzel |
| 2012/0087771 A1 | 4/2012 | Wenzel |
| 2012/0096827 A1 | 4/2012 | Chaney et al. |
| 2012/0136542 A1 | 5/2012 | Upcroft et al. |
| 2012/0143642 A1 | 6/2012 | O'Neil |
| 2012/0215378 A1 | 8/2012 | Sprock et al. |
| 2012/0215379 A1 | 8/2012 | Sprock et al. |
| 2012/0215394 A1 | 8/2012 | Wang et al. |
| 2012/0215409 A1 | 8/2012 | Wang et al. |
| 2012/0253611 A1 | 10/2012 | Zielke et al. |
| 2012/0263560 A1 | 10/2012 | Diekhans et al. |
| 2012/0265412 A1 | 10/2012 | Diekhans et al. |
| 2012/0271489 A1 | 10/2012 | Roberts et al. |
| 2012/0302299 A1 | 11/2012 | Behnke et al. |
| 2012/0323452 A1 | 12/2012 | Green et al. |
| 2013/0019580 A1 | 1/2013 | Anderson et al. |
| 2013/0022430 A1 | 1/2013 | Anderson |
| 2013/0046419 A1 | 2/2013 | Anderson et al. |
| 2013/0046439 A1 | 2/2013 | Anderson et al. |
| 2013/0046525 A1 | 2/2013 | Ali et al. |
| 2013/0103269 A1 | 4/2013 | Hellgen et al. |
| 2013/0124239 A1 | 5/2013 | Rosa et al. |
| 2013/0184944 A1 | 7/2013 | Missotten et al. |
| 2013/0197767 A1 | 8/2013 | Lenz |
| 2013/0205733 A1 | 8/2013 | Peters et al. |
| 2013/0210505 A1 | 8/2013 | Bischoff |
| 2013/0211675 A1 | 8/2013 | Bonefas |
| 2013/0213518 A1 | 8/2013 | Bonefas |
| 2013/0227922 A1 | 9/2013 | Zametzer et al. |
| 2013/0231823 A1 | 9/2013 | Wang et al. |
| 2013/0319941 A1 | 12/2013 | Schneider |
| 2013/0325242 A1 | 12/2013 | Cavender-Bares et al. |
| 2013/0329012 A1 | 12/2013 | Bartos et al. |
| 2013/0332003 A1 | 12/2013 | Murray et al. |
| 2013/0346127 A1 | 12/2013 | Jensen |
| 2014/0002489 A1 | 1/2014 | Sauder et al. |
| 2014/0019017 A1 | 1/2014 | Wilken et al. |
| 2014/0021598 A1 | 1/2014 | Sutardja |
| 2014/0050364 A1 | 2/2014 | Brueckner |
| 2014/0067745 A1 | 3/2014 | Avey |
| 2014/0121882 A1 | 5/2014 | Gilmore et al. |
| 2014/0129048 A1 | 5/2014 | Baumgarten et al. |
| 2014/0172222 A1 | 6/2014 | Nickel |
| 2014/0172224 A1 | 6/2014 | Matthews et al. |
| 2014/0172225 A1 | 6/2014 | Matthews et al. |
| 2014/0208870 A1 | 7/2014 | Quaderer et al. |
| 2014/0215984 A1 | 8/2014 | Bischoff |
| 2014/0224377 A1 | 8/2014 | Bonefas |
| 2014/0230391 A1 | 8/2014 | Hendrickson et al. |
| 2014/0230392 A1 | 8/2014 | Dybro et al. |
| 2014/0236381 A1 | 8/2014 | Anderson et al. |
| 2014/0236431 A1 | 8/2014 | Hendrickson et al. |
| 2014/0257911 A1 | 9/2014 | Anderson |
| 2014/0262547 A1 | 9/2014 | Acheson et al. |
| 2014/0277960 A1 | 9/2014 | Blank et al. |
| 2014/0297242 A1 | 10/2014 | Sauder et al. |
| 2014/0303814 A1 | 10/2014 | Burema et al. |
| 2014/0311113 A1 | 10/2014 | Bonefas |
| 2014/0324272 A1 | 10/2014 | Madsen et al. |
| 2014/0331631 A1 | 11/2014 | Sauder et al. |
| 2014/0338298 A1 | 11/2014 | Jung et al. |
| 2014/0350802 A1 | 11/2014 | Biggerstaff et al. |
| 2014/0360148 A1 | 12/2014 | Wienker et al. |
| 2015/0049088 A1 | 2/2015 | Snyder et al. |
| 2015/0088785 A1 | 3/2015 | Chi |
| 2015/0094944 A1 | 4/2015 | Baumann |
| 2015/0095830 A1 | 4/2015 | Massoumi et al. |
| 2015/0101519 A1 | 4/2015 | Blackwell et al. |
| 2015/0105984 A1 | 4/2015 | Birrell et al. |
| 2015/0124054 A1 | 5/2015 | Darr et al. |
| 2015/0168187 A1 | 6/2015 | Myers |
| 2015/0189832 A1 | 7/2015 | Krause et al. |
| 2015/0211199 A1 | 7/2015 | Corcoran et al. |
| 2015/0230403 A1 | 8/2015 | Jung et al. |
| 2015/0242799 A1 | 8/2015 | Seki et al. |
| 2015/0243114 A1 | 8/2015 | Tanabe et al. |
| 2015/0254800 A1 | 9/2015 | Johnson et al. |
| 2015/0264863 A1 | 9/2015 | Muench et al. |
| 2015/0276794 A1 | 10/2015 | Pistrol et al. |
| 2015/0278640 A1 | 10/2015 | Johnson et al. |
| 2015/0285647 A1 | 10/2015 | Meyer zu Helligen et al. |
| 2015/0293029 A1 | 10/2015 | Acheson et al. |
| 2015/0302305 A1 | 10/2015 | Rupp et al. |
| 2015/0305238 A1 | 10/2015 | Klausmann et al. |
| 2015/0305239 A1 | 10/2015 | Jung |
| 2015/0327425 A1 | 11/2015 | Dillon |
| 2015/0327440 A1 | 11/2015 | Dybro et al. |
| 2015/0351320 A1 | 12/2015 | Takahara et al. |
| 2015/0370935 A1 | 12/2015 | Starr |
| 2015/0373902 A1 | 12/2015 | Pasquier |
| 2015/0377690 A1* | 12/2015 | Phelan ............... G01F 1/78 |
| | | 73/1.34 |
| 2015/0379785 A1 | 12/2015 | Brown, Jr. et al. |
| 2016/0025531 A1 | 1/2016 | Bischoff et al. |
| 2016/0029558 A1 | 2/2016 | Dybro et al. |
| 2016/0052525 A1 | 2/2016 | Tuncer et al. |
| 2016/0057922 A1 | 3/2016 | Freiberg et al. |
| 2016/0059854 A1 | 3/2016 | Ohsugi et al. |
| 2016/0061643 A1 | 3/2016 | Wilson et al. |
| 2016/0066505 A1 | 3/2016 | Bakke et al. |
| 2016/0073573 A1 | 3/2016 | Ethington et al. |
| 2016/0078375 A1 | 3/2016 | Ethington et al. |
| 2016/0078570 A1 | 3/2016 | Ethington et al. |
| 2016/0084813 A1 | 3/2016 | Anderson et al. |
| 2016/0088794 A1 | 3/2016 | Baumgarten et al. |
| 2016/0106038 A1 | 4/2016 | Boyd et al. |
| 2016/0146611 A1 | 5/2016 | Matthews |
| 2016/0183463 A1 | 6/2016 | Herman et al. |
| 2016/0202227 A1 | 7/2016 | Mathur et al. |
| 2016/0203657 A1 | 7/2016 | Bell et al. |
| 2016/0212939 A1 | 7/2016 | Ouchida et al. |
| 2016/0215994 A1 | 7/2016 | Mewes et al. |
| 2016/0232621 A1 | 8/2016 | Ethington et al. |
| 2016/0247075 A1 | 8/2016 | Mewes et al. |
| 2016/0247082 A1 | 8/2016 | Stehling |
| 2016/0252384 A1 | 9/2016 | Wilson et al. |
| 2016/0260021 A1 | 9/2016 | Marek |
| 2016/0270294 A1 | 9/2016 | Viaene et al. |
| 2016/0286720 A1 | 10/2016 | Heitmann et al. |
| 2016/0286721 A1 | 10/2016 | Heitmann et al. |
| 2016/0286722 A1 | 10/2016 | Heitmann et al. |
| 2016/0309656 A1 | 10/2016 | Wilken et al. |
| 2016/0327535 A1 | 11/2016 | Cotton et al. |
| 2016/0330906 A1* | 11/2016 | Acheson ............... A01D 41/127 |
| 2016/0338267 A1 | 11/2016 | Anderson et al. |
| 2016/0342915 A1 | 11/2016 | Humphrey |
| 2016/0345485 A1 | 12/2016 | Acheson et al. |
| 2016/0360697 A1 | 12/2016 | Diaz |
| 2017/0013773 A1 | 1/2017 | Kirk et al. |
| 2017/0031365 A1 | 2/2017 | Sugumaran et al. |
| 2017/0034997 A1 | 2/2017 | Mayerle |
| 2017/0042088 A1 | 2/2017 | Nykamp et al. |
| 2017/0049045 A1 | 2/2017 | Wilken et al. |
| 2017/0049053 A1 | 2/2017 | Bonefas et al. |
| 2017/0055433 A1 | 3/2017 | Jamison |
| 2017/0055446 A1 | 3/2017 | Nykamp et al. |

(56) References Cited

U.S. PATENT DOCUMENTS

| | | |
|---|---|---|
| 2017/0082442 A1 | 3/2017 | Anderson |
| 2017/0083024 A1 | 3/2017 | Reijersen Van Buuren |
| 2017/0086378 A1 | 3/2017 | Lisouski et al. |
| 2017/0086381 A1 | 3/2017 | Roell et al. |
| 2017/0089741 A1 | 3/2017 | Takahashi et al. |
| 2017/0089742 A1 | 3/2017 | Bruns et al. |
| 2017/0090068 A1 | 3/2017 | Xiang et al. |
| 2017/0105331 A1 | 4/2017 | Herlitzius et al. |
| 2017/0105335 A1 | 4/2017 | Xu et al. |
| 2017/0112049 A1 | 4/2017 | Weisberg et al. |
| 2017/0112061 A1 | 4/2017 | Meyer |
| 2017/0115862 A1 | 4/2017 | Stratton et al. |
| 2017/0118915 A1 | 5/2017 | Middelberg et al. |
| 2017/0124463 A1 | 5/2017 | Chen et al. |
| 2017/0127606 A1 | 5/2017 | Horton |
| 2017/0160916 A1 | 6/2017 | Baumgarten et al. |
| 2017/0161627 A1 | 6/2017 | Xu et al. |
| 2017/0185086 A1 | 6/2017 | Sauder et al. |
| 2017/0188515 A1 | 7/2017 | Baumgarten et al. |
| 2017/0192431 A1 | 7/2017 | Foster et al. |
| 2017/0206645 A1 | 7/2017 | Bonefas et al. |
| 2017/0208742 A1 | 7/2017 | Ingibergsson et al. |
| 2017/0213141 A1 | 7/2017 | Xu et al. |
| 2017/0215330 A1 | 8/2017 | Missotten et al. |
| 2017/0223947 A1 | 8/2017 | Gall et al. |
| 2017/0227969 A1 | 8/2017 | Murray et al. |
| 2017/0235471 A1 | 8/2017 | Scholer et al. |
| 2017/0245434 A1 | 8/2017 | Jung et al. |
| 2017/0245435 A1 | 8/2017 | Rusciolelli et al. |
| 2017/0251600 A1 | 9/2017 | Anderson et al. |
| 2017/0270446 A1 | 9/2017 | Starr et al. |
| 2017/0270616 A1 | 9/2017 | Basso |
| 2017/0276534 A1 | 9/2017 | Vermue et al. |
| 2017/0316692 A1 | 11/2017 | Rusciolelli et al. |
| 2017/0318743 A1 | 11/2017 | Sauder et al. |
| 2017/0322550 A1 | 11/2017 | Yokoyama |
| 2017/0328030 A1 | 11/2017 | Yamada et al. |
| 2017/0332551 A1 | 11/2017 | Todd et al. |
| 2017/0336787 A1 | 11/2017 | Pichlmaier et al. |
| 2017/0370765 A1 | 12/2017 | Meier et al. |
| 2018/0000011 A1 | 1/2018 | Schleusner et al. |
| 2018/0014452 A1 | 1/2018 | Starr |
| 2018/0022559 A1 | 1/2018 | Knutson |
| 2018/0024549 A1 | 1/2018 | Hurd |
| 2018/0035603 A1 | 2/2018 | Kremmer et al. |
| 2018/0035622 A1 | 2/2018 | Gresch et al. |
| 2018/0037424 A1 | 2/2018 | Green et al. |
| 2018/0054955 A1 | 3/2018 | Oliver |
| 2018/0060975 A1 | 3/2018 | Hassanzadeh |
| 2018/0070534 A1 | 3/2018 | Mayerle |
| 2018/0077865 A1 | 3/2018 | Gallmeier |
| 2018/0084709 A1 | 3/2018 | Wieckhorst et al. |
| 2018/0084722 A1 | 3/2018 | Wieckhorst et al. |
| 2018/0092301 A1 | 4/2018 | Vandike et al. |
| 2018/0092302 A1 | 4/2018 | Vandike et al. |
| 2018/0108123 A1 | 4/2018 | Baurer et al. |
| 2018/0120098 A1 | 5/2018 | Matsuo et al. |
| 2018/0120133 A1 | 5/2018 | Blank et al. |
| 2018/0121821 A1 | 5/2018 | Parsons et al. |
| 2018/0124992 A1 | 5/2018 | Koch et al. |
| 2018/0128933 A1 | 5/2018 | Koch et al. |
| 2018/0129879 A1 | 5/2018 | Achtelik et al. |
| 2018/0132422 A1 | 5/2018 | Hassanzadeh et al. |
| 2018/0136664 A1 | 5/2018 | Tomita et al. |
| 2018/0146612 A1 | 5/2018 | Sauder et al. |
| 2018/0146624 A1 | 5/2018 | Chen et al. |
| 2018/0153084 A1 | 6/2018 | Calleija et al. |
| 2018/0174291 A1 | 6/2018 | Asada et al. |
| 2018/0177125 A1 | 6/2018 | Takahara et al. |
| 2018/0181893 A1 | 6/2018 | Basso |
| 2018/0196438 A1 | 7/2018 | Newlin et al. |
| 2018/0196441 A1 | 7/2018 | Muench et al. |
| 2018/0211156 A1 | 7/2018 | Guan et al. |
| 2018/0232674 A1 | 8/2018 | Bilde |
| 2018/0242523 A1 | 8/2018 | Kirchbeck et al. |
| 2018/0245308 A1 | 8/2018 | Ready-Campbell et al. |
| 2018/0249641 A1 | 9/2018 | Lewis et al. |
| 2018/0257657 A1 | 9/2018 | Blank et al. |
| 2018/0271015 A1 | 9/2018 | Redden et al. |
| 2018/0279599 A1 | 10/2018 | Struve |
| 2018/0295771 A1 | 10/2018 | Peters |
| 2018/0310474 A1 | 11/2018 | Posselius et al. |
| 2018/0317381 A1 | 11/2018 | Bassett |
| 2018/0317385 A1 | 11/2018 | Wellensiek et al. |
| 2018/0325012 A1 | 11/2018 | Ferrari et al. |
| 2018/0325014 A1 | 11/2018 | Debbaut |
| 2018/0332767 A1 | 11/2018 | Muench et al. |
| 2018/0338422 A1 | 11/2018 | Brubaker |
| 2018/0340316 A1 | 11/2018 | Izumikawa |
| 2018/0340845 A1 | 11/2018 | Rhodes et al. |
| 2018/0359917 A1 | 12/2018 | Blank et al. |
| 2018/0359919 A1 | 12/2018 | Blank et al. |
| 2018/0364726 A1 | 12/2018 | Foster et al. |
| 2019/0021226 A1 | 1/2019 | Dima et al. |
| 2019/0025175 A1 | 1/2019 | Laugwitz |
| 2019/0026914 A1 | 1/2019 | Hageman et al. |
| 2019/0041813 A1 | 2/2019 | Horn et al. |
| 2019/0050948 A1 | 2/2019 | Perry et al. |
| 2019/0057460 A1 | 2/2019 | Sakaguchi et al. |
| 2019/0066234 A1 | 2/2019 | Bedoya et al. |
| 2019/0069470 A1 | 3/2019 | Pfeiffer et al. |
| 2019/0075727 A1 | 3/2019 | Duke et al. |
| 2019/0085785 A1 | 3/2019 | Abolt |
| 2019/0090423 A1 | 3/2019 | Escher et al. |
| 2019/0098825 A1 | 4/2019 | Neitemeier et al. |
| 2019/0104722 A1 | 4/2019 | Slaughter et al. |
| 2019/0108413 A1 | 4/2019 | Chen et al. |
| 2019/0114847 A1 | 4/2019 | Wagner et al. |
| 2019/0124819 A1 | 5/2019 | Madsen et al. |
| 2019/0129430 A1 | 5/2019 | Madsen et al. |
| 2019/0136491 A1 | 5/2019 | Martin |
| 2019/0138962 A1 | 5/2019 | Ehlmann et al. |
| 2019/0147094 A1 | 5/2019 | Zhan et al. |
| 2019/0147249 A1 | 5/2019 | Kiepe et al. |
| 2019/0156255 A1 | 5/2019 | Carroll |
| 2019/0166761 A1* | 6/2019 | Conrad ............... A01D 41/1275 |
| 2019/0174667 A1 | 6/2019 | Gresch et al. |
| 2019/0183047 A1 | 6/2019 | Dybro et al. |
| 2019/0200522 A1 | 7/2019 | Hansen et al. |
| 2019/0230855 A1 | 8/2019 | Reed et al. |
| 2019/0239416 A1 | 8/2019 | Green et al. |
| 2019/0261550 A1 | 8/2019 | Damme et al. |
| 2019/0261559 A1 | 8/2019 | Heitmann et al. |
| 2019/0261560 A1 | 8/2019 | Jelenkavic |
| 2019/0313570 A1 | 10/2019 | Owechko |
| 2019/0327889 A1 | 10/2019 | Borgstadt |
| 2019/0327892 A1 | 10/2019 | Fries et al. |
| 2019/0335662 A1 | 11/2019 | Good et al. |
| 2019/0335674 A1 | 11/2019 | Basso |
| 2019/0343035 A1 | 11/2019 | Smith et al. |
| 2019/0343043 A1 | 11/2019 | Bormann et al. |
| 2019/0343044 A1 | 11/2019 | Bormann et al. |
| 2019/0343048 A1 | 11/2019 | Farley et al. |
| 2019/0351765 A1 | 11/2019 | Rabusic |
| 2019/0354081 A1 | 11/2019 | Blank et al. |
| 2019/0364733 A1 | 12/2019 | Laugen et al. |
| 2019/0364734 A1 | 12/2019 | Kriebel et al. |
| 2020/0000006 A1 | 1/2020 | McDonald et al. |
| 2020/0008351 A1 | 1/2020 | Zielke et al. |
| 2020/0015416 A1 | 1/2020 | Barther et al. |
| 2020/0019159 A1 | 1/2020 | Kocer et al. |
| 2020/0024102 A1 | 1/2020 | Brill et al. |
| 2020/0029488 A1 | 1/2020 | Bertucci et al. |
| 2020/0034759 A1 | 1/2020 | Dumstorff et al. |
| 2020/0037491 A1 | 2/2020 | Schoeny et al. |
| 2020/0053961 A1 | 2/2020 | Dix et al. |
| 2020/0064144 A1 | 2/2020 | Tomita et al. |
| 2020/0064863 A1 | 2/2020 | Tomita et al. |
| 2020/0074023 A1 | 3/2020 | Nizami et al. |
| 2020/0084963 A1 | 3/2020 | Gururajan et al. |
| 2020/0084966 A1 | 3/2020 | Corban et al. |
| 2020/0090094 A1 | 3/2020 | Blank |
| 2020/0097851 A1 | 3/2020 | Alvarez et al. |
| 2020/0113142 A1 | 4/2020 | Coleman et al. |

(56) References Cited

U.S. PATENT DOCUMENTS

| | | |
|---|---|---|
| 2020/0125822 A1 | 4/2020 | Yang et al. |
| 2020/0128732 A1 | 4/2020 | Chaney |
| 2020/0128733 A1 | 4/2020 | Vandike et al. |
| 2020/0128734 A1* | 4/2020 | Brammeier ........ A01D 41/1275 |
| 2020/0128735 A1 | 4/2020 | Bonefas et al. |
| 2020/0128737 A1 | 4/2020 | Anderson et al. |
| 2020/0128738 A1 | 4/2020 | Suleman et al. |
| 2020/0128740 A1 | 4/2020 | Suleman |
| 2020/0133262 A1 | 4/2020 | Suleman et al. |
| 2020/0137957 A1 | 5/2020 | Friesen |
| 2020/0141784 A1 | 5/2020 | Lange et al. |
| 2020/0146203 A1 | 5/2020 | Deng |
| 2020/0150631 A1 | 5/2020 | Frieberg et al. |
| 2020/0154639 A1 | 5/2020 | Takahara et al. |
| 2020/0163277 A1 | 5/2020 | Cooksey et al. |
| 2020/0180493 A1 | 6/2020 | Thompson |
| 2020/0183406 A1 | 6/2020 | Borgstadt |
| 2020/0187409 A1 | 6/2020 | Meyer Zu Helligen |
| 2020/0196526 A1 | 6/2020 | Koch et al. |
| 2020/0202596 A1 | 6/2020 | Kitahara et al. |
| 2020/0221632 A1 | 7/2020 | Strnad et al. |
| 2020/0221635 A1 | 7/2020 | Hendrickson et al. |
| 2020/0221636 A1 | 7/2020 | Boydens et al. |
| 2020/0245557 A1* | 8/2020 | Reinecke .............. G06F 16/904 |
| 2020/0265527 A1 | 8/2020 | Rose et al. |
| 2020/0278680 A1 | 9/2020 | Schultz et al. |
| 2020/0317114 A1 | 10/2020 | Hoff |
| 2020/0319632 A1 | 10/2020 | Desai et al. |
| 2020/0319655 A1 | 10/2020 | Desai et al. |
| 2020/0323133 A1* | 10/2020 | Anderson ............ A01B 79/005 |
| 2020/0323134 A1 | 10/2020 | Darr et al. |
| 2020/0325653 A1 | 10/2020 | Hageman et al. |
| 2020/0325655 A1 | 10/2020 | Hageman et al. |
| 2020/0326674 A1 | 10/2020 | Palla et al. |
| 2020/0326727 A1 | 10/2020 | Palla et al. |
| 2020/0333278 A1 | 10/2020 | Locken et al. |
| 2020/0337232 A1 | 10/2020 | Blank et al. |
| 2020/0352099 A1 | 11/2020 | Meier et al. |
| 2020/0359547 A1 | 11/2020 | Sakaguchi et al. |
| 2020/0363549 A1 | 11/2020 | Sakaguchi et al. |
| 2020/0363256 A1 | 11/2020 | Meier et al. |
| 2020/0375083 A1 | 12/2020 | Anderson et al. |
| 2020/0375084 A1 | 12/2020 | Sakaguchi et al. |
| 2020/0378088 A1 | 12/2020 | Anderson |
| 2020/0404842 A1 | 12/2020 | Dugas et al. |
| 2021/0007277 A1* | 1/2021 | Anderson ............ G05D 1/0088 |
| 2021/0015041 A1 | 1/2021 | Bormann et al. |
| 2021/0026362 A1 | 1/2021 | Wilson et al. |
| 2021/0029877 A1 | 2/2021 | Vandike et al. |
| 2021/0099522 A1 | 4/2021 | Chiocco et al. |
| 2021/0129853 A1 | 5/2021 | Appleton et al. |
| 2021/0176916 A1 | 6/2021 | Sidon et al. |
| 2021/0176918 A1 | 6/2021 | Franzen et al. |
| 2021/0195840 A1* | 7/2021 | Puryk .................... A01D 90/10 |
| 2021/0289687 A1 | 9/2021 | Heinold et al. |
| 2021/0294337 A1 | 9/2021 | Van Mill et al. |
| 2021/0321567 A1 | 10/2021 | Sidon et al. |
| 2021/0333802 A1 | 10/2021 | Singh et al. |
| 2021/0337729 A1 | 11/2021 | O'Connor et al. |
| 2021/0339729 A1 | 11/2021 | O'Connor et al. |
| 2021/0365879 A1* | 11/2021 | Kaloudis ................ A01N 63/00 |
| 2022/0015288 A1 | 1/2022 | Christiansen et al. |
| 2022/0019238 A1 | 1/2022 | Christiansen et al. |
| 2022/0019239 A1 | 1/2022 | Christiansen et al. |
| 2022/0019240 A1 | 1/2022 | Christiansen et al. |
| 2022/0019241 A1 | 1/2022 | Christiansen et al. |
| 2022/0039318 A1 | 2/2022 | Raste et al. |
| 2022/0095539 A1 | 3/2022 | Faust et al. |
| 2022/0110238 A1 | 4/2022 | Vandike et al. |
| 2022/0110246 A1 | 4/2022 | Vandike et al. |
| 2022/0110253 A1 | 4/2022 | Anderson et al. |
| 2022/0110262 A1 | 4/2022 | Vandike et al. |
| 2022/0113727 A1 | 4/2022 | Vandike et al. |
| 2022/0117143 A1 | 4/2022 | Kraus et al. |
| 2022/0122197 A1 | 4/2022 | Hanrieder |
| 2022/0132736 A1 | 5/2022 | Meyers et al. |
| 2022/0132737 A1 | 5/2022 | Anderson et al. |
| 2022/0176818 A1 | 6/2022 | Piscopo et al. |
| 2022/0197302 A1 | 6/2022 | McClelland et al. |
| 2022/0204051 A1 | 6/2022 | Rands et al. |
| 2022/0204052 A1 | 6/2022 | Creaby et al. |
| 2022/0206512 A1 | 6/2022 | Rands et al. |
| 2022/0207852 A1 | 6/2022 | Sharma et al. |
| 2022/0225568 A1 | 7/2022 | Toniges et al. |
| 2022/0232763 A1 | 7/2022 | Palla et al. |
| 2022/0232770 A1 | 7/2022 | Yanke et al. |
| 2022/0256770 A1 | 8/2022 | Faust et al. |
| 2022/0304227 A1 | 9/2022 | Hill et al. |
| 2022/0304231 A1 | 9/2022 | Faust et al. |
| 2022/0374026 A1 | 11/2022 | Vougioukas et al. |
| 2022/0382277 A1 | 12/2022 | Nishii et al. |
| 2022/0408645 A1 | 12/2022 | O'Connor et al. |
| 2022/0410704 A1 | 12/2022 | O'Connor et al. |
| 2023/0027697 A1 | 1/2023 | Rush |
| 2023/0031013 A1 | 2/2023 | Faust et al. |
| 2023/0035890 A1 | 2/2023 | McKinney et al. |
| 2023/0041687 A1 | 2/2023 | Kormann |
| 2023/0189708 A1* | 6/2023 | Hunt ..................... G01F 23/296 460/1 |
| 2023/0232739 A1 | 7/2023 | Vandike et al. |
| 2023/0247939 A1 | 8/2023 | Vandike et al. |
| 2023/0255143 A1 | 8/2023 | Vandike et al. |

FOREIGN PATENT DOCUMENTS

| | | | |
|---|---|---|---|
| BR | 6800140 U | 12/1989 | |
| BR | PI0502658 A | 2/2007 | |
| BR | PI0802384 A2 | 3/2010 | |
| BR | PI1100258 A2 | 3/2014 | |
| BR | 102014007178 A2 | 8/2016 | |
| BR | 102019000830 A2 * | 7/2020 | ............ A01D 75/28 |
| CA | 1165300 A | 4/1984 | |
| CA | 2283767 A1 | 3/2001 | |
| CA | 2330979 A1 | 8/2001 | |
| CA | 2629555 A1 | 11/2009 | |
| CA | 135611 S | 5/2011 | |
| CA | 3081383 A1 | 5/2019 | |
| CN | 2451633 Y | 10/2001 | |
| CN | 101236188 | 8/2008 | |
| CN | 100416590 C | 9/2008 | |
| CN | 101303338 A | 11/2008 | |
| CN | 101363833 A | 2/2009 | |
| CN | 201218789 | 4/2009 | |
| CN | 201218789 Y | 4/2009 | |
| CN | 201528545 U | 7/2010 | |
| CN | 101839906 A | 9/2010 | |
| CN | 101929166 A | 12/2010 | |
| CN | 102080373 A | 6/2011 | |
| CN | 102138383 A | 8/2011 | |
| CN | 102277867 B | 12/2011 | |
| CN | 202110103 U | 1/2012 | |
| CN | 202119772 U | 1/2012 | |
| CN | 102564528 A | 7/2012 | |
| CN | 202340435 U | 7/2012 | |
| CN | 103088807 A | 5/2013 | |
| CN | 103181263 A | 7/2013 | |
| CN | 203053961 U | 7/2013 | |
| CN | 203055121 U | 7/2013 | |
| CN | 203206739 U | 9/2013 | |
| CN | 203275401 U | 11/2013 | |
| CN | 203613525 U | 5/2014 | |
| CN | 203658201 U | 6/2014 | |
| CN | 103954738 A | 7/2014 | |
| CN | 203741803 U | 7/2014 | |
| CN | 104247607 B | 12/2014 | |
| CN | 204000818 U | 12/2014 | |
| CN | 204435344 U | 7/2015 | |
| CN | 204475304 U | 7/2015 | |
| CN | 105205248 A | 12/2015 | |
| CN | 204989174 U | 1/2016 | |
| CN | 105432228 A | 3/2016 | |
| CN | 105741180 A | 7/2016 | |
| CN | 106053330 A | 10/2016 | |
| CN | 106198877 A | 12/2016 | |

(56) References Cited

FOREIGN PATENT DOCUMENTS

| | | | |
|---|---|---|---|
| CN | 106198879 A | 12/2016 |
| CN | 106226470 A | 12/2016 |
| CN | 106248873 A | 12/2016 |
| CN | 106290800 A | 1/2017 |
| CN | 106327349 A | 1/2017 |
| CN | 106644663 A | 5/2017 |
| CN | 206330815 U | 7/2017 |
| CN | 206515118 U | 9/2017 |
| CN | 206515119 U | 9/2017 |
| CN | 206616118 U | 11/2017 |
| CN | 206696107 | 12/2017 |
| CN | 206696107 U | 12/2017 |
| CN | 107576674 | 1/2018 |
| CN | 107576674 A | 1/2018 |
| CN | 206906093 U | 1/2018 |
| CN | 206941558 | 1/2018 |
| CN | 206941558 U | 1/2018 |
| CN | 107736088 A | 2/2018 |
| CN | 107795095 A | 3/2018 |
| CN | 207079558 | 3/2018 |
| CN | 107941286 A | 4/2018 |
| CN | 107957408 A | 4/2018 |
| CN | 108009542 A | 5/2018 |
| CN | 108304796 A | 7/2018 |
| CN | 207567744 U | 7/2018 |
| CN | 108614089 A | 10/2018 |
| CN | 208013131 U | 10/2018 |
| CN | 108881825 A | 11/2018 |
| CN | 208047351 U | 11/2018 |
| CN | 109392426 A | 1/2019 |
| CN | 109357804 A | 2/2019 |
| CN | 109485353 A | 3/2019 |
| CN | 109633127 A | 4/2019 |
| CN | 109763476 A | 5/2019 |
| CN | 109961024 A | 7/2019 |
| CN | 110262287 A | 9/2019 |
| CN | 110720302 A | 1/2020 |
| CN | 111201879 A | 5/2020 |
| CN | 210585958 U | 5/2020 |
| CN | 111406505 A | 7/2020 |
| CN | 114846991 A | 8/2022 |
| CN | 114915637 A | 8/2022 |
| CN | 115067061 A | 9/2022 |
| CN | 115280960 A | 11/2022 |
| CN | 115643895 A | 1/2023 |
| CS | 247426 B1 | 12/1986 |
| CS | 248318 B1 | 2/1987 |
| CZ | 17266 U1 | 2/2007 |
| CZ | 20252 U1 | 11/2009 |
| DE | 441597 C | 3/1927 |
| DE | 504035 C | 7/1930 |
| DE | 2354828 A1 | 5/1975 |
| DE | 152380 | 11/1981 |
| DE | 3728669 A1 | 3/1989 |
| DE | 4431824 C1 | 5/1996 |
| DE | 19509496 A1 | 9/1996 |
| DE | 19528663 A1 | 2/1997 |
| DE | 19718455 A1 | 11/1997 |
| DE | 19705842 A1 | 8/1998 |
| DE | 19828355 A1 | 1/2000 |
| DE | 10050224 A1 | 4/2002 |
| DE | 10120173 A1 | 10/2002 |
| DE | 202004015141 U1 | 12/2004 |
| DE | 102005000770 B3 | 7/2006 |
| DE | 102005000771 A1 | 8/2006 |
| DE | 102008021785 A1 | 11/2009 |
| DE | 102009041646 A1 | 3/2011 |
| DE | 102010004648 A1 | 7/2011 |
| DE | 102010038661 A1 | 2/2012 |
| DE | 102011005400 A1 | 9/2012 |
| DE | 202012103730 U1 | 10/2012 |
| DE | 102011052688 A1 | 2/2013 |
| DE | 102012211001 A1 | 1/2014 |
| DE | 102012220109 | 5/2014 |
| DE | 102012223768 | 6/2014 |
| DE | 102013212151 A1 | 12/2014 |
| DE | 102013012027 A1 | 1/2015 |
| DE | 102013019098 B3 | 1/2015 |
| DE | 102014108449 A1 | 2/2015 |
| DE | 102011005400 B4 | 5/2015 |
| DE | 2014201203 A1 | 7/2015 |
| DE | 102014208068 A1 | 10/2015 |
| DE | 102015006398 B3 | 5/2016 |
| DE | 102015109799 A1 | 12/2016 |
| DE | 112015002194 T5 | 1/2017 |
| DE | 102017204511 A1 | 9/2018 |
| DE | 102019206734 A1 | 11/2020 |
| DE | 102019114872 A1 | 12/2020 |
| DE | 102011052688 B4 | 2/2021 |
| DE | 102020124508 A1 | 3/2022 |
| EP | 0070219 B1 | 10/1984 |
| EP | 0355049 A2 | 2/1990 |
| EP | 845198 B2 | 6/1998 |
| EP | 0532146 B1 | 8/1998 |
| EP | 1219153 A2 | 7/2002 |
| EP | 1219159 A1 | 7/2002 |
| EP | 1444879 A1 | 8/2004 |
| EP | 1219159 B1 | 6/2005 |
| EP | 1219153 B1 | 2/2006 |
| EP | 1674324 A1 | 6/2006 |
| EP | 1692928 A2 | 8/2006 |
| EP | 1574122 B1 | 2/2008 |
| EP | 1609349 B1 | 5/2008 |
| EP | 1943877 A2 | 7/2008 |
| EP | 2057884 A1 | 5/2009 |
| EP | 1598586 B1 | 9/2009 |
| EP | 1731983 B1 | 9/2009 |
| EP | 2146307 A2 | 1/2010 |
| EP | 2174537 A1 | 4/2010 |
| EP | 2186389 A1 | 5/2010 |
| EP | 2267566 A2 | 12/2010 |
| EP | 3491192 A2 | 12/2010 |
| EP | 2057884 B1 | 1/2011 |
| EP | 2359674 B1 | 8/2011 |
| EP | 2301318 B1 | 11/2011 |
| EP | 2146307 B1 | 5/2012 |
| EP | 2446732 A1 | 5/2012 |
| EP | 2508057 A1 | 10/2012 |
| EP | 2524586 A2 | 11/2012 |
| EP | 2529610 A1 | 12/2012 |
| EP | 2243353 B1 | 3/2013 |
| EP | 2174537 B1 | 5/2013 |
| EP | 2592919 A1 | 5/2013 |
| EP | 2621258 A1 | 8/2013 |
| EP | 1674324 B2 | 5/2014 |
| EP | 2759829 A1 | 7/2014 |
| EP | 2786325 A1 | 10/2014 |
| EP | 2267566 A3 | 12/2014 |
| EP | 2829171 A2 | 1/2015 |
| EP | 2191439 B1 | 3/2015 |
| EP | 2586286 B1 | 3/2015 |
| EP | 2592919 B1 | 9/2015 |
| EP | 2921042 A1 | 9/2015 |
| EP | 2944725 A1 | 11/2015 |
| EP | 2764764 B1 | 12/2015 |
| EP | 2510777 B1 | 3/2016 |
| EP | 3000302 A1 | 3/2016 |
| EP | 2868806 B1 | 7/2016 |
| EP | 3085221 A1 | 10/2016 |
| EP | 3095310 A1 | 11/2016 |
| EP | 3097759 A1 | 11/2016 |
| EP | 2452551 B1 | 5/2017 |
| EP | 3175691 A1 | 6/2017 |
| EP | 3195719 A1 | 7/2017 |
| EP | 3195720 A1 | 7/2017 |
| EP | 2995191 B1 | 10/2017 |
| EP | 3259976 A1 | 12/2017 |
| EP | 3262934 A1 | 1/2018 |
| EP | 3491192 A1 | 1/2018 |
| EP | 3287007 A1 | 2/2018 |
| EP | 3298876 A1 | 3/2018 |
| EP | 3300579 A1 | 4/2018 |
| EP | 3315005 A1 | 5/2018 |
| EP | 3315006 A1 | 5/2018 |

(56) References Cited

FOREIGN PATENT DOCUMENTS

| | | |
|---|---|---|
| EP | 3315007 A1 | 5/2018 |
| EP | 3316208 A1 | 5/2018 |
| EP | 3316218 A1 | 5/2018 |
| EP | 2829171 B1 | 6/2018 |
| EP | 2508057 | 7/2018 |
| EP | 2508057 B1 | 7/2018 |
| EP | 3378298 A1 | 9/2018 |
| EP | 3378299 A1 | 9/2018 |
| EP | 2997805 A1 | 10/2018 |
| EP | 3384754 A1 | 10/2018 |
| EP | 3289853 B1 | 3/2019 |
| EP | 3448145 B1 | 3/2019 |
| EP | 3456167 A1 | 3/2019 |
| EP | 3466239 A1 | 4/2019 |
| EP | 3469878 A1 | 4/2019 |
| EP | 3289852 B1 | 6/2019 |
| EP | 3494770 A1 | 6/2019 |
| EP | 3498074 A1 | 6/2019 |
| EP | 3000302 B1 | 8/2019 |
| EP | 3533314 A1 | 9/2019 |
| EP | 3569049 A1 | 11/2019 |
| EP | 3000307 B1 | 12/2019 |
| EP | 3586592 A2 | 1/2020 |
| EP | 3593613 A1 | 1/2020 |
| EP | 3593620 A1 | 1/2020 |
| EP | 3448144 B1 | 2/2020 |
| EP | 3613272 A1 | 2/2020 |
| EP | 3243374 B1 | 3/2020 |
| EP | 3626038 A1 | 3/2020 |
| EP | 3259976 B1 | 4/2020 |
| EP | 3635647 A1 | 4/2020 |
| EP | 3378298 B1 | 5/2020 |
| EP | 3646699 A1 | 5/2020 |
| EP | 3662741 A1 | 6/2020 |
| EP | 3685648 A1 | 7/2020 |
| EP | 2995191 B2 | 10/2020 |
| EP | 2812267 B1 | 2/2021 |
| EP | 3847878 A1 | 7/2021 |
| EP | 3706544 B1 | 12/2021 |
| EP | 3970471 A1 | 3/2022 |
| EP | 3315005 B1 | 4/2022 |
| ES | 2116215 A1 | 7/1998 |
| ES | 2311322 A1 | 2/2009 |
| FI | 5533 A | 11/1913 |
| FR | 1451480 | 1/1966 |
| FR | 2817344 | 5/2002 |
| FR | 2901291 A | 11/2007 |
| FR | 2901291 A1 | 11/2007 |
| GB | 901081 A | 7/1962 |
| GB | 2517049 A | 2/2015 |
| GB | 201519517 A1 | 5/2017 |
| IN | 1632 | 8/2016 |
| IN | 01632DE2014 A | 8/2016 |
| IN | 201641027017 A | 10/2016 |
| IN | 202041039250 A | 9/2020 |
| IN | 202241032643 A | 6/2022 |
| JP | 7079681 A | 11/1982 |
| JP | S60253617 A | 12/1985 |
| JP | S63308110 A | 12/1988 |
| JP | H02196960 A | 8/1990 |
| JP | H02215311 A | 8/1990 |
| JP | H0779681 A | 3/1995 |
| JP | H1066436 A | 3/1998 |
| JP | H10191762 A | 7/1998 |
| JP | 2000352044 | 12/2000 |
| JP | 2001057809 A | 3/2001 |
| JP | 2002186348 A | 7/2002 |
| JP | 2005227233 A | 8/2005 |
| JP | 2006166871 A | 6/2006 |
| JP | 2011205967 A | 10/2011 |
| JP | 2015070812 A | 4/2015 |
| JP | 2015084667 A | 5/2015 |
| JP | 2015151826 A | 8/2015 |
| JP | 2015219651 A | 12/2015 |
| JP | 2016071726 A | 5/2016 |
| JP | 2016160808 A | 9/2016 |
| JP | 6087258 B2 | 3/2017 |
| JP | 2017136035 A | 8/2017 |
| JP | 2017137729 A | 8/2017 |
| JP | 2017195804 A | 11/2017 |
| JP | 2018068284 A | 5/2018 |
| JP | 2018102154 A | 7/2018 |
| JP | 2018151388 A | 9/2018 |
| JP | 2019004796 A | 1/2019 |
| JP | 2019129744 A | 8/2019 |
| JP | 2019146506 A | 9/2019 |
| JP | 2019216744 A | 12/2019 |
| JP | 2020018255 A | 2/2020 |
| JP | 2020031607 A | 3/2020 |
| JP | 2020113062 A | 7/2020 |
| JP | 2020127405 A | 8/2020 |
| JP | 2021069341 A | 5/2021 |
| JP | 2022141070 A | 9/2022 |
| KR | 100974892 | 8/2010 |
| KR | 100974892 B1 | 8/2010 |
| KR | 20110018582 A | 2/2011 |
| KR | 101067576 B | 9/2011 |
| KR | 101067576 B1 | 9/2011 |
| KR | 101134075 B1 | 4/2012 |
| KR | 101447197 B1 | 10/2014 |
| KR | 101653750 | 9/2016 |
| KR | 20170041377 A | 4/2017 |
| KR | 200485051 Y | 11/2017 |
| KR | 200485051 Y1 | 11/2017 |
| KR | 101873657 B | 8/2018 |
| MX | GT06000012 A | 1/2008 |
| PL | 178299 B1 | 4/2000 |
| RO | 130713 | 11/2015 |
| RU | 1791767 C | 1/1993 |
| RU | 2005102554 A | 7/2006 |
| RU | 2421744 C | 6/2011 |
| RU | 2421744 C1 | 6/2011 |
| RU | 2447640 C1 | 4/2012 |
| RU | 2502047 C | 12/2013 |
| RU | 2502047 C1 | 12/2013 |
| RU | 2529905 C2 | 10/2014 |
| RU | 164128 | 8/2016 |
| RU | 2017114139 A | 10/2018 |
| RU | 2017114139 A3 | 5/2019 |
| SU | 834514 A1 | 5/1981 |
| SU | 887717 | 12/1981 |
| SU | 1052940 | 11/1983 |
| SU | 1134669 | 1/1985 |
| SU | 1526588 A1 | 12/1989 |
| SU | 1540053 A1 | 1/1991 |
| SU | 1761864 A1 | 9/1992 |
| UA | 90246 C2 | 4/2010 |
| WO | 1986005353 A1 | 9/1986 |
| WO | 2001052160 A1 | 7/2001 |
| WO | 2002015673 A1 | 2/2002 |
| WO | 2003005803 A1 | 1/2003 |
| WO | 2007050192 A2 | 5/2007 |
| WO | 2009156542 A1 | 12/2009 |
| WO | 2010003421 A1 | 1/2010 |
| WO | 2011104085 A1 | 9/2011 |
| WO | 2012041621 A1 | 4/2012 |
| WO | 2012110508 A1 | 8/2012 |
| WO | 2012110544 A1 | 8/2012 |
| WO | 2013063106 A2 | 5/2013 |
| WO | 2013079247 A1 | 6/2013 |
| WO | 2013086351 A1 | 6/2013 |
| WO | 2013087275 A1 | 6/2013 |
| WO | 2013120079 A1 | 8/2013 |
| WO | 2013141975 A2 | 9/2013 |
| WO | 2013151619 A2 | 10/2013 |
| WO | 2013162673 A2 | 10/2013 |
| WO | 2013184177 A2 | 12/2013 |
| WO | 2013184178 A2 | 12/2013 |
| WO | 2014046685 A1 | 3/2014 |
| WO | 2014093814 A1 | 6/2014 |
| WO | 2014116819 A1 | 7/2014 |
| WO | 2014195302 A1 | 12/2014 |
| WO | 2015038751 A1 | 3/2015 |
| WO | 2015153809 A1 | 10/2015 |

(56) References Cited

FOREIGN PATENT DOCUMENTS

| | | |
|---|---|---|
| WO | 16020595 A1 | 2/2016 |
| WO | 2016020595 A1 | 2/2016 |
| WO | 2016118686 A1 | 7/2016 |
| WO | 2017008161 A1 | 1/2017 |
| WO | 2017060168 A1 | 4/2017 |
| WO | 2017077113 A1 | 5/2017 |
| WO | 2017096489 A1 | 6/2017 |
| WO | 2017099570 A1 | 6/2017 |
| WO | 2017116913 A1 | 7/2017 |
| WO | 2017170507 A1 | 10/2017 |
| WO | 2017205406 A1 | 11/2017 |
| WO | 2017205410 A1 | 11/2017 |
| WO | 2018043336 A1 | 3/2018 |
| WO | 2018073060 A1 | 4/2018 |
| WO | 2018081759 A1 | 5/2018 |
| WO | 2018112615 | 6/2018 |
| WO | 2018116772 A1 | 6/2018 |
| WO | WO2018112615 A1 | 6/2018 |
| WO | 2018142768 A1 | 8/2018 |
| WO | 2018185522 A1 | 10/2018 |
| WO | 2018200870 A1 | 11/2018 |
| WO | 2018226587 A1 | 11/2018 |
| WO | 2018220159 A1 | 12/2018 |
| WO | 2018226139 A1 | 12/2018 |
| WO | 2018235486 A1 | 12/2018 |
| WO | 2018235942 A1 | 12/2018 |
| WO | WO18235486 A1 | 12/2018 |
| WO | 2019034213 A1 | 2/2019 |
| WO | 2019079205 A1 | 4/2019 |
| WO | 2019081349 A1 | 5/2019 |
| WO | 2019091535 A1 | 5/2019 |
| WO | 2019109191 A1 | 6/2019 |
| WO | 2019124174 A1 | 6/2019 |
| WO | 2019124217 A1 | 6/2019 |
| WO | 2019124225 A1 | 6/2019 |
| WO | 2019124273 A1 | 6/2019 |
| WO | 2019129333 A1 | 7/2019 |
| WO | 2019129334 A1 | 7/2019 |
| WO | 2019129335 A1 | 7/2019 |
| WO | 2019215185 A1 | 11/2019 |
| WO | 2019230358 A1 | 12/2019 |
| WO | 2020026578 A1 | 2/2020 |
| WO | 2020026650 A1 | 2/2020 |
| WO | 2020026651 A1 | 2/2020 |
| WO | 2020031473 A1 | 2/2020 |
| WO | 2020038810 A1 | 2/2020 |
| WO | 2020039312 A1 | 2/2020 |
| WO | 2020039671 A1 | 2/2020 |
| WO | 2020044726 A1 | 3/2020 |
| WO | 2020082182 A1 | 4/2020 |
| WO | WO202082182 A1 | 4/2020 |
| WO | 2020100810 A1 | 5/2020 |
| WO | 2020110920 A1 | 6/2020 |
| WO | 2020195007 A1 | 10/2020 |
| WO | 2020206941 A1 | 10/2020 |
| WO | 2020206942 A1 | 10/2020 |
| WO | 2020210607 A1 | 10/2020 |
| WO | 2020221981 A1 | 11/2020 |
| WO | WO21049098 A1 | 3/2021 |
| WO | 2021262500 A1 | 12/2021 |
| WO | WO21246384 A1 | 12/2021 |
| WO | 2022118572 A1 | 6/2022 |
| WO | WO22130038 A1 | 6/2022 |
| WO | WO22130039 A1 | 6/2022 |
| WO | WO22268779 A2 | 12/2022 |

OTHER PUBLICATIONS

Cordoba, M.A., Bruno, C.I. Costa, J.L. Peralta, N.R. and Balzarini, M.G., 2016, Protocol for multivariate homogeneous zone delineation in precision agriculture, biosystems engineering, 143, pp. 95-107.

Pioneer Estimator, "Corn Yield Estimator" accessed on Feb. 13, 2018, 1 page. retrieved from: https://www.pioneer.com/home/site/us/tools-apps/growing-tools/corn-yield-estimator/.

Guindin, N. "Estimating Maize Grain Yield From Crop Biophysical Parameters Using Remote Sensing", Nov. 4, 2013, 19 pages.

EP Application No. 19203883.4-1004 Office Action dated May 3, 2021, 4 pages.

Towa State University Extension and Outreach, "Harvest Weed Seed Control", Dec. 13, 2018, 6 pages. https://crops.extension.iastate.edu/blog/bob-hartzler/harvest-weed-seed-control.

Getting Rid of WeedsThrough Integrated Weed Management, accessed on Jun. 25, 2021, 10 pages. https://integratedweedmanagement.org/index.php/iwm-toolbox/the-harrington-seed-destructor.

The Importance of Reducing Weed Seeds, Jul. 2018, 2 pages. https://www.aphis.usda.gov/plant_health/soybeans/soybean-handouts.pdf.

Alternative Crop Guide, Published by the Jefferson Institute, "Buckwheat", Revised Jul. 2002. 4 pages.

Application and Drawings for U.S. Appl. No. 16/171,978, filed Oct. 26, 2018, 53 pages.

Notice of Allowance for U.S. Appl. No. 16/432,557 dated Mar. 22, 2021, 9 pages.

Zhao, L., Yang, J., Li, P. and Zhang, L., 2014. Characteristics analysis and classification of crop harvest patterns by exploiting high-frequency multipolarization SAR data. IEEE Journal of Selected Topics in Applied Earth Observations and Remote Sensing, 7(9), pp. 3773-3783.

Feng-Jie, X., Er-da, W. and Feng-yuan, X., Crop area yield risk evaluation and premium rates calculation-Based on nonparametric kernel density estimation. In 2009 International Conference on Management Science and Engineering, 7 pages.

Liu, R. and Bai, X., 2014, May. Random fuzzy production and distribution plan of agricultural products and its PSO algorithm. In 2014 IEEE International Conference on Progress in Informatics and Computing (pp. 32-36). IEEE.

Notice of Allowance for U.S. Appl. No. 16/171,978 dated Mar. 31, 2021, 6 pages.

Application and Drawings for U.S. Appl. No. 17/067,383, filed Oct. 9, 2020, 61 pages.

Prosecution History for U.S. Appl. No. 16/380,691 including: Notice of Allowance dated Mar. 10, 2021 and Application and Drawings filed Apr. 10, 2019, 46 pages.

U.S. Appl. No. 16/831,216 Application and Drawings filed Mar. 26, 2020, 56 pages.

Notice of Allowance for U.S. Appl. No. 16/380,531 dated Apr. 5, 2021, 5 pages.

Final Office Action for U.S. Appl. No. 16/384,425 dated Oct. 21, 2022, 11 pages.

U.S. Appl. No. 17/584,966 Office Action dated Nov. 13, 2023, 14 pages.

Prosecution History for U.S. Appl. No. 16/384,425 including: Non-Final Office Action dated May 11, 2022, and Application and Drawings filed Apr. 15, 2019, 64 pages.

Leu et al., Grazing Corn Residue Using Resources and Reducing Costs, Aug. 2009, 4 pages.

"No-Till Soils", Soil Heath Brochure, 2 pages, last accessed Jul. 14, 2020.

Strickland et al., "Nitrate Toxicity in Livestock" Oklahoma State University, Feb. 2017, 2 pages.

Strickland et al., "Nitrate Toxicity in Livestock" Oklahoma State University, 8 pages, Feb. 2017.

Brownlee, "Neural Networks are Function Approximation Algorithms", Mar. 18, 2020, 13 pages.

Thompson, "Morning glory can make it impossible to harvest corn", Feb. 19, 2015, 3 pages.

Tumlison, "Monitoring Growth Development and Yield Estimation of Maize Using Very High-Resolution Uavimages in Gronau, Germany", Feb. 2017, 63 pages.

Hunt, "Mapping Weed Infestations Using Remote Sensing", 8 pages, Jul. 19, 2005.

Wright, et al., "Managing Grain Protein in Wheat Using Remote Sensing", 12 pages, 2003.

"Malting Barley in Pennsylvania", Agronomy Facts 77, 6 pages, Code EE0179 Jun. 2016.

(56) References Cited

OTHER PUBLICATIONS

"Green stem syndrome in soybeans", Agronomy eUpdate Issue 478 Oct. 10, 2014, 3 pages.
"Keep Weed Seed Out of Your Harvest", Aug. 8, 2019, 1 pages.
Hodrius et al., "The Impact of Multi-Sensor Data Assimilation on Plant Parameter Retrieval and Yield Estimation for Sugar Beet", The International Archives of the Photogrammetry, Remote Sensing and Spatial Information Sciences, vol. XL-7/W3, 2015, 36th International Symposium on Remote Sensing of Environment, May 11-15, 2015, Berlin, Germany, 7 pages.
Fernandez-Quintanilla et al., "Is the current state of the art of weed monitoring suitable for site-specific weed management in arable crops?", Feb. 2018, 35 pages.
Anonymously, "Improved System and Method for Controlling Agricultural Vehicle Operation Using Historical Data", Dec. 16, 2009, 8 pages.
Anonymously, "System and Method for Controlling Agricultural Vehicle Operation Using Historical Data", Jun. 30, 2009, 8 pages.
"Leafsnap, a new mobile app that identifies plants by leaf shape, is launched by Smithsonian and collaborators", May 2, 2011, 5 pages.
Insect Gallery, Department of Entomology, Kansas State University, Oct. 19, 2020, 8 pages.
Licht, "Influence of Corn Seeding Rate, Soil Attributes, and Topographic Characteristics on Grain Yield, Yield Components, and Grain Composition", 2015, 107 pages,.
"Notice of Retraction Virtual simulation of plant with individual stem based on crop growth model", Mar. 5, 2017, 7 pages.
Ma et al., "Identification of Fusarium Head Blight in Winter Wheat Ears Using Continuous Wavelet Analysis", Dec. 19, 2019, 15 pages.
Leland, "Who Did that? Identifying Insect Damage", Apr. 1, 2015, 4 pages.
"How to improve maize protein content" https://www.yara.co.uk/crop-nutrition/forage-maize/improving-maize-protein-content, Sep. 30, 2020, 10 pages.
Hafemeister, "Weed control at harvest, combines are ideal vehicles for spreading weed seeds", Sep. 25, 2019, 3 pages.
"Harvesting Tips", Northern Pulse Growers Association, 9 pages, Jan. 31, 2001.
Wortmann et al., "Harvesting Crop Residues", Aug. 10, 2020, 8 pages.
"Harvesting", Oklahoma State University, Canola Swathing Guide, 2010, 9 pages, last accessed Jul. 14, 2020.
Hanna, "Harvest Tips for Lodged Corn", Sep. 6, 2011, 3 pages.
"Green Weeds Complicate Harvest", Crops, Slider, Sep. 26, 2012, 2 pages.
"Agrowatch Green Vegetation Index", Retrieved Dec. 11, 2020, 4 pages.
"Grazing Corn Residues" (http://www.ca.uky.edu), 3 pages, Aug. 24, 2009.
Jarnevich et al., Forecasting Weed Distributions Using Climate Data: A GIS Early Warning Tool, Downloaded on Jul. 13, 2020, 12 pages.
Combine Cutting and Feeding Mechanisms in the Southeast, by J-K Park, Agricultural Research Service, U.S. Dept. of Agriculture, 1963, 1 page.
Hartzler, "Fate of weed seeds in the soil", 4 pages, Jan. 31, 2001.
Digman, "Combine Considerations for a Wet Corn Harvest", Extension SpecialistUW—Madison, 3 pages, Oct. 29, 2009.
S-Series Combine and Front End Equipment Optimization, John Deere Harvester Works, 20 pages Date: Oct. 9, 2017.
Determining yield monitoring system delay time with geostatistical and data segmentation approaches (https://www.ars.usda.gov/ARSUserFiles/50701000/cswq-0036-128359.pdf) Jul. 2002, 13 pages.
Precision Agriculture: Yield Monitors (dated Nov. 1998—metadata; last accessed Jul. 16, 2020) (https://extensiondata.missouri.edu/pub/pdf/envqual/wq0451.pdf) 4 pages.
Paul et al., "Effect of soil water status and strength on trafficability" (1979) (https://www.nrcresearchpress.com/doi/ pdfplus/10.4141/cjss79-035), 12 pages, Apr. 23, 1979.

Sick, "Better understanding corn hybrid characteristics and properties can impact your seed decisions" (https://emergence.fbn.com/agronomy/corn-hybrid-characteristics-and-properties-impact-seed-decisions) by Steve Sick, FBN Breeding Project Lead | Sep. 21, 2018, 8 pages.
Robertson et al., "Maize Stalk Lodging: Morphological Determinants of Stalk Strength" Mar. 2017, 10 pages.
Martin, et al., "Breakage Susceptibility and Hardness of Corn Kernels of Various Sizes and Shapes", May 1987, 10 Pages.
7 Combine Tweaks to Boost Speed (https://www.agriculture.com/machinery/harvest-equipment/7-combine-tweaks-to-boost-speed_203-ar33059) 8 pages, Aug. 19, 2018.
Managing corn harvest this fall with variable corn conditions (https://www.ocj.com/2019/10/managing-corn-harvest-this-fall-with-variable-corn-conditions/), 4 pages, Oct. 10, 2019.
Reducing Aflatoxin in Corn During Harvest and Storage (https://extension.uga.edu/publications/detail.html?number=B1231&title=Reducing%20Aflatoxin%20in%20Corn%20During%20Harvest%20and%20Storage), 9 pages, Published with Full Review on Apr. 19, 2017.
Variable Rate Applications to Optimize Inputs (https://www.cotton.org/tech/physiology/cpt/miscpubs/upload/CPT-v9No2-98-REPOP.pdf), 8 pages, Nov. 2, 1998.
Robin Booker, VIDEO: Canadian cage mill teams up with JD (https://www.producer.com/2019/12/video-canadian-cage-mill-teams-up-with-jd/) , 6 pages, Dec. 19, 2019.
Jarnevich, et al. "Forecasting Weed Distributions using Climate Data: A Gis Early Warning Tool", Invasive Plant Science and Management, 11 pages, Jan. 20, 2017.
Burks, "Classification of Weed Species Using Color Texture Features and Discriminant Analysis" (http://citeseerx.ist.psu.edu/viewdoc/download?doi=10.1.1.468.5833&rep=rep1&type=pdf), 8 pages, 2000.
John Deere, https://www.youtube.com/watch?v=1Gq77CfdGI4&list=PL1KGsSJ4CWk4rShNb3-sTMOliL8meHBL5 (last accessed Jul. 14, 2020), Jun. 15, 2020, 5 pages.
Combine Adjustments (http://corn.agronomy.wisc.edu/Management/L036.aspx), 2 pages, Originally written Feb. 1, 2006; last updated Oct. 18, 2018.
Ardekani, "Off- and on-ground GPR techniques for field-scale soil moisture mapping" Jun. 2013, 13 pages.
Does an Adaptive Gearbox Really Learn How You Drive? (https://practicalmotoring.com.au/voices/does-an-adaptive-gearbox-really-learn-how-you-drive/), Oct. 30, 2019, 8 pages.
https://www.researchgate.net/publication/222527694_Energy_Requirement_Model_for_a_Combine_Harvester_Part_I_Development_of_Component Models, Abstract Only, Jan. 2005.
http://canola.okstate.edu/cropproduction/harvesting, 8 pages, Aug. 2011.
"Tips and Tricks of Harvesting High Moisture Grain", https://www.koenigequipment.com/blog/tips-and-tricks-of-harvesting-highmoisture-grain, 5 pages, last accessed Feb. 11, 2021.
Hoff, Combine Adjustements, Mar. 1943, 8 pages.
Haung et al., "Accurate Weed Mapping and Prescription Map Generation Based onFully Convolutional Networks Using UAV Imagery", 14 pages, Oct. 1, 2018.
Thompson, "Morning glory can make it impossible to harvest corn", Feb. 19, 2015, 4 pages.
Martin et al., "Breakage Susceptibility and Harness of Corn Kernels of Various Sizes and Shapes", May 1987, 10 pages.
Jones et al., "Brief history of agricultural systems modeling" Jun. 21, 2016, 15 pages.
Dan Anderson, "Brief history of agricultural systems modeling" 1 pages. Aug. 13, 2019.
A.Y. Şeflek, "Determining the Physico-Mechanical Characteristics of Maize Stalks Fordesigning Harvester", The Journal of Animal & Plant Sciences, 27(3): 2017, p. 855-860 ISSN: 1018-7081, Jun. 1, 2017.
Carmody, Paul, "Windrowing and harvesting", 8 pages Date: Feb. 3, 2010.
Dabney, et al., "Forage Harvest Representation in RUSLE2", Published Nov. 15, 2013, 17 pages.
John Deere S-Series Combines S760, S770, S780, S790 Brochure, 44 pages, Nov. 15, 2017.

(56) References Cited

OTHER PUBLICATIONS

Sekhon et al., "Stalk Bending Strength is Strongly Assoicated with Maize Stalk Lodging Incidence Across Multiple Environments", Jun. 20, 2019, 23 pages.
Thomison et al. "Abnormal Corn Ears", Apr. 28, 2015, 1 page.
Anderson, "Adjust your Combine to Reduce Damage to High Moisture Corn", Aug. 13, 2019, 11 pages.
Sumner et al., "Reducing Aflatoxin in Corn During Harvest and Storage", Reviewed by John Worley, Apr. 2017, 6 pages.
Sick, "Better understanding corn hybrid characteristics and properties can impact your seed decisions", 8 pages, Sep. 21, 2018.
TraCI/Change Vehicle State—SUMO Documentation, 10 pages, Retrieved Dec. 11, 2020.
Arnold, et al., Chapter 8. "Plant Growth Component", Jul. 1995, 41 pages.
Humburg, Chapter: "Combine Adjustments to Reduce Harvest Losses", 2019, South Dakota Board of Regents, 8 pages.
Hoff, "Combine Adjustments", Cornell Extension Bulletin 591, Mar. 1943, 10 pages.
University of Wisconsin, Corn Agronomy, Originally written Feb. 1, 2006 | Last updated Oct. 18, 2018, 2 pages.
University of Nebraska-Lincoln, "Combine Adjustments for Downed Corn—Crop Watch", Oct. 27, 2017, 5 pages.
"Combine Cleaning: Quick Guide to Removing Resistant Weed Seeds (Among Other Things)", Nov. 2006, 5 pages.
Dekalb, "Corn Drydown Rates", 7 pages, Aug. 4, 2020.
Mahmoud et al. Iowa State University, "Corn Ear Orientation Effects on Mechanical Damage and Forces on Concave", 1975, 6 pages.
Sindelar et al., Kansas State University, "Corn Growth & Development" Jul. 17, 2017, 9 pages.
Pannar, "Manage the Growth Stages of the Maize Plant With Pannar", Nov. 14, 2016, 7 pages.
He et al., "Crop residue harvest impacts wind erodibility and simulated soil loss in the Central Great Plains", Sep. 27, 2017, 14 pages.
Blanken, "Designing a Living Snow Fence for Snow Drift Control", Jan. 17, 2018, 9 pages.
Jean, "Drones give aerial boost to ag producers", Mar. 21, 2019, 4 pages.
Zhao et al., "Dynamics modeling for sugarcane sucrose estimation using time series satellite imagery", Jul. 27, 2017, 11 pages.
Brady, "Effects of Cropland Conservation Practices on Fish and Wildlife Habitat", Sep. 1, 2007, 15 pages.
Jasa, et al., "Equipment Adjustments for Harvesting Soybeans at 13%-15% Moisture", Sep. 15, 2017, 2 pages.
Bendig et al., "Estimating Biomass of Barley Using Crop Surface Models (CSMs) Derived from UAV-Based RGB Imaging", Oct. 21, 2014, 18 pages.
Robertson, et al., "Maize Stalk Lodging: Morphological Determinants of Stalk Strength", Mar. 3, 2017, 10 pages.
MacGowan et al. Purdue University, Corn and Soybean Crop Depredation by Wildlife, Jun. 2006, 14 pages.
Martinez-Feria et al., Iowa State University, "Corn Grain Dry Down in Field From Maturity to Harvest", Sep. 20, 2017, 3 pages.
Wrona, "Precision Agriculture's Value" Cotton Physiology Today, vol. 9, No. 2, 1998, 8 pages.
Zhang et al., "Design of an Optical Weed Sensor Using Plant Spectral Characteristics" Sep. 2000, 12 pages.
Hunt, et al., "What Weeds Can Be Remotely Sensed?", 5 pages, May 2016.
Pepper, "Does An Adaptive Gearbox Really Learn How You Drive?", Oct. 30, 2019, 8 pages.
Eggerl, "Optimization of Combine Processes Using Expert Knowledge and Methods of Artificial Intelligence", Oct. 7, 1982, 143 pages.
Sheely et al., "Image-Based, Variable Rate Plant Growth Regulator Application in Cotton at Sheely Farms in California", Jan. 6-10, 2003 Beltwide Cotton Conferences, Nashville, TN, 17 pages.
Kovacs et al., "Physical characteristics and mechanical behaviour of maize stalks for machine development", Apr. 23, 2019, 1-pages.
Anonymously, "Optimizing Crop Profit Across Multiple Grain Attributes and Stover", ip.com, May 26, 2009, 17 pages.
Breen, "Plant Identification: Examining Leaves", Oregon State University, 2020, 8 pages.
Caglayan et al., A Plant Recognition Approach Using Shape and Color Features in Leaf Images, Sep. 2013, 11 pages.
Casady et al., "Precision Agriculture" Yield Monitors University of Missouri-System, 4 pages, 1998.
Apan et al., "Predicting Grain Protein Content in Wheat Using Hyperspectral Sensing of In-season Crop Canopies and Partial Least Squares Regression" 18 pages, 2006.
Xu et al., "Prediction of Wheat Grain Protein by Coupling Multisource Remote Sensing Imagery and ECMWF Data", Apr. 24, 2020, 21 pages.
Day, "Probability Distributions of Field Crop Yields," American Journal of Agricultural Economics, vol. 47, Issue 3, Aug. 1965, Abstract Only, 1 page.
Butzen, "Reducing Harvest Losses in Soybeans", Pioneer, Jul. 23, 2020, 3 pages.
Martin et al., "Relationship between secondary variables and soybean oil and protein concentration", Abstract Only, 1 page., 2007.
Torres, "Precision Planting of Maize" Dec. 2012, 123 pages.
Application and Drawings for U.S. Appl. No. 16/175,993, filed Oct. 31, 2018, 28 pages.
Application and Drawings for U.S. Appl. No. 16/380,623, filed Apr. 10, 2019, 36 pages.
Application and Drawings for U.S. Appl. No. 16/783,511, filed Feb. 6, 2020, 55 pages.
"Automated Weed Detection With Drones" dated May 25, 2017, retrieved at: <<https://www.precisionhawk.com/blog/media/topic/automated-weed-identification-with-drones>>, retrieved on Jan. 21, 2020, 4 pages.
F. Forcella, "Estimating the Timing of Weed Emergence", Site-Specific Management Guidelines, retrieved at: <<http://www.ipni.net/publication/ssmg.nsf/0/D26EC9A906F9B8C9852579E500773936/$FILE/SSMG-20.pdf>>, retrieved on Jan. 21, 2020, 4 pages.
Chauhan et al., "Emerging Challenges and Opportunities for Education and Research in Weed Science", frontiers in Plant Science. Published online Sep. 5, 2017, 22 pages.
Apan, A., Wells , N., Reardon-Smith, K, Richardson, L, McDougall, K, and Basnet, B.B., 2008. Predictive mapping of blackberry in the Condamine Catchment using logistic regression and spatial analysis. In Proceedings of the 2008 Queensland Spatial Conference: Global Warning: What's Happening in Paradise. Spatial Sciences Institute, 11 pages.
Jarnevich, C.S., Holcombe, T.R., Barnett, D.T., Stohlgren, T.J. and Kartesz, J.T., 2010. Forecasting weed distributions using climate data: a GIS early warning tool. Invasive Plant Science and Management. 3(4), pp. 365-375.
Sa et al., "WeedMap: A Large-Scale Semantic Weed Mapping Framework Using Aerial Multispectral Imaging and Deep Neural Network for Precision Farming", Sep. 6, 2018, 25 pages.
Pflanz et al., "Weed Mapping with UAS Imagery and a Bag of Visual Words Based Image Classifier", Published Sep. 24, 2018, 28 pages.
Drawings for U.S. Appl. No. 62/928,964, filed Oct. 31, 2019, 14 pages.
Application and Drawings for U.S. Appl. No. 16/783,475, filed Feb. 6, 2020, 55 pages.
U.S. Appl. No. 17/067,483 Application and Drawings as filed on Oct. 9, 2020, 63 pages.
U.S. Appl. No. 17/066,442 Application and Drawings as filed on Oct. 8, 2020, 65 pages.
U.S. Appl. No. 16/380,550, filed Apr. 10, 2019, Application and Drawings, 47 pages.
U.S. Appl. No. 17/066,999 Application and Drawings as filed on Oct. 9, 2020, 67 pages.
U.S. Appl. No. 17/066,444 Application and Drawings as filed on Oct. 8, 2020, 102 pages.
Extended Search Report for European Patent Application No. 20167930.5 dated Sep. 15, 2020, 8 pages.

(56) References Cited

OTHER PUBLICATIONS

Extended Search Report for European Patent Application No. 19205901.2 dated Mar. 17, 2020, 6 pages.
Notice of Allowance for U.S. Appl. No. 16/171,978, dated Dec. 15, 2020, 21 pages.
Zhigen et al., "Research of the Combine Harvester Load Feedback Control System Using Multi-Signal Fusion Method and Fuzzy Algorithm," 2010, Publisher: IEEE, 5 pages.
Dan et al., "On-the-go Throughput Prediction in a Combine Harvester Using Sensor Fusion," 2017, Publisher: IEEE, 6 pages.
Fernandez-Quintanilla et al., "Is the current state of the art of weed monitoring sutible for site-specific weed management in arable crops?", First Published May 1, 2018, 4 pages.
Dionysis Bochtis et al. "Field Operations Planning for Agricultural Vehicles: A Hierarchical Modeling Framework." Agricultural Engineering International: the CIGR Ejournal. Manuscript PM 06 021. Vol. IX. Feb. 2007, pp. 1-11.
U.S. Appl. No. 16/432,557, filed Jun. 5, 2019, 61 pages.
European Search Report issued in counterpart European Patent Application No. 19205142.3 dated Feb. 28, 2020 (6 pages).
Mei-Ju et al., "Two paradigms in cellular Internet-of-Things access for energy-harvesting machine-to-machine devices: push-based versus pull-based," 2016, vol. 6, 9 pages.
Yi et al., "An Efficient MAC Protocol With Adaptive Energy Harvesting for Machine-to-Machine Networks," 2015, vol. 3, Publisher: IEEE, 10 pages.
European Search Report issued in European Patent Application No. 19203883.4 dated Mar. 23, 2020 (10 pages).
Notice of Allowance for U.S. Appl. No. 16/171,978 dated Oct. 28, 2020, 5 pages.
Notice of Allowance for U.S. Appl. No. 16/171,978, dated Aug. 7, 2020, 9 pages.
K.R. Manjunath et al., "Developing Spectral Library of Major Plant Species of Western Himalayas Using Ground Observations", J. Indian Soc Remote Sen (Mar. 2014) 42(a):201-216, 17 pages.
U.S. Appl. No. 16/380,564 Application and Drawings as filed on Apr. 10, 2019, 55 pages.
S. Veenadhari et al., "Machine Learning Approach for Forecasting Crop Yield Based on Climatic Parameters", 2014 International Conference on Computer Communication and Informatics (ICCCI-2014) Jan. 3-6, 2014, Coimbatore, India, 5 pages.
Non-Final Office Action for U.S. Appl. No. 16/380,531 dated Oct. 21, 2020, 10 pages.
U.S. Appl. No. 16/380,531 Application and Drawings as filed on Apr. 10, 2019, 46 pages.
Extended European Search Report and Written Opinion issued in European Patent Application No. 22198061.8 (which is foreign counterpart application to U.S. Appl. No. 17/585,186), dated Jun. 27, 2023, in 07 pages.
Martin et al. Breakage Susceptibiltiy and Hardness of Corn Kernels of Various Sizes and Shapes, vol. 3(): May 1087, 10 pages. https://pdfs.semanticscholar.org/e579/1b5363b6a78efd44adfb97755a0cdd14f7ca.pdf.
Hoff, "Combine Adjustments" (https://smallfarmersjournal.com/combine-adjustments/), Mar. 1943, 9 pages.
Optimizing Crop Profit Across Multiple Grain Attributes and Stover, Electronic Publication Date May 26, 2009, 17 pages.
Unglesbee, Soybean Pod Shatter—Bad Enough to Scout Before Harvest—DTN, Oct. 17, 2018, 11 pages. Susceptibility to shatter (https://agfax.com/2018/10/17/soybean-pod-shatter-bad-enough-to-scout-before-harvest-dtn/).
GIS Maps for Agricultural, accessed on May 10, 2022, 7 pages. https://www.satimagingcorp.com/services/geographic-information-systems/gis-maps-agriculture-mapping.
https://wingtra.com/drone-mapping-applications/use-of-drones-in-agriculture, accessed on May 10, 2022, 19 pages.
Energy Requirement Model for a Combine Harvester: Part 1: Development of Component Models, Published online Dec. 22, 2004, 17 pages.
Energy Requirement Model for a Combine Harvester, Part 2: Integration of Component Models, Published online Jan. 18, 2005, 11 pages.
Pioneer on reducing soybean harvest losses including combine adjustments (last accessed Jul. 23, 2020) (https://www.pioneer.com/us/agronomy/reducing_harvest_losses_in_soybeans.html), 5 pages.
Notice of Allowance for U.S. Appl. No. 16/384,425 dated Dec. 13, 2022, 9 pages.
Lamsal et al. "Sugarcane Harvest Logistics in Brazil" Iowa Research Online, Sep. 11, 2013, 27 pages.
Jensen, "Algorithms for Operational Planning of Agricultural Field Operations", Mechanical Engineering Technical Report ME-TR-3, Nov. 9, 2012, 23 pages.
Chauhan, "Remote Sensing of Crop Lodging", Nov. 16, 2020, 16 pages.
Apan et al., "Predictive Mapping of Blackberry in the Condamine Catchment Using Logistic Regressiona dn Spatial Analysis", Jan. 2008, 12 pages.
Robson, "Remote Sensing Applications for the Determination of Yield, Maturity and Aflatoxin Contamination in Peanut", Oct. 2007, 275 pages.
Bhattarai et al., "Remote Sensing Data to Detect Hessian Fly Infestation in Commercial Wheat Fields", Apr. 16, 2019, 8 pages.
Towery, et al., "Remote Sensing of Crop Hail Damage", Jul. 21, 1975, 31 pages.
Sa et al., "WeedMap: A Large-Scale Semantic Weed Mapping Framework Using Aerial Multispectral Imaging and Deep Neural Network for Precision Farming", Sep. 7, 2018, 25 pages.
Mathyam et al., "Remote Sensing of Biotic Stress in Crop Plants and Its Applications for Pest Management", Dec. 2011, 30 pages.
Martinez-Feria et al., "Evaluating Maize and Soybean Grain Dry-Down in the Field With Predictive Algorithms and Genotype-by-Environmental Analysis", May 9, 2019, 13 pages.
"GIS Maps for Agriculture", Precision Agricultural Mapping, Retrieved Dec. 11, 2020, 6 pages.
Paul, "Scabby Wheat Grain? Increasing Your Fan Speed May Help", https://agcrops.osu.edu/newsletter/corn-newsletter/2015-20/scabby-wheat-grain-increasing-yourfan-speed-may-help, C.O.R.N Newsletter//2015-20, 3 pages.
Clay et al., "Scouting for Weeds", SSMG-15, 4 pages, 2002.
Taylor et al., "Sensor-Based Variable Rate Application for Cotton", 8 pages, 2010.
Christiansen et al., "Designing and Testing a UAV Mapping System for Agricultural Field Surveying", Nov. 23, 2017, 19 pages.
Haung et al., "AccurateWeed Mapping and Prescription Map Generation Based on Fully Convolutional Networks Using UAV Imagery", Oct. 1, 2018, 12 pages.
Morrison, "Should You Use Tillage to Control Resistant Weeds", Aug. 29, 2014, 9 pages.
Morrison, "Snow Trapping Snars Water", Oct. 13, 2005, 3 pages.
"Soil Zone Index", https://www.satimagingcorp.com/applications/natural-resources/agricultu . . . , Retrieved Dec. 11, 2020, 5 pages.
Malvic, "Soybean Cyst Nematode", University of Minnesota Extension, Oct. 19, 2020, 3 pages.
Unglesbee, "Soybean Pod Shatter—Bad Enough to Scout Before Harvest?—DTN", Oct. 17, 2018, 4 pages.
Tao, "Standing Crop Residue Can Reduce Snow Drifting and Increase Soil Moisture", 2 pages, last accessed Jul. 14, 2020.
Berglund, et al., "Swathing and Harvesting Canola", Jul. 2019, 8 pages.
Bell et al., "Synthetic Aperture Radar and Optical Remote Sensing of Crop Damage Attributed to Severe Weather in the Central United States", Jul. 25, 2018, 1 page.
Rosencrance, "Tabletop Grapes in India to Be Picked by Virginia Tech Robots", Jul. 23, 2020, 8 pages.
Lofton, et al., The Potential of Grazing Grain Sorghum Residue Following Harvest, May 13, 2020, 11 pages.
Beal et al., "Time Shift Evaluation to Improve Yield Map Quality", Published in Applied Engineering in Agriculture vol. 17(3): 385-390 (© American Society of Agricultural Engineers ), 9 pages.
"Tips and Tricks of Harvesting High Moisture Grain", https://www.koenigequipment.com/blog/tips-and-tricks-of-harvesting-highmoisture-grain, 7 pages, last accessed Jul. 14, 2020.

(56) References Cited

OTHER PUBLICATIONS

Ransom, "Tips for Planting Winter Wheat and Winter Rye (for Grain) (Aug. 15, 2019)", 2017, 3 pages.
AgroWatch Tree Grading Maps, "The Grading Maps and Plant Count Reports", https://www.satimagingcorp.com/applications/natural-resources/agricultu . . . , Retrieved Dec. 11, 2020, 4 pages.
Ackley, "Troubleshooting Abnormal Corn Ears", Jul. 23, 2020, 25 pages.
Smith, "Understanding Ear Flex", Feb. 25, 2019, 17 pages.
Carroll et al., "Use of Spectral Vegetation Indicies Derived from Airborne Hyperspectral Imagery for Detection of European Corn Borer Infestation in Iowa Corn Plots", Nov. 2008, 11 pages.
Agriculture, "Using drones in agriculture and capturing actionable data", Retrieved Dec. 11, 2020, 18 pages.
Bentley et al., "Using Landsat to Identify Thunderstorm Damage in Agricultural Regions", Aug. 28, 2001, 14 pages.
Duane Grant and the Idaho Wheat Commission, "Using Remote Sensing to Manage Wheat Grain Protein", Jan. 2, 2003, 13 pages.
Zhang et al., "Using satellite multispectral imagery for damage mapping of armyworm (*Spodoptera frugiperda*) in maize at a regional scale", Apr. 10, 2015, 14 pages.
Booker, "Video: Canadian cage mill teams up with JD", Dec. 19, 2019, 6 pages.
AgTalk Home, "Best Combine to Handle Weeds", Posted Nov. 23, 2018, 9 pages.
"Volunteer corn can be costly for soybeans", Jun. 2, 2016, 1 page.
Pflanz, et al., "Weed Mapping with UAS Imagery and a Bag of Visual Words Based Image Classifier", Published Sep. 24, 2018, 17 pages.
Hartzler, "Weed seed predation in agricultural fields", 9 pages, 2009.
Sa et al., "Weedmap: A Large-Scale Sematnic Weed Mapping Framework Using Aerial Multispectral Imaging and Deep Neural Netowrk for Precision Farming", Sep. 6, 2018, 25 pages.
Nagelkirk, Michigan State University-Extension, "Wheat Harvest: Minimizing the Risk of Fusarium Head Scab Losses", Jul. 11, 2013, 4 pages.
Saskatchewan, "Wheat: Winter Wheat", (https://www.saskatchewan.ca/business/agriculture-natural-resources-and-industry/agribusiness-farmers-and-ranchers/crops-and-irrigation/field-crops/cereals-barley-wheat-oats-triticale/wheat-winter-wheat) 5 pages, last accessed Jul. 14, 2020.
Quora, "Why would I ever use sport mode in my automatic transmission car? Will this incrase fuel efficiency or isit simply a feature that makes form more fun when driving?", Aug. 10, 2020, 5 pages.
Wade, "Using a Drone's Surface Model to Estimate Crop Yields & Assess Plant Health", Oct. 19, 2015, 14 pages.
Mathyam et al., "Remote Sensing of Biotic Stress in Crop Plants and Its Applications for Pest Stress", Dec. 2011, 30 pages.
"Four Helpful Weed-Management Tips for Harvest Time", 2 pages, Sep. 4, 2019.
Franz et al., "The role of topography, soil, and remotely sensed vegetation condition towards predicting crop yield", University of Nebraska—Lincoln, Mar. 23, 2020, 44 pages.
Peiffer et al., The Genetic Architecture of Maize Stalk Strength:, Jun. 20, 2013, 14 pages.

\* cited by examiner

SYSTEMS AND METHODS FOR PREDICTING MATERIAL DYNAMICS

FIELD OF THE DESCRIPTION

The present descriptions relates to mobile machines, particularly mobile machines configured to carry and transport material.

BACKGROUND

There are a wide variety of different mobile machines. Some mobile machines carry, receive, and transport materials. For example, an agricultural harvester includes a material receptacle, such as an on-board grain tank, which receives and holds harvested crop material. In other examples, a material transport machine includes a towing vehicle, such as a truck or a tractor, and a towed material receptacle, such as a grain cart or trailer. The towed material receptacle receives and holds material, such as harvested crop material, and is transported by the towing vehicle.

The discussion above is merely provided for general background information and is not intended to be used as an aid in determining the scope of the claimed subject matter.

SUMMARY

A first in-situ sensor detects a characteristic value as a mobile machine operates at a worksite. A second in-situ sensor detects a material dynamics characteristic value as the mobile machine operates at the worksite. A predictive model generator generates a predictive model that models a relationship between the characteristic and the materials dynamics characteristic based on the characteristic value detected by the first in-situ sensor and the material dynamics characteristic value detected by the second in-situ sensor. The predictive model can be output and used in automated machine control.

Example 1 is an agricultural system comprising:
a first in-situ sensor that detects a value of a characteristic;
a second in-situ sensor that detects a value of a material dynamics characteristic;
a predictive model generator that generates a predictive material dynamics model that models a relationship between characteristic values and material dynamics characteristic values based on the value of the characteristic detected by the first in-situ sensor and the value of the material dynamics characteristic detected by the second in-situ sensor; and
a control system that generates control signals to control a controllable subsystem of the mobile machine based on the predictive material dynamics model.

Example 2 is the agricultural system of any or all previous examples, wherein the second in-situ sensor comprises a material spill sensor that detects, as the value of the material dynamics characteristic, a value of a material spill characteristic.

Example 3 is the agricultural system of any or all previous examples, wherein the second in-situ sensor comprises a material movement sensor that detects, as the value of the material dynamics characteristic, a value of a material movement characteristic.

Example 4 is the agricultural system of any or all previous examples, wherein the first in-situ sensor detects, as the value of the characteristic, a machine orientation characteristic value corresponding to a geographic location, and wherein the predictive model generator is configured to identify a relationship between machine orientation characteristic values and material dynamics characteristic values based on the material dynamics characteristic value detected by the second in-situ sensor corresponding to the geographic location and the machine orientation characteristic value corresponding to the geographic location, the predictive material dynamics model being configured to receive a machine orientation characteristic value as a model input and generate a material dynamics characteristic value as a model output based on the identified relationship.

Example 5 is the agricultural system of any or all previous examples, wherein the first in-situ sensor detects, as the value of the characteristic, a machine speed characteristic value corresponding to a geographic location, and wherein the predictive model generator is configured to identify a relationship between machine speed characteristic values and material dynamics characteristic values based on the material dynamics characteristic value detected by the second in-situ sensor corresponding to the geographic location and the machine speed characteristic value corresponding to the geographic location, the predictive material dynamics model being configured to receive a machine speed characteristic value as a model input and generate a material dynamics characteristic value as a model output based on the identified relationship.

Example 6 is the agricultural system of any or all previous examples, wherein the first in-situ sensor detects, as the value of the characteristic, a crop moisture value corresponding to a geographic location, and wherein the predictive model generator is configured to identify a relationship between crop moisture values and material dynamics characteristic values based on the material dynamics characteristic value detected by the second in-situ sensor corresponding to the geographic location and the crop moisture value corresponding to the geographic location, the predictive material dynamics model being configured to receive a crop moisture value as a model input and generate a material dynamics characteristic value as a model output based on the identified relationship.

Example 7 is the agricultural system of any or all previous examples, wherein the first in-situ sensor detects, as the value of the characteristic, a material mass value corresponding to a geographic location, and wherein the predictive model generator is configured to identify a relationship between material mass values and material dynamics characteristic values based on the material dynamics characteristic value detected by the second in-situ sensor corresponding to the geographic location and the material mass value corresponding to the geographic location, the predictive material dynamics model being configured to receive a material mass value as a model input and generate a material dynamics characteristic value as a model output based on the relationship.

Example 8 is the agricultural system of any or all previous examples, wherein the first in-situ sensor detects, as the value of the characteristic, a material center of mass value corresponding to a geographic location, and wherein the predictive model generator is configured to identify a relationship between material center of mass values and material dynamics characteristic values based on the material dynamics characteristic value detected by the second in-situ sensor corresponding to the geographic location and the material center of mass value corresponding to the geographic location, the predictive material dynamics model being configured to receive a material center of mass value as a model input and generate a material dynamics characteristic value as a model output based on the relationship.

Example 9 is the agricultural system of any or all previous examples, wherein the first in-situ sensor detects, as the value of the characteristic, a fill level value corresponding to a geographic location, and wherein the predictive model generator is configured to identify a relationship between fill level values and material dynamics characteristic values based on the material dynamics characteristic value detected by the second in-situ sensor corresponding to the geographic location and the fill level value corresponding to the geographic location, the predictive material dynamics model being configured to receive a fill level value as a model input and generate a material dynamics characteristic value as a model output based on the identified relationship.

Example 10 is the agricultural system of any or all previous examples, wherein the first in-situ sensor comprises two or more in-situ characteristic sensors, wherein each one of the two or more in-situ characteristic sensors detect values of a respective characteristic corresponding to a geographic location, wherein the two or more in-situ characteristic sensors comprise two or more of:
  a machine orientation sensor that detects, as the value of the respective characteristic, a machine orientation characteristic value corresponding to the geographic location;
  a speed sensor that detects, as the value of the respective characteristic, a machine speed characteristic value corresponding to the geographic location;
  a crop moisture sensor that detects, as the value of the respective characteristic, a crop moisture value corresponding to the geographic location;
  a material dynamics sensor that detects, as the value of the respective characteristic, a material mass value corresponding to the geographic location;
  a material dynamics sensor that detects, as the value of the respective characteristic, a material center of mass value corresponding to the geographic location; and
  a fill level sensor that detects, as the value of the respective characteristic, a fill level value corresponding to the geographic location; and
  wherein the predictive model generator is configured to identify a relationship between two or more of machine orientation characteristic values, machine speed characteristic values, crop moisture values, material mass values, material center of mass values, and fill level values and material dynamics characteristic values based on the material dynamics characteristic value detected by the second in-situ sensor corresponding to the geographic location and one or more of the machine characteristic value, the machine speed characteristic value, the crop moisture value, the material mass value, the material center of mass value, and the fill level value, corresponding to the geographic location, the predictive material dynamics model being configured to receive one or more of a machine orientation characteristic value, a machine speed characteristic value, a crop moisture value, a material mass value, a material center of mass value, and a fill level value, as one or more model inputs, and generate a material dynamics characteristic value as a model output based on the identified relationship.

Example 11 is the agricultural system of any or all previous examples and further comprising:
  a predictive map generator configured to:
    obtain an information map that includes values of the characteristic corresponding to different geographic locations in the worksite; and
    generate a predictive material dynamics map of the worksite that maps predictive values of the material dynamics characteristic to the different geographic locations in the worksite based on the values of the characteristic in the information map and based on the predictive material dynamics model.

Example 12 is a computer implemented method of generating a predictive material dynamics model, comprising:
  detecting, with a first in-situ sensor, a value of a characteristic;
  detecting, with a second in-situ sensor, a value of a material dynamics characteristic; and
  generating the predictive material dynamics model that models a relationship between values of the characteristic and values of the material dynamics characteristic based on the value of the characteristic detected by the first in-situ sensor and the value of the material movement characteristic detected by the second in-situ sensor.

Example 13 is the computer implemented method of any or all previous examples, and further comprising:
  generating a control signal to control a controllable subsystem on a mobile machine based on the predictive material dynamics model.

Example 14 is the computer implemented method of any or all previous examples, wherein detecting, with the second in-situ sensor, the value of the material dynamics characteristic comprises detecting, with a material spill sensor, a value of a material spill characteristic corresponding to a geographic location; and
  wherein generating the predictive material dynamics model comprises generating, as the predictive material dynamics model, a predictive material spill model that models a relationship between values of the characteristic and values of the material spill characteristic based on the value of the characteristic detected by the first in-situ sensor corresponding to the geographic location and the value of the material spill characteristic detected by the material spill sensor corresponding to the geographic location.

Example 15 is the computer implemented method of any or all previous examples, wherein detecting, with the second in-situ sensor, the value of the material dynamics characteristic comprises detecting, with a material movement sensor, a value of a material movement characteristic corresponding to a geographic location; and
  wherein generating the predictive material dynamics model comprises generating, as the predictive material dynamics model, a predictive material movement model that models a relationship between values of the characteristic and values of the material movement characteristic based on the value of the characteristic detected by the first in-situ sensor corresponding to the geographic location and the value of the material movement characteristic detected by the material movement sensor corresponding to the geographic location.

Example 16 is the computer implemented method of any or all previous examples, wherein detecting, with the first in-situ sensor, the value of the characteristic comprises detecting a value of a machine orientation characteristic.

Example 17 is the computer implemented method of any or all previous examples, wherein detecting, with the first in-situ sensor, the value of the characteristic comprises detecting a value of a machine speed characteristic.

Example 18 is the computer implemented method of any or all previous examples, wherein detecting, with the first in-situ sensor, the value of the characteristic comprises detecting a value of crop moisture.

Example 19 is the computer implemented method of any or all previous examples, wherein detecting, with the first in-situ sensor, the value of the characteristic comprises detecting a value of material mass.

Example 20 is the computer implemented method of any or all previous examples, wherein detecting, with the first in-situ sensor, the value of the characteristic comprises detecting a value of material center of mass.

Example 21 is the computer implemented method of any or all previous examples, wherein detecting, with the first in-situ sensor, the value of the characteristic comprises detecting a value of fill level.

Example 22 is a mobile machine comprising:
- a first in-situ sensor that detects a characteristic value;
- a second in-situ sensor that detects a material dynamics characteristic value;
- a predictive model generator that generates a predictive material dynamics model that models a relationship between the characteristic and the material movement characteristic based on the characteristic value detected by the in-situ sensor and the material movement characteristic detected by the second in-situ sensor; and
- a control system that generates a control signal to control a controllable subsystem based on the predictive material dynamics model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
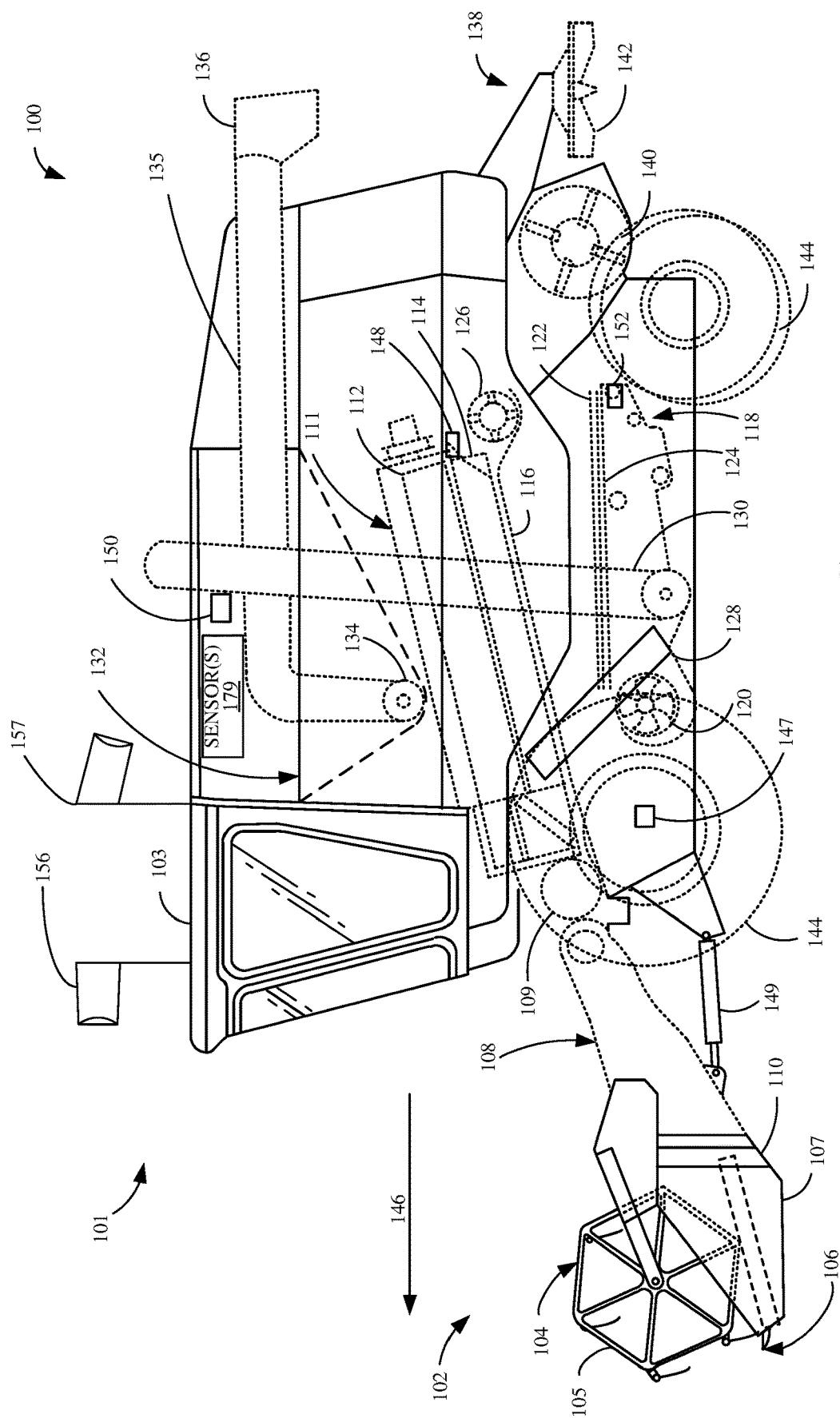
FIG. 1 is a partial pictorial, partial schematic illustration of one example of a mobile machine as an agricultural harvester.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

In one example, the present description relates to using in-situ data taken concurrently with an operation to generate a predictive model, such as a predictive material dynamics model, that models a relationship between different characteristics (or values thereof) represented in the in-situ data. In some examples, the predictive material dynamics model can be used to control a mobile machine. In one example, the predictive material dynamics model is in the form of a predictive material movement model. In another example, the predictive material dynamics model is in the form of a predictive material spill model.

In other examples, the present description relates to using in-situ data taken concurrently with an operation, in combination with prior or predicted data, such as prior or predicted data represented in a map, to generate a predictive model and a predictive map, such as a predictive material dynamics model and a predictive material dynamics map. In one example, the predictive material dynamics model is in the form of a predictive material movement model and the predictive material dynamics map is in the form of a predictive material movement map. In another example, the predictive material dynamics model is in the form of a predictive material spill model and the predictive material dynamics map is in the form of a predictive material spill map. In some examples, the predictive material dynamics map can be used to control a mobile machine.

As discussed above, some mobile machines receive, hold (e.g., carry), and transport material, such as harvested crop material (e.g., grain). These mobile machines include a material receptacle, such as grain tank or bin. As the mobile machine operates across a worksite, such as a field, the material held by the machines can have varying dynamics, for example, the material can shift its position in the material receptacle or can spill out of the material receptacle, or both. The shifting movement of the material can have deleterious effects on the performance of the mobile machine, such as creating instability of the mobile machine, increasing load on some components which can, among other things, affect traction, affect compaction, as well as affect various other performance factors. Additionally, spillage of the material can reduce profitability of the operation, increase waste, increase cost, such as from supplemental cleanup operations, as well as lead to undesired planting of volunteer crops. These are just some examples of the deleterious effects of material movement and material spillage.

Dynamics of the material, such as movement and spillage of the material, may be affected or caused by various factors. For example, operation of the machine, such as travel speed, acceleration, and deceleration can affect or cause material movement and spillage. Additionally, worksite factors, such as terrain characteristics, for instance, topography and slope can affect or cause material movement and spillage. For example, the topography and slope of the worksite affects the orientation (e.g., pitch and roll) of the mobile machine, which can affect or cause material movement and spillage. Further, material factors, such as moisture and size of the material, can affect or cause material movement and spillage. For example, the moisture and size of the material, such as the moisture and size of grain, can affect the angle of repose for a pile of material as it sits in the material receptacle. Thus, an increased or decreased angle of repose can make material movement and spillage more or less likely. These are merely some examples of the factors that can affect or cause movement and spillage of material.

In one example, the present description relates to material dynamics characteristics and values thereof, such as material spill characteristics and material spill characteristic values or material movement characteristics and material movement characteristic values, or both. Thus, as used herein, material spill characteristics and material movement characteristics are material dynamics characteristics.

In one example, the present description relates to obtaining a map such as a terrain map. The terrain map includes geolocated values of terrain characteristics (terrain characteristic values, sometimes referred to herein as terrain values) across different locations at a worksite. For example, the terrain map can include elevation values indicative of the elevation of the worksite at various locations, as well as slope values indicative of the slope of the worksite at various locations. Additionally, the terrain map can include machine orientation values indicative of the pitch or roll, or both, of the mobile machine at various locations at the worksite. The terrain map, and the values therein, can be based on historical data, such as data from previous operations at the worksite by the same mobile machine or by a different mobile machine. The terrain map, and the values therein, can be based on fly-over or satellite-based sensor data, such as LIDAR data of the worksite, as well as scouting data provided by a user or operator such as from a scouting operation of the worksite. The terrain map, and the values therein, can be a predictive terrain map with predictive terrain values, for instance, the machine orientation values at the different locations can be predicted based on the elevation and/or slope values at those different locations and based on the dimensions of the mobile machine. The terrain map, and the values therein, can be a combination of the aforementioned. These are merely some examples.

In one example, the present descriptions relate to obtaining a map such as a speed map. The speed map includes geolocated values of speed characteristics (speed characteristic values, sometimes referred to herein as speed values) of the mobile machine, such as travel speed values, accelera- tion values, and deceleration values. The speed map, and the values therein, can be a prescribed speed map that includes speed values that are prescribed for the particular operation, such as by an operator or user or a control system. The speed map, and the values therein, can be based on historical speed values from prior operations at the worksite such as prior operation by the same mobile machine or a different mobile machine. The speed map, and the values therein, can be a predictive speed map with predictive speed values. In one example, the predictive speed map is generated by obtaining a map, such as a yield map of the worksite, and a sensed speed, a sensed acceleration, and/or a sensed deceleration of the agricultural machine (such as speed data obtained from a data signal from a speed sensor) and determining a relationship between the obtained map, and the values therein, and the sensed speed data. The determined relationship, in combination with the obtained map, is used to generate a predictive speed map having predictive speed values. The speed map, and the values therein, can be a combination of the aforementioned. These are merely examples.

In one example, the present description relates to obtaining a map such as a crop moisture map. The crop moisture map includes geolocated crop moisture values of crop at the worksite. The crop moisture map, and the values therein, can be based on historical crop moisture values from prior operations at the worksite such as prior operations by the same mobile machine or a different mobile machine. The crop moisture map, and the values therein, can be a predictive crop moisture map with predictive crop moisture values. In one example, the predictive crop moisture values can be based on vegetative index (VI) values of the field, such as normalized different vegetative index (NDVI) values or leaf area index (LAI) values, generated during a survey of the field, such as a fly-over or satellite-based survey of the field. In another example, the predictive crop moisture map is generated by obtaining a map, such as a vegetative index map of the worksite, and a sensed crop moisture (such as crop moisture data obtained from a data signal from a crop moisture sensor) and determining a relationship between the obtained map, and the values therein, and the sensed crop moisture data. The determined relationship, in combination with the obtained map, is used to generate a predictive crop moisture map having predictive crop moisture values. The crop moisture map, and the values therein, can be a combination of the aforementioned. These are merely examples.

In one example, the present description relates to obtaining a map such as a fill level map. The fill level map includes geolocated fill level values of the material receptacle of the mobile machine at the worksite. The fill level map, and the values therein, can be based on other characteristic values of the worksite, such as yield values (e.g., as derived from NDVI data of the field) along with parameters of the mobile machines, such as a commanded travel path and capacity of the material receptacle. In one example, the predictive fill level map is generated by obtaining a map, such as a yield map of the worksite, and sensed fill level (such as fill level data obtained from a data signal from a fill level sensor, or other sensor) and determining a relationship between the obtained map, and the values therein, and the sensed fill level data. The determined relationship, in combination with the obtained map, is used to generate a predictive fill level map having predictive fill level values. In another example, the predictive fill level map is generated by obtaining a map, such as a yield map of the worksite having yield values for various locations at the worksite, and a sensed current fill level of the material receptacle of the mobile machine at a given location. Based on the current fill level and the yield value(s) (as provided by the yield map) in areas around the mobile machine, such as in areas in front of the mobile machine relative to its travel path, a predictive fill level map is generated that predicts fill level(s) in areas around the mobile machine, such as in areas ahead of mobile machine relative to its travel path. The fill level map, and the values therein, can be a combination of the aforementioned. These are merely examples.

In one example, the present description relates to obtaining in-situ data from in-situ sensors on the mobile machine taken concurrently with an operation. The in-situ sensor data can include one or more of: in-situ machine orientation sensor data, such as pitch and roll of the mobile machine; in-situ speed sensor data, such as sensed travel speed, sensed acceleration, and/or sensed deceleration of the mobile machine; in-situ crop moisture data, such as sensed moisture of crop collected by the mobile machine; in-situ material mass data, such as sensed mass of material in a material receptacle of the mobile machine; in-situ material center of mass data, such as sensed center of mass of material in a material receptacle of the mobile machine; in-situ fill level data, such as a sensed fill level of a material receptacle; in-situ material dynamics data such as one or more of in-situ material spill data, such as sensed spillage of material out of a material receptacle of the mobile machine or sensed spillage of material during a material transfer operation, and in-situ material movement data, such as sensed movement of material in a material receptacle of the mobile machine. The various in-situ data is derived from various in-situ sensors on the mobile machine, as will be described in further detail herein. These are merely some examples of the in-situ data that can be obtained.

The present discussion proceeds, in some examples, with respect to systems that receive in-situ data and generate a predictive model that models a relationship between the in-situ data. For example, the predictive model models a relationship between one or more of in-situ machine orientation data, in-situ speed data, in-situ crop moisture data, in-situ material mass data, in-situ material center of mass data, and in-situ fill level data and in-situ material dynamics data, such as in-situ material movement data or in-situ material spill data, to generate a predictive material dynamics model, such as a predictive material dynamics model in the form of a predictive movement model or a predictive material spill model. In some examples, the predictive material dynamics model can be used for control of a mobile machine. In some examples, the systems obtain one or more maps of a worksite (such as one or more of a terrain map, speed map, crop moisture map, and fill level map) and use the predictive material dynamics model to generate a predictive map that predicts, for example, material dynamics such as movement of material in a material receptacle or spillage of material from a material receptacle.

The present discussion proceeds, in some examples, with respect to systems that obtain one or more maps of a worksite (such as one or more of a terrain map, speed map, crop moisture map, and fill level map) and also use an in-situ sensor to detect a variable indicative of an agricultural characteristic, such as material dynamics characteristics such as movement of material in a material receptacle or spillage of material from a material receptacle. The systems generate a model that models a relationship between the values on the obtained map(s) and the output values from the in-situ sensor. The model is used to generate a predictive map that predicts, for example, material dynamics such as movement of material in a material receptacle or spillage of material from a material receptacle. The predictive map, generated during an operation, can be presented to an operator or other user or used in automatically controlling a mobile machine during an operation or both. In some examples, the predictive map can be used to control one or more of a travel speed of the mobile machine, acceleration of the mobile machine, deceleration of the mobile machine, a route of the mobile machine, steering of the mobile machine, a material fill level of a material receptacle of the mobile machine, an amount of material transferred to or from a mobile machine, as well as various other parameters.

While the various examples described herein proceed with respect to mobile agricultural machines, such as agricultural harvesters, and agricultural material transport machines, such as towed grain carts and towed trailers, it will be appreciated that the systems and methods described herein are applicable to various other mobile machines, various other machine operations, as well as various other materials, for example forestry machines, forestry operations, and forestry materials, constructions machines, construction operations, and construction materials, and turf management machines, turf management operations, and turf management materials. Additionally, it will be appreciated that the systems and methods described herein are applicable to various mobile agricultural machines, for example, but not by limitation, agricultural harvesters, dry material spreaders, seeding and planting machines, as well as various other mobile agricultural machines configured to receive, hold, and transport material(s). For illustration, but not by limitation, a dry material spreader can include a dry material receptacle that receives, holds, and transports dry material, such as dry fertilizer, that is to be spread on a worksite. This dry material may spill out of or move within the dry material receptacle during operation of the dry material spreader.

FIG. 1 is a partial pictorial, partial schematic, illustration of a mobile agricultural machine 100, in an example where mobile machine 100 is a combine harvester (also referred to as agricultural harvester 101 or mobile agricultural machine 101). It can be seen in FIG. 1 that mobile agricultural machine 101 illustratively includes an operator compartment 103, which can have a variety of different operator interface mechanisms for controlling agricultural harvester 101. Operator compartment 103 can include one or more operator interface mechanisms that allow an operator to control and manipulate agricultural harvester 101. The operator interface mechanisms in operator compartment 103 can be any of a wide variety of different types of mechanisms. For instance, they can include one or more input mechanisms such as steering wheels, levers, joysticks, buttons, pedals, switches, etc. In addition, operator compartment 103 may include one or more operator interface display devices, such as monitors, or mobile devices that are supported within operator compartment 103. In that case, the operator interface mechanisms can also include one or more user actuatable elements displayed on the display devices, such as icons, links, buttons, etc. The operator interface mechanisms can include one or more microphones where speech recognition is provided on agricultural harvester 101. They can also include one or more audio interface mechanisms (such as speakers), one or more haptic interface mechanisms or a wide variety of other operator interface mechanisms. The operator interface mechanisms can include other output mechanisms as well, such as dials, gauges, meter outputs, lights, audible or visual alerts or haptic outputs, etc.

Agricultural harvester 101 includes a set of front-end machines forming a cutting platform 102 that includes a header 104 having a cutter generally indicated at 106. It can also include a feeder house 108, a feed accelerator 109, and a thresher generally indicated at 111. Thresher 111 illustratively includes a threshing rotor 112 and a set of concaves 114. Further, agricultural harvester 101 can include a separator 116 that includes a separator rotor. Agricultural harvester 101 can include a cleaning subsystem (or cleaning shoe) 118 that, itself, can include a cleaning fan 120, a chaffer 122 and a sieve 124. The material handling subsystem in agricultural harvester 101 can include (in addition to a feeder house 108 and feed accelerator 109) discharge beater 126, tailings elevator 128, and clean grain elevator 130 (that moves clean grain into clean grain tank 132). Agricultural harvester 101 also includes a material transport subsystem that includes unloading auger 134, chute 135, spout 136, and can include one or more actuators that actuate movement of chute 135 or spout 136, or both, such that spout 136 can be positioned over an area in which grain is to be deposited. In operation, auger causes grain from grain tank 132 to be conveyed through chute 135 and out of spout 136. Agricultural harvester 101 can further include a residue subsystem 138 that can include chopper 140 and spreader 142. Agricultural harvester 101 can also have a propulsion subsystem that includes an engine (or other power source) that drives ground engaging elements 144 (such as wheels, tracks, etc.). It will be noted that agricultural harvester 101 can also have more than one of any of the subsystems mentioned above (such as left and right cleaning shoes, separators, etc.).

As shown in FIG. 1, header 104 has a main frame 107 and an attachment frame 110. Header 104 is attached to feeder house 108 by an attachment mechanism on attachment frame 110 that cooperates with an attachment mechanism on feeder house 108. Main frame 107 supports cutter 106 and reel 105 and is movable relative to attachment frame 110, such as by an actuator (not shown). Additionally, attachment frame 110 is movable, by operation of actuator 149, to controllably adjust the position of front-end assembly 102 relative to the surface (e.g., field) over which agricultural harvester 101 travels in the direction indicated by arrow 146, and thus controllably adjust a position of header 104 from the surface. In one example, main frame 107 and attachment frame 110 can be raised and lowered together to set a height of cutter 106 above the surface over which agricultural harvester 101 is traveling. In another example, main frame 107 can be tilted relative to attachment frame 110 to adjust a tilt angle with which cutter 106 engages the crop on the surface. Also, in one example, main frame 107 can be rotated or otherwise moveable relative to attachment frame 110 to improve ground following performance. In this way, the roll, pitch, and/or yaw of the header relative to the agricultural surface can be controllably adjusted. The movement of main frame 107 together with attachment frame 110 can be driven by actuators (such as hydraulic, pneumatic, mechanical, electromechanical, or electrical actuators, as well as various other actuators) based on operator inputs or automated inputs.

In operation, and by way of overview, the height of header 104 is set and agricultural harvester 101 illustratively moves over a field in the direction indicated by arrow 146. As it moves, header 104 engages the crop to be harvested and gather it towards cutter 106. After it is cut, the crop can be engaged by reel 105 that moves the crop to a feeding system. The feeding system move the crop to the center of header 104 and then through a center feeding system in feeder house 108 toward feed accelerator 109, which accelerates the crop into thresher 111. The crop is then threshed by rotor 112 rotating the crop against concaves 114. The threshed crop is moved by a separator rotor in separator 116 where some of the residue is moved by discharge beater 126 toward a residue subsystem. It can be chopped by a residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailing elevator 128 back to thresher 110 where they can be re-threshed. Alternatively, the tailings can also be passed to a separate re-threshing mechanism (also using a tailings elevator or another transport mechanism) where they can re-threshed as well.

FIG. 1 also shows that, in one example, agricultural harvester 101 can include a variety of sensors, some of which are illustratively shown. For example, combine 100 can include ground speed sensors 147, one or more separator loss sensors 148, a clean grain camera 150, one or more cleaning shoe loss sensors 152, one or more perception systems 156 (e.g., forward-looking systems, such as a camera, lidar, radar, etc., an imaging system such as a camera, as well as various other perception systems), and one or more material spill and movement sensors 180. Ground speed sensor 147 illustratively senses the travel speed of combine 100 over the ground. This can be done by sensing the speed of rotation of ground engaging elements 144, the drive shaft, the axle, or various other components. The travel speed can also be sensed by a positioning system, such as a global positioning system (GPS), a dead-reckoning system, a LORAN system, or a wide variety of other systems or sensors that provide an indication of travel speed. Perception system 156 is mounted to and illustratively senses the field (and characteristics thereof) in front of and/or around (e.g., to the sides, behind, etc.) agricultural harvester 101 (relative to direction of travel 146) and generates sensor signal(s) (e.g., an image) indicative of those characteristics. For example, perception system 156 can generate a sensor signal indicative of change in agricultural characteristics in the field ahead of and/or around agricultural harvester 101. While shown in a specific location in FIG. 1, it will be noted that perception system 156 can be mounted to various locations on agricultural harvester 101 and is not limited to the depiction shown in FIG. 1. Additionally, while only one perception system 156 is illustrated, it will be noted that agricultural harvester 101 can include any number of perception systems 156, mounted to any number of locations within agricultural harvester 101, and configured to view any number of directions around agricultural harvester 101.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise on a single sensor as well, instead of separate sensors for each shoe.

Separator loss sensors 148 provide signals indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

Material dynamics sensors 179 provide sensor signals indicative of material dynamics characteristics, such as material having spilled out of a material receptacle, such as clean grain tank 132, as well as provide sensor signals indicative of movement of material within a material receptacle, such as clean grain tank 132. Material dynamics sensors 179 include material spill and movement sensors 180 (shown in FIG. 3). Material spill and movement sensors 180 include some sensors which detect material spillage and can be disposed within the material receptacle, outside of the material receptacle and/or are configured to detect areas and/or characteristics outside of the material receptacle. Material spill and movement sensors 180 include some sensors which detect material movement and are disposed inside or outside of the material receptacle and/or are configured to detect areas and/or characteristics inside of the material receptacle. In some examples, some material spill and movement sensors 180 can be dual purpose in that they detect both material spillage and material movement. For example, an imaging system can have a field of view that includes areas interior to the material receptacle and exterior of the material receptacle such that the imaging system can detect material outside of the material receptacle (material that has spilled from material receptacle) as well as material as it is disposed within the material receptacle. In another example, mass sensors can detect a mass (i.e., weight) of the material within the material receptacle which can indicate both spillage of material as well as movement of material. In another example, audible/acoustic sensors can be configured to detect noises indicative of material spillage (such as noise generated by contact between material and surfaces exterior of the material receptacle) as well as indicative of material movement (such as noise generated by movement of the material within the material receptacle). In some examples, multiples of the same type of sensor can be disposed on the mobile machine, with separate sensors of the multiple sensors dedicated to detection of a different characteristic. For example, one imaging system configured to detect movement of material within the material receptacle and another imaging system configured to detect spillage of material out of the material receptacle. In another example, one contact sensor disposed outside of the material receptacle that detects contact between material and the exterior contact sensor as an indication of material spillage and another contact sensor disposed inside of the material receptacle that detect contact between material and the interior contact sensor as an indication of material movement. These are merely some examples.

One example of a material spill and movement sensor 180 is illustratively shown in FIG. 1 as imaging system 157. Imaging system 157 may have a field of view that includes an exterior of the material receptacle, an interior of the material receptacle, or both. Imaging system 157 can be disposed inside or outside of the material receptacle. While only one imaging system 157 is shown, it is to be understood that more than one imaging system 157 can be used. Additionally, imaging system 157 can be disposed at various locations on agricultural harvester 101. Imaging system 157 detects the presence of material within its field of view and generates a sensor signal indicative of the presence of the material within the field of view. In one example, the field of view of imaging system 157 includes designated zones in which material should not be present under normal operating conditions. Thus, in one example, the detection of material within the designated zones in the field of view of imaging system 157 indicate the occurrence of material spill. In one example, the designated zones include an exterior of the material receptacle. In another example, imaging system 157 detects movement of material within material receptacle. Detection of movement of material within material receptacle as well as detection of material spillage can include comparison of sequential images captured by imaging system 157. In another example, imaging system 157 is in the form of a stereo camera. In another example, imaging system 157, or another imaging system, captures image(s) of material as it is disposed within the material receptacle which can be subsequently processed to determine a center of mass of the material.

In addition to imaging system 157, material spill and movement sensors 180 can include a variety of other material spill and movement sensors not illustratively shown in FIG. 1. For instance, material spill and movement sensors 180 can include mass sensors configured to sense a mass of material within the material receptacle, electromagnetic radiation (ER) sensors configured to detect material spill or material movement through reception of electromagnetic radiation, contact sensors configured to detect material spill or material movement through contact between the material and the contact sensors, audible/acoustic sensors configured to detect material spill or material movement, or both, based on received audible/acoustic input, as well as various other sensors. Material spill and movement sensors 180 will be discussed in greater detail below.

It will be appreciated that agricultural harvester 101 can include a variety of other sensors not illustratively shown in FIG. 1. For instance, agricultural harvester 101 can include residue setting sensors that are configured to sense whether agricultural harvester 101 is configured to chop the residue, drop a windrow, etc. They can include cleaning shoe fan speed sensors that can be configured proximate fan 120 to sense the speed of the fan. They can include threshing clearance sensors that sense clearance between the rotor 112 and concaves 114. They can include threshing rotor speed sensors that sense a rotor speed of rotor 112. They can include chaffer clearance sensors that sense the size of openings in chaffer 122. They can include sieve clearance sensors that sense the size of openings in sieve 124. They can include material other than grain (MOG) moisture sensors that can be configured to sense the moisture level of the material other than grain that is passing through agricultural harvester 101. They can include machine settings sensors that are configured to sense the various configured settings on agricultural harvester 101. They can also include machine orientation sensors that can be any of a wide variety of different types of sensors that sense the orientation of agricultural harvester 101, and/or components thereof. They can include crop property sensors that can sense a variety of different types of crop properties, such as crop type, crop moisture, and other crop properties. The crop property sensors can also be configured to sense characteristics of the crop as they are being processed by agricultural harvester 101. For instance, they can sense grain feed rate, as it travels through clean grain elevator 120. They can sense mass flow rate of grain through elevator 130 or provide other output signals indicative of other sensed variables. Agricultural harvester 101 can include soil property sensors that can sense a variety of different types of soil properties, including, but not limited to, soil type, soil compaction, soil moisture, soil structure, among others.

Some additional examples of the types of sensors that can be used are described below, including. but not limited to a variety of position sensors that can generate sensor signals indicative of a position (e.g., geographic location, orientation, elevation, etc.) of agricultural harvester 101 on the field over which agricultural harvester 101 travels or a position of various components of agricultural harvester 101 (e.g., header 104) relative to, for example, the field over which agricultural harvester 101 travels.

Figure 2A:
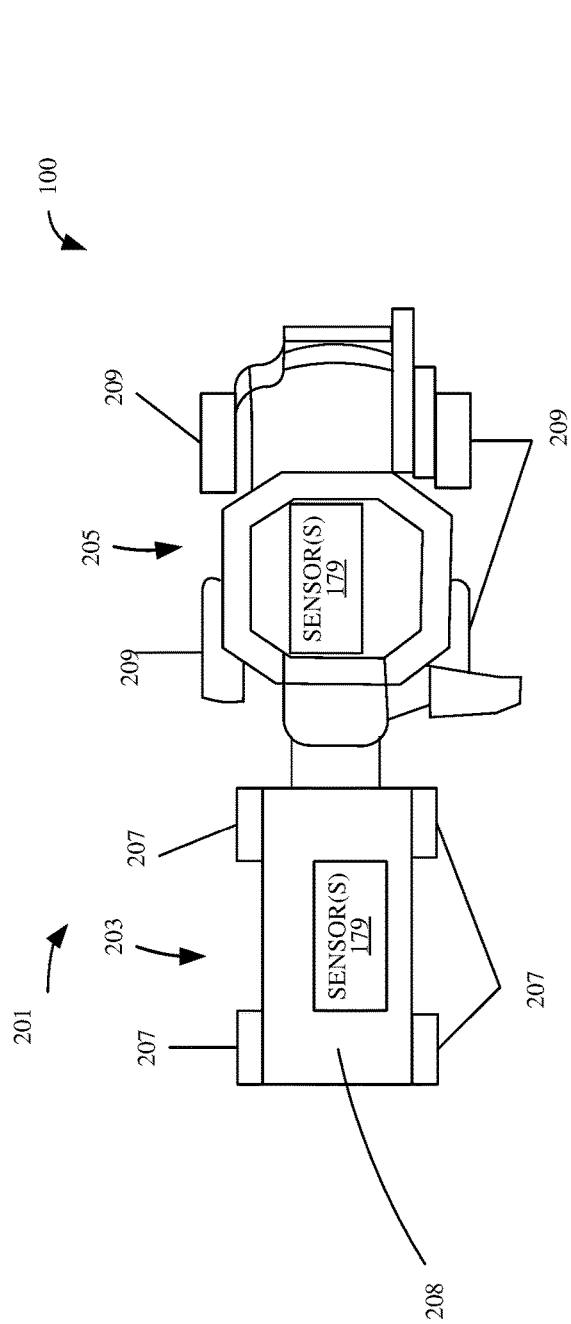
FIGS. 2A-2B are partial pictorial, partial schematic illustrations of examples of mobile machines as mobile material transport machines.

FIG. 2A is a partial pictorial, partial schematic, illustration of a mobile agricultural machine 100, in an example where mobile machine 100 is a material transport machine 201. Material transport machine 201 includes a towing vehicle 205 that tows a mobile material receptacle implement 203. In FIG. 2A, towing vehicle 205 is illustratively shown as a tractor and mobile material receptacle implement 203 is illustratively shown as a mobile grain cart. As shown in FIG. 2A, material receptacle implement 203 can include ground engagement elements 207, such as tires or tracks, a material receptacle 208, and can include one or more material dynamics sensors 179, which can include one or more material spill and movement sensors 180. Additionally, as shown in FIG. 2A, towing vehicle 205 includes ground engaging elements 209 and can include one or more material dynamics sensors 179, which can include one or more material spill and movement sensors 180. While in the example shown in FIG. 2A one or more material dynamics sensors 179, which can include one or more material spill and movement sensors 180, are shown as included on both material receptacle implement 203 and towing vehicle 205, in other examples material dynamics sensors 179, which can include material spill and movement sensors 180, may only be included on one of material receptacle implement 203 or towing vehicle 205. In some examples, some material dynamics sensors, and thus some material spill and movement sensors, may be disposed on towing vehicle 205 while other material dynamics sensors, and thus other material spill and movement sensors, are disposed on material receptacle implement 203.

In operation, material receptacle implement 203 receives material, such as harvested crop material, from an agricultural harvester, such as agricultural harvester 101, via a material transfer subsystem, such as material transfer subsystem 341 (shown below). The material receptable implement 203 holds the received material within material receptacle 208 and is towed by towing vehicle 205 to a desired location. One or more material spill and movement sensors 180, of material dynamics sensors 179, can detect spillage of material out of material receptacle 208, spillage of material during a material transfer operation, as well as movement of material within material receptacle 208. While not shown in FIG. 2A, in some examples, material receptacle implement 203 can include a material transfer subsystem (e.g., material transfer subsystem 341 shown below), such as an unloading auger, a chute, and a spout, as well as one or more actuators for actuating the auger and for actuating movement of the spout or the chute, or both. In this way, the material held by material receptacle implement 203 can be offloaded therefrom through use of a material transfer subsystem. In other examples, one or more actuatable doors may be disposed on a side of the material receptacle implement 203, such as the bottom side of material receptacle implement 203, which, when actuated to an open position, allow the held material to exit material receptacle 208 via gravity.

Figure 2B:
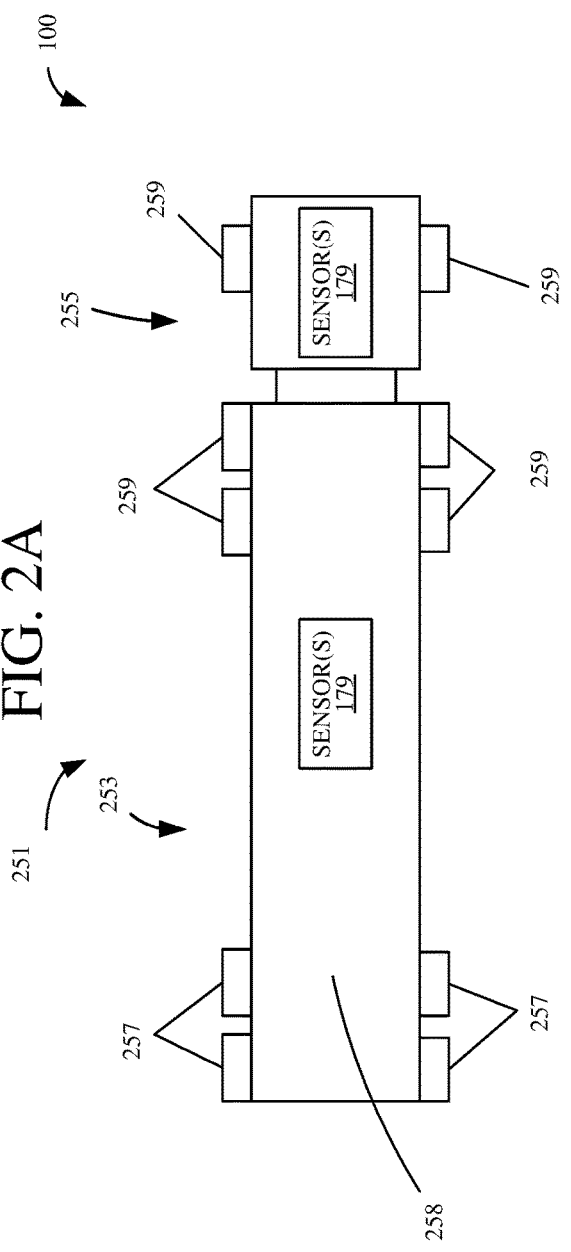

FIG. 2B is a partial pictorial, partial schematic, illustration of a mobile agricultural machine 100, in an example where mobile machine 100 is a material transport machine 251. Material transport machine 251 includes a towing vehicle 245 that tows a mobile material receptacle implement 253. In FIG. 2B, towing vehicle 205 is illustratively shown as a semi-truck (semi-tractor) and mobile material receptacle implement 253 is illustratively shown as a semi-trailer (tractor trailer). As shown in FIG. 2B, material receptacle implement 253 can include ground engagement elements 257, such as tires or tracks, a material receptacle 258, and can include one or more material dynamics sensors 179, which can include one or more material spill and movement sensors 180. Additionally, as shown in FIG. 2B, towing vehicle 255 includes ground engaging elements 259 and can include one or more material dynamics sensors 179, which can include one or more material spill and movement sensors 180. While in the example shown in FIG. 2B one or more material dynamics sensors 179, which can include one or more spill and movement sensors 180, are shown as included on both material receptacle implement 253 and towing vehicle 255, in other examples material dynamics sensors 179, which can include material spill and movement sensors 180, may only be included on one of material receptacle implement 253 or towing vehicle 255. In some examples, some material dynamics sensors, and thus some material spill and movement sensors, may be disposed on towing vehicle 255 while other material dynamics sensors, and thus other material spill and movement sensors, are disposed on material receptacle implement 253.

In operation, material receptacle implement 253 receives material, such as harvested crop material, from an agricultural harvester, such as agricultural harvester 101, via a material transfer subsystem, such as material transfer subsystem 341 (shown below or from another material transport machine, such as material transport machine 201 via a material transfer subsystem, such as a material transfer subsystem 341 (shown below). The material receptable implement 253 holds the received material within material receptacle 258 and is towed by towing vehicle 255 to a desired location. One or more material spill and movement sensors 180, of material dynamics sensors 179, can detect spillage of material out of material receptacle 258, spillage of material during a material transfer operation, as well as movement of material within material receptacle 258. While not shown in FIG. 2B, in some examples, material receptacle implement 253 can include a material transfer subsystem (e.g., material transfer subsystem 341 shown below), such as an unloading auger, a chute, and a spout, as well as one or more actuators for actuating the auger and for actuating movement of the spout or the chute, or both. In this way, the material held by material receptacle implement 253 can be offloaded therefrom through use of a material transfer subsystem. In other examples, one or more actuatable doors may be disposed on a side of the material receptacle implement 253, such as the bottom side of material receptacle implement 253, which, when actuated to an open position, allow the held material to exit material receptacle 258 via gravity.

Figure 2C:
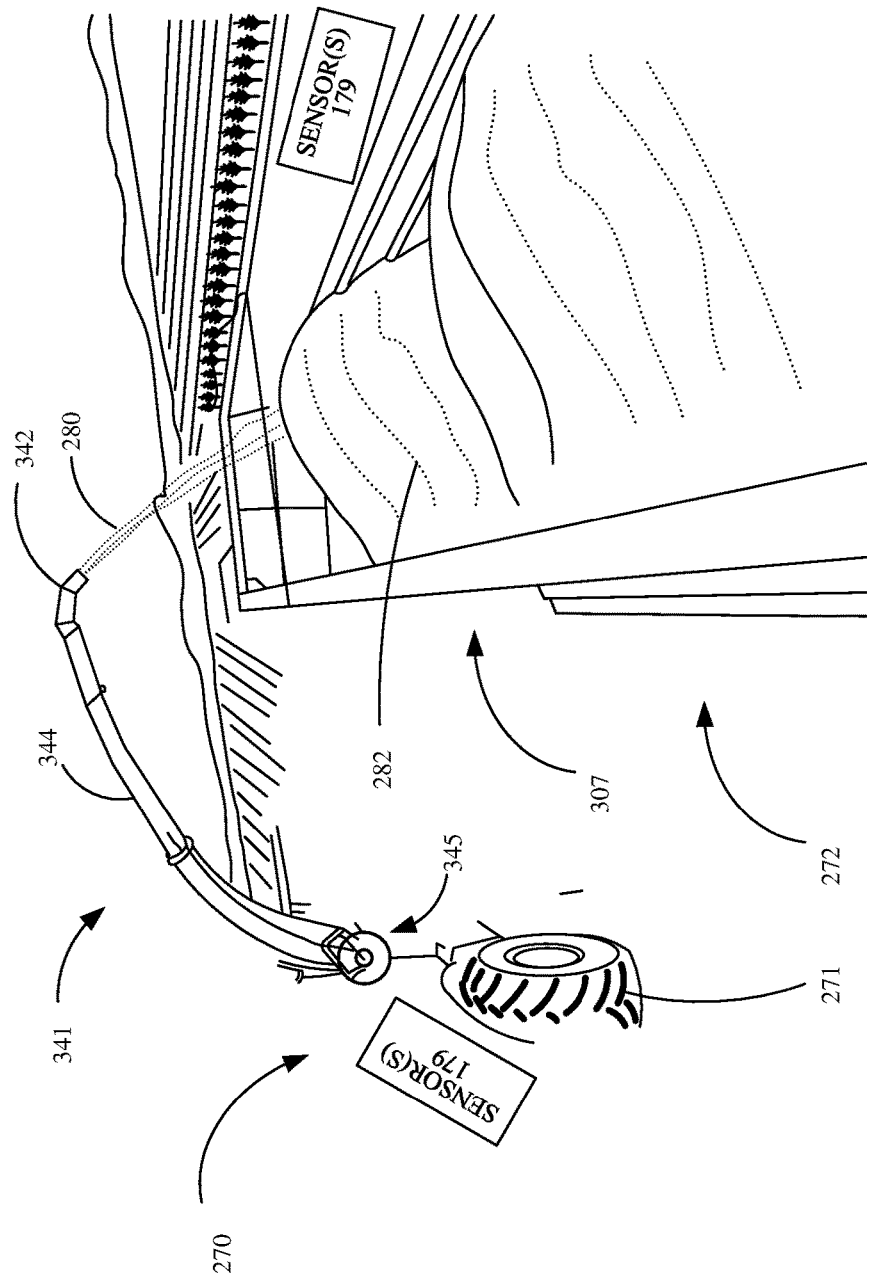
FIG. 2C is a pictorial illustration showing one example of a material transfer operation between mobile machines.

FIG. 2C is a pictorial illustration showing one example of a material transfer operation between mobile machines. In FIG. 2C a transferring machine 270, which could be one of the mobile machines 101 or 201, includes ground engaging elements 271 (which can be similar to ground engaging elements 144 or 207) and a material transfer subsystem 341 which itself includes auger 345, chute 344, and spout 342. Material transfer subsystem 341 transfers material 282 from transferring machine 270 to a material receptacle 307 of receiving machine 272, which could be one of the mobile machines 201 or 251. Material 282 exits spout 342 in a material stream which lands in an interior of material receptacle 307.

Figure 3:
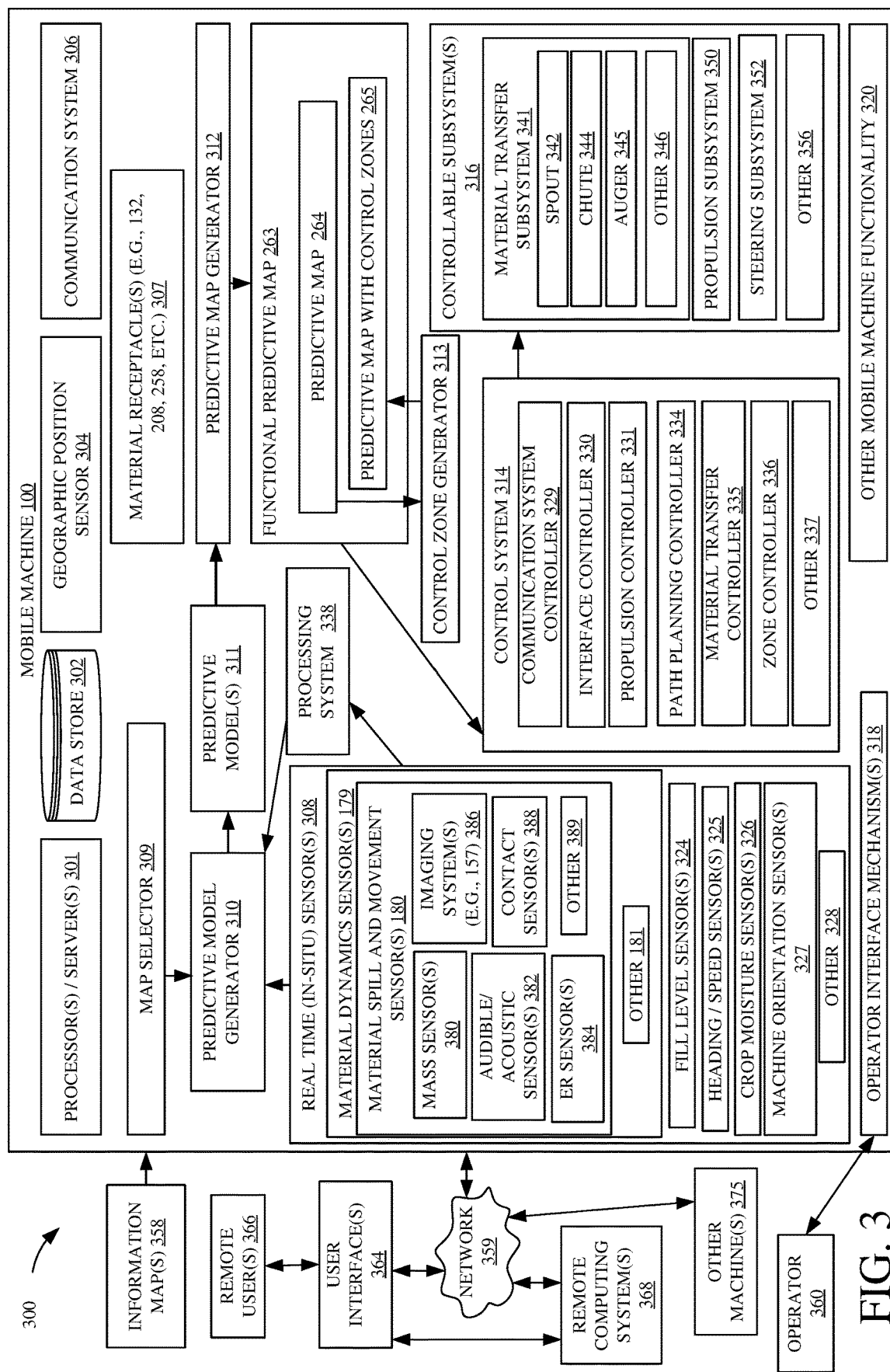
FIG. 3 is a block diagram shown some portions of an agricultural system, including a mobile machine, in more detail, according to some examples of the present disclosure.

Both transferring machine 270 and receiving machine 272 can include material dynamics sensors 179. During the material transfer operation the material dynamics sensors 179 can detect material dynamics characteristics, as well as various other characteristics such as a fill level of material in receiving machine 272. Ideally, material 282 is transferred from transferring machine 270 to transferring machine 272 according to a fill profile (e.g., front to back, back to front) until the transferring machine 270 is at a desired emptiness or until the material receptacle 307 of the receiving machine 272 is at a desired fill level. In some examples, material stream 280, and thus material 282, may not land in material receptacle 307 of receiving machine 272. For instance, the relative positioning or relative speed between the machines may be such that the material 282 does not land in the interior of material receptacle 307. In other examples, the machines may be correctly positioned or traveling at correct speeds, but the wind may blow the material stream 280, and thus the material 282, in an unexpected course, thus causing the material 282 to spill (e.g., land outside of material receptacle 307). In any case, these material dynamics characteristics (as well as other characteristics) can be detected by material dynamics sensors 179 during a material transfer operation, as will be described in greater detail herein. FIG. 3 is a block diagram showing some portions of an agricultural system architecture 300. FIG. 3 shows that agricultural system architecture 300 includes mobile machine 100, one or more remote computing systems 368, an operator 360, one or more remote users 366, one or more remote user interfaces 364, network 359, and one or more information maps 358. Mobile machine 100, itself, illustratively includes one or more processors or servers 301, data store 302, geographic position sensor 304, communication system 306, one or more material receptacles 307, one or more in-situ sensors 308 that sense one or more characteristics of a worksite concurrent with an operation, and a processing system 338 that processes the sensors signals generated by in-situ sensors 308 to generate processed sensor data. The in-situ sensors 308 generate values corresponding to the sensed characteristics. Mobile machine 100 also includes a predictive model or relationship generator (collectively referred to hereinafter as "predictive model generator 310"), predictive model or relationship (collectively referred to hereinafter as "predictive model 311"), predictive map generator 312, control zone generator 313, control system 314, one or more controllable subsystems 316, and an operator interface mechanism 318. The mobile machine can also include a wide variety of other machine functionality 320.

The in-situ sensors 308 can be on-board mobile machine 100, remote from mobile machine, such as deployed at fixed locations on the worksite or on another machine operating in concert with mobile machine 100, such as an aerial vehicle, and other types of sensors, or a combination thereof. In-situ sensors 308 sense characteristics of or at a worksite during the course of an operation. In-situ sensors 308 illustratively include material dynamics sensors 179, heading/speed sensors 325, crop moisture sensors 326, machine orientation sensors 327, and can include various other sensors 328. Material dynamics sensors 179 illustratively include one or more material spill and movement sensors 180 and can include other sensors 181. Material spill and movement sensors 180 illustratively include one or more mass sensors 380, one or more audible/acoustic sensors 382, one or more electromagnetic radiation (ER) sensors 384, one or more imaging system 386, one or more contact sensors 388, and can include other types of material spill and movement sensors 389. Material spill and movement sensors provide sensors signals indicative of material, such as crop material, having spilled out of a material receptacle 307 of mobile machine 100 or provide sensor signals indicative of movement of material, such as crop material, within a material receptacle 307 of mobile machine 100. It will be understood that in some examples, one or more types of material spill and movement sensor 180 can detect both material spill and material movement. In some examples, a plurality of the same type of material spill and movement sensor 180 are included on mobile machine 100, for example a first set of one or more disposed to detect material spill with a second set of one or more disposed to detect material movement. Material spill and movement sensors 180 can be disposed outside of material receptacles 307 or inside of material receptacles 307, or both. Material spill sensors can be disposed to sense within material receptacles 307 or without material receptacles 307, or both.

Mass sensors 380 detect a mass (i.e., a weight) of material within material receptacles 307 and generate sensor signals indicative of the mass of the material within material receptacles 307. Mass sensors 380 can include load cells, strain gauges, pressure sensors, as well as various other types of mass sensors. Mass sensors 380 can be positioned between components of mobile machine 100. For instance, mass sensors 380 can be positioned between material receptacles 307, or a frame, or other body, that supports material receptacle 307, and axle(s) of mobile machine 100, these mass sensors 380 generate a signal in response to force applied by the weight of the material receptacle 307 and material within material receptacle 307. Additionally, mass sensors 380 can also be included on a hitch of mobile machine 100 (e.g., hitch of towing vehicle) or a tongue of mobile machine 100 (e.g., tongue of towed implement) and generate a signal in response to force applied by towed implement on the hitch. In some examples, one or more mass sensors 380 can be disposed within material receptacles 307, for instance, one or more mass sensors 380 disposed at different locations within material receptacles 307. As discussed, mobile machine 100 can include more than one mass sensor 380, where each mass sensor 380 is associated with a different location and thus, a mass distribution (as well as change in the mass distribution) of the mass within material receptacle can be derived. Additionally, the mass distribution can be used to derive a center of mass of the material within material receptacle.

Audible/acoustic sensors 382 detect noise (e.g., sound waves) generated by movement of material within material receptacles 307 or noise generated by material contacting surfaces outside of the interior of material receptacles 307, such as a cab roof of mobile machine 100, an exterior side (e.g., top side or outer side, or both) of material receptacle 307, a frame of mobile machine 100, surface of worksite, as well as various other surfaces, and generate sensor signals based on the noise generated by the material movement or the material contacting surfaces outside of the interior of material receptacle 307, or both. In some examples, audible/acoustic sensors 382 include one or more microphones. In some examples, one or more of audible/acoustic sensors 382 may include and/or may be positioned proximate to a strike plate which is positioned on portions of mobile machine 100 in areas where material may contact the strike plate when the material has spilled out of the material receptacle 307. Contact between the strike plate, or other surfaces outside of material receptacle 307, produces a sound which is detected by audible/acoustic sensors 382.

ER sensors 384 detect electromagnetic radiation that travels through an area, such as an area outside of material receptacles 307 or inside of material receptacles 307, or both. Material in the area(s) through which the electromagnetic radiation travels of interacts with the electromagnetic radiation, such as by attenuating the electromagnetic radiation received by ER sensors 384, blocking at least a portion of the electromagnetic radiation from being received by ER sensors 384, or by causing reflection of electromagnetic radiation back towards ER sensors 384. In some examples, ER sensors 384 can include an ER transmitter that transmits electromagnetic radiation and a receiver that receives the transmitted electromagnetic radiation. Material, present in the area through which the electromagnetic radiation is transmitted, disrupts (e.g., blocks, attenuates, etc.) the reception of and/or the strength of the received electromagnetic radiation at the receiver. The disruption can be detected to indicate the presence of material in the area. In other examples, material present in the area through which the electromagnetic radiation is transmitted is reflected form the material and back towards the receiver. The received reflected electromagnetic radiation can indicate the presence of material in the area. In other examples, the ER sensors 384 only include an electromagnetic radiation receiver that receives electromagnetic radiation. Material presence in an area in which the receiver is disposed to view (i.e., receive electromagnetic radiation through) disrupts the reception of the electromagnetic radiation. This disruption can be detected to indicate the presence of material in the area. If the area is outside of the interior of material receptacle 307, this may indicate material spillage, whereas if the area is within the interior of material receptacle 307, this may indicate movement of the material.

Imaging systems 386 image the interior of material receptacle or areas outside of material receptacle 307, or both. Imaging systems 386 can include on or more imaging devices, such as one or more cameras. Material in the images in areas outside of the material receptacle 307 can indicate spillage of the material from material receptacle 307. Imaging systems 386 can also capture images of the material within material receptacles 307 As will be discussed in further detail, the images generated by imaging systems 386 can be processed to detect movement of the material with material receptacles 307 as well as to detect a center of mass of the material (e.g., material pile) within material receptacles 307. In one example, the field of view of imaging systems 386 can include areas inside and outside of material receptacle 307. The areas outside of material receptacle 307 can be identified and zoned by subsequent image processing of images generated by imaging systems 386 such that material in the image in the identified zones can be identified to detect material in areas outside of material receptacle 307.

Contact sensors 388 are disposed inside of material receptacle 307 or outside of material receptacle 307, or both. Contact sensors 388 can include a contact member, such as a pad, body, etc., for instance a piezo electric contact member, which generates an electrical signal in response to force of contact between the contact member and the material. In other examples, contact sensors 388 can include a displaceable object which is displaced by the force of contact between the displaceable object and the material. The displacement can be detected by a sensor, such as a potentiometer or a Hall effect sensor and can be used to detect the spillage or movement of material. For instance, contact with a contact sensor 388 disposed within material receptacle 307 can indicate movement of material, whereas contact with a contact sensor 388 disposed outside of the interior of material receptacle can indicated spillage of material. In some examples, contact sensors 388 can be disposed on an exterior side or top side of material receptacle 307, a frame of mobile machine 100, a cab roof of mobile machine 100, as well as various other locations. In some examples, contact sensors 388 can be disposed on interior walls of material receptacle 307 and can be a certain distance from a top perimeter of the material receptacle 307.

Material spill and movement sensors 180 can include other types of material spill and movement sensors, as indicated by 389.

Fill level sensors 324 sense a characteristic indicative of a fill level of material receptacle 307. In some examples, fill level sensors 324 can be the same as some of the material spill and movement sensors or can utilize the signals received from the material spill and movement sensors 180. In other examples, fill level sensors 324 can be separate from spill and material sensors 180, such as one or more imaging systems, one or more ER sensors, one or more mass sensors, or a one or more mass flow sensors that measure an amount of material entering material receptacle 307. For instance, a mass flow sensor that senses a flow of grain through grain elevator 130.

In other examples, fill level sensors 324 may utilize signals and data from other sources to detect a fill level of mobile machine 100. For example, sensor data from geographic position sensor or heading/speed sensors 325, or both, can provide an indication of a route and distance that mobile machine 100 has traveled and a map of the field, such as a yield map, can provide yield values along that route which can be aggregated for the distance traveled along that route to detect a fill level (as represented by a harvested yield along that traveled distance). This is merely one example.

Heading/speed sensors 325 detect a heading and speed at which mobile machine 100 is traversing the worksite during the operation. This can include sensors that sense the movement of ground-engaging elements (e.g., wheels or tracks 144, 207, 209, 257, 259, etc.) or can utilize signals received from other sources, such as geographic position sensor 304, thus, while heading/speed sensors 325 as described herein are shown as separate from geographic position sensor 304, in some examples, machine heading/speed is derived from signals received from geographic positions sensors and subsequent processing. In other examples, heading/speed sensors 325 are separate sensors and do not utilize signals received from other sources. Detecting a speed includes detecting a travel speed of mobile machine 100 as well as detecting a change in the travel speed, that is the acceleration and deceleration of mobile machine 100.

Crop moisture sensors 326 sense a characteristic indicative of a moisture level of crop. Without limitation, these crop moisture sensors may include a capacitance sensor, a microwave sensor, or a conductivity sensor, among others. In some examples, the crop moisture sensor may utilize one or more bands of electromagnetic radiation in detecting the crop moisture. Crop moisture sensors 326 can include a capacitive moisture sensor. In one example, the capacitance moisture sensor can include a moisture measurement cell for containing the crop material sample and a capacitor for determining the dielectric properties of the sample. In other examples, a crop moisture sensor 326 may be a microwave sensor or a conductivity sensor. In other examples, a crop moisture sensor 326 may utilize wavelengths of electromagnetic radiation for sensing the moisture content of the crop material. One or more crop moisture sensors 326 can be disposed along the flow path of gathered crop within mobile machine 100, such as within the chute 135, feeder house 108, or clean grain elevator 130 (or otherwise have sensing access to crop material within chute 135, feeder house 108, or clean grain elevator 130). In other examples, one or more crop moisture sensors 326 may be located at other areas within mobile machine 100, such as material receptacles 307. It will be noted that these are merely examples of crop moisture sensors, and that various other crop moisture sensors are contemplated. The moisture of crop material affects the cohesive and frictional forces between individual crop material (e.g., individual grains) and thus affects the angle of repose. Thus, moisture of crop material may make it more or less likely that the crop material within material receptacle 307 will move.

Machine orientation sensors 327 can include one or more inertial measurement units (IMUs) which can provide orientation information relative to mobile machine 100, such as pitch, roll, and yaw data of mobile machine 100. The one or more IMUs can include accelerometers, gyroscopes, and magnetometers.

Other in-situ sensors 328 may be any of the sensors described above with respect to FIGS. 1-2B. Other in-situ sensors 328 can be on-board mobile machine 100 or can be remote from mobile machine 100, such as other in-situ sensors 328 on-board another mobile machine that capture in-situ data of the worksite or sensors at fixed locations throughout the worksite. The remote data from remote sensors can be obtained by mobile machine 100 via communication system 206 over network 359.

In-situ data includes data taken from a sensor on-board the mobile machine 100 or taken by any sensor where the data are detected during the operation of mobile machine 100 at a worksite.

Processing system 338 processes the sensor signals generated by in-situ sensors 308 to generate processed sensor data indicative of one or more characteristics. For example, processing system generates processed sensor data indicative of characteristic values based on the sensor signals generated by in-situ sensors, such as material dynamics values based on sensor signals generated by material dynamics sensors 179, which can include one or more of material movement values based on sensors signals generated by material spill and movement sensors 180 and material spill values based on sensor signals generated by material spill and movement sensors 180. Further examples include mass values based on sensor signals generated by mass sensors 180, center of mass values based on images from imaging systems 186, crop moisture values based on sensor signals generated by crop moisture sensors 326, machine orientation (pitch, roll, etc.) values based on sensors signals generated by machine orientation sensors 327, machine speed (travel speed, acceleration, deceleration, etc.) values based on sensor signals generated by heading/speed sensors 325, as well as various other values based on sensors signals generated by various other in-situ sensors 328.

It will be understood that processing system 338 can be implemented by one or more processors or servers, such as processors or servers 301. Additionally, processing system 338 can utilize various sensor signal filtering techniques, noise filtering techniques, sensor signal categorization, aggregation, normalization, as well as various other processing functionality. Similarly, processing system 338 can utilize various image processing techniques such as, sequential image comparison, RGB, edge detection, black/white analysis, machine learning, neural networks, pixel testing, pixel clustering, shape detection, as well any number of other suitable image processing and data extraction functionality. The operation of processing system 338 will be described in more detail in FIG. 4.

FIG. 3 also shows remote users 366 interacting with mobile machine 100 or remote computing systems 368, or both, through user interface mechanisms 364 over network 359. User interface mechanisms may include joysticks, levers, a steering wheel, linkages, pedals, buttons, dials, keypads, an interactive user interface display device which can include user actuatable elements (such as icons, buttons, etc.), a microphone and speaker (where speech recognition and speech synthesis are provided), among a wide variety of other types of control devices. Remote computing systems 368 can be a wide variety of different types of systems, or combinations thereof. For example, remote computing systems 368 can be in a remote server environment. Further, remote computing systems 368 can be remote computing systems, such as mobile devices, a remote network, a farm manager system, a vendor system, or a wide variety of other remote systems. In one example, mobile machine 100 can be controlled remotely by remote computing systems or by remote users 366, or both. As will be described below, in some examples, one or more of the components shown being disposed on mobile machine 100 in FIG. 3 can be located elsewhere, such as at remote computing systems 368.

Control system 314 includes communication system controller 329, interface controller 330, propulsion controller 331, path planning controller 334, material transfer controller 335, zone controller 336, and control system 314 can include other items 246. Controllable subsystems 316 include material transfer subsystem 341, propulsion subsystem 350, steering subsystem 352, and subsystem 316 can include a wide variety of other subsystems 356. Material transfer subsystem 341, itself, includes spout 342, chute 344, auger 345, and can include other items 346, such as one or more controllable actuators to drive movement of spout 342, chute 344, and auger 345.

FIG. 3 also shows that agricultural harvester 100 can obtain one or more information maps 358. As described herein, the information maps 358 include, for example, a terrain map, a speed map, and a crop moisture map. However, information maps 358 may also encompass other types of data, such as other types of data that were obtained prior to a harvesting operation or a map from a prior operation. In other examples, information maps 358 can be generated during a current operation, such a map generated by predictive map generator 312 based on a predictive model 311 generated by predictive model generator 310. FIG. 3 also shows that an operator 360 may operate mobile machine 100. The operator 360 interacts with operator interface mechanisms 318. In some examples, operator interface mechanisms 318 may include joysticks, levers, a steering wheel, linkages, pedals, buttons, dials, keypads, an interactive user interface display device which can include user actuatable elements (such as icons, buttons, etc.), a microphone and speaker (where speech recognition and speech synthesis are provided), among a wide variety of other types of control devices. Where a touch sensitive display system is provided, operator 360 may interact with operator interface mechanisms 318 using touch gestures. These examples described above are provided as illustrative examples and are not intended to limit the scope of the present disclosure.

Consequently, other types of operator interface mechanisms 318 may be used and are within the scope of the present disclosure.

Information maps 358 may be downloaded onto mobile machine 100 over network 359 and stored in data store 302, using communication system 306 or in other ways. In some examples, communication system 306 may be a cellular communication system, a system for communicating over a wide area network or a local area network, a system for communicating over a near field communication network, or a communication system configured to communicate over any of a variety of other networks or combinations of networks, including a variety of other wired or wireless networks. Network 359 illustratively represents any or a combination of any of the variety of networks. Communication system 306 may also include a system that facilitates downloads or transfers of information to and from a secure digital (SD) card or a universal serial bus (USB) card or both.

Geographic position sensor 304 illustratively senses or detects the geographic position or location of agricultural harvester 100. Geographic position sensor 304 can include, but is not limited to, a global navigation satellite system (GNSS) receiver that receives signals from a GNSS satellite transmitter. Geographic position sensor 304 can also include a real-time kinematic (RTK) component that is configured to enhance the precision of position data derived from the GNSS signal. Geographic position sensor 304 can include a dead reckoning system, a cellular triangulation system, or any of a variety of other geographic position sensors.

Predictive model generator 310 generates a model that is indicative of a relationship between the value(s) sensed by the in-situ sensors 308 and value(s) mapped to the field by the information maps 358. For example, if the information map 358 maps a terrain value to different locations in the worksite, and the in-situ sensor 308 is sensing a value indicative of material spill or material movement, then model generator 310 generates a predictive material spill model that models the relationship between the terrain value and the material spill value or generates a predictive material movement model that models the relationship between the terrain value and the material movement value. In another example, if the information map 358 maps a speed value to different locations in the worksite, and the in-situ sensor 308 is sensing a value indicative of material spill or material movement, then model generator 310 generates a predictive material spill model that models the relationship between the speed value and the material spill value or generates a predictive material movement model that models the relationship between the speed value and the material movement value. In another example, if the information map 358 maps a crop moisture value to different locations in the field, and the in-situ sensor 308 is sensing a value indicative of material spill or material movement, then model generator 310 generates a predictive material spill model that models the relationship between the crop moisture value and the material spill value or generates a predictive material movement model that models the relationship between the crop moisture value and the material movement value. In another example, if the information map 358 maps a fill level value to different locations in the field, and the in-situ sensor 308 is sensing a value indicative of material spill or material movement, then model generator 310 generates a predictive material spill model that models the relationship between the fill level value and the material spill value or a material movement model that models the relationship between the fill level value and the material movement value. As will be shown below, both a predictive material spill model and a predictive material movement model are examples of a predictive material dynamics model. Similarly, both a predictive material spill map and a predictive material movement map are examples of a predictive material dynamics map.

In another example, predictive model generator generates a model that is indicative of a relationship between a first set of values sensed by the in-situ sensors 308 and a second set of values sensed by in-situ sensors. For example, the first set of values may include material dynamics values, such as material spill values or material movement values sensed material spill and movement sensors 180, and the second set of values may include one or more of machine orientation values sensed by machine orientation sensors 327, speed values sensed by heading/speed sensors 325, crop moisture values sensed by crop moisture sensors 326, fill level values sensed by fill level sensors 324, material center of mass values sensed by material spill and movement sensors 180, such as imaging systems 386, and material mass values sensed by material spill and movement sensors 180, such as mass sensors 380. In said example, predictive model generator generates a predictive material dynamics model, such as a predictive material movement model that models the relationship between the material movement values and one or more of the machine orientation values, speed values, crop moisture values, fill level values, material center of mass values, and material mass values or a predictive material spill model that models the relationship between material spill values and one or more of the machine orientation values, speed values, crop moisture values, fill level values, material center of mass values, and material mass values.

In some examples, the predictive map generator 312 uses the predictive models generated by predictive model generator 310 to generate functional predictive maps that predict the value of one or more characteristics, such as one or more material dynamics characteristics such as one or more material movement characteristics or one or more material spill characteristics, sensed by the in-situ sensors 308 at different locations in the worksite based upon one or more of the information maps 358. For example, where the predictive model is a predictive material dynamics model in the form of a predictive material spill model that models a relationship between material spill characteristic(s) sensed by one or more in-situ sensors 308 and one or more of terrain values from a terrain map, speed values from a speed map, crop moisture values from a crop moisture map, and fill level values from a fill level map, then predictive map generator 312 generates a functional predictive material dynamics map in the form of a functional predictive material spill map that predicts one or more material spill characteristics at different locations at the worksite field based on one or more of the terrain values, the speed values, the crop moisture values, and the fill level values at those locations and the predictive material spill model. In another example, where the predictive model is a predictive material dynamics model in the form of a predictive material movement model that models a relationship between one or more material movement characteristics sensed by one or more in-situ sensors 308 and one or more of terrain values from a terrain map, speed values from a speed map, crop moisture values from a crop moisture map, and fill level values from a fill level map, then predictive map generator 312 generates a functional predictive material dynamics map in the form of a functional predictive material spill map that predicts one or more material movement characteristics at different locations at the worksite based on one or more of the terrain values, the speed values, the crop moisture values, and the fill level values at those locations and the predictive material movement model. It will be understood that functional predictive map 263 encompasses the various functional predictive maps that can be generated by predictive map generator 312.

In some examples, the type of values in the functional predictive map 263 may be the same as the in-situ data type sensed by the in-situ sensors 308. In some instances, the type of values in the functional predictive map 263 may have different units from the data sensed by the in-situ sensors 308. In some examples, the type of values in the functional predictive map 263 may be different from the data type sensed by the in-situ sensors 308 but have a relationship to the type of data type sensed by the in-situ sensors 308. For example, in some examples, the data type sensed by the in-situ sensors 308 may be indicative of the type of values in the functional predictive map 263. In some examples, the type of data in the functional predictive map 263 may be different than the data type in the information maps 358. In some instances, the type of data in the functional predictive map 263 may have different units from the data in the information maps 358. In some examples, the type of data in the functional predictive map 263 may be different from the data type in the information map 358 but has a relationship to the data type in the information map 358. For example, in some examples, the data type in the information maps 358 may be indicative of the type of data in the functional predictive map 263. In some examples, the type of data in the functional predictive map 263 is different than one of, or both of, the in-situ data type sensed by the in-situ sensors 308 and the data type in the information maps 358. In some examples, the type of data in the functional predictive map 263 is the same as one of, or both of, of the in-situ data type sensed by the in-situ sensors 308 and the data type in information maps 358. In some examples, the type of data in the functional predictive map 263 is the same as one of the in-situ data type sensed by the in-situ sensors 308 or the data type in the information maps 358, and different than the other.

As shown in FIG. 3, predictive map 264 predicts the value of a sensed characteristic (sensed by in-situ sensors 308), or a characteristic related to the sensed characteristic, at various locations across the worksite based upon one or more information values in one or more information maps 358 at those locations and using the predictive model. For example, if predictive model generator 310 has generated a predictive model indicative of a relationship between terrain value(s) and one or more material spill characteristics, then, given the terrain value at different locations across the worksite, predictive map generator 312 generates a predictive map 264 that predicts one or more material spill characteristics at different locations across the worksite. The terrain value, obtained from the terrain map, at those locations and the relationship between terrain values and one or more material spill characteristics, obtained from the predictive model, are used to generate the predictive map 264. This is merely one example.

Some variations in the data types that are mapped in the information maps 358, the data types sensed by in-situ sensors 308, and the data types predicted on the predictive map 264 will now be described.

In some examples, the data type in one or more information maps 358 is different from the data type sensed by in-situ sensors 308, yet the data type in the predictive map 264 is the same as the data type sensed by the in-situ sensors 308. For instance, the information map 358 may be a speed map, and the variable sensed by the in-situ sensors 308 may be material movement. The predictive map 264 may then be a predictive material movement map that maps predicted material movement values to different geographic locations in the in the worksite.

Also, in some examples, the data type in the information map 358 is different from the data type sensed by in-situ sensors 308, and the data type in the predictive map 264 is different from both the data type in the information map 358 and the data type sensed by the in-situ sensors 208.

In some examples, the information map 358 is from a prior pass through the field during a prior operation and the data type is different from the data type sensed by in-situ sensors 308, yet the data type in the predictive map 264 is the same as the data type sensed by the in-situ sensors 308. For instance, the information map 258 may be a terrain map generated during a previous operation on the worksite, and the variable sensed by the in-situ sensors 308 may be material movement. The predictive map 264 may then be a predictive material movement map that maps predicted material movement values to different geographic locations in the worksite.

In some examples, the information map 358 is from a prior pass through the field during a prior operation and the data type is the same as the data type sensed by in-situ sensors 308, and the data type in the predictive map 264 is also the same as the data type sensed by the in-situ sensors 308. For instance, the information map 358 may be a material spill map generated during a previous year, and the variable sensed by the in-situ sensors 308 may be material spill. The predictive map 264 may then be a predictive material spill map that maps predicted material spill values to different geographic locations in the field. In such an example, the relative material spill differences in the geo-referenced information map 358 from the prior year can be used by predictive model generator 310 to generate a predictive model that models a relationship between the relative material spill differences on the information map 358 and the material spill values sensed by in-situ sensors 308 during the current operation. The predictive model is then used by predictive map generator 310 to generate a predictive material spill map.

In another example, the information map 358 may be a terrain map generated during a prior operation in the same year, such as fertilizer application operation performed by towing vehicle 205 (or another towing vehicle) and a towed fertilizer applicator implement, and the variable sensed by the in-situ sensors 308 during the current operation may be material movement. The predictive map 264 may then be a predictive material movement map that maps predicted material movement values to different geographic locations in the worksite. In such an example, a map of the terrain values at time of fertilizer application is geo-referenced recorded and provided to mobile machine 100 as an information map 358 of terrain values. In-situ sensors 308 during a current operation can detect material movement at geographic locations in the field and predictive model generator 310 may then build a predictive model that models a relationship between material movement at time of the current operation and terrain values at the time of fertilizer application. This is because the terrain values at the time of nutrient application are likely to be the same as at the time of the current operation.

In some examples, predictive map 264 can be provided to the control zone generator 313. Control zone generator 313 groups adjacent portions of an area into one or more control zones based on data values of predictive map 264 that are associated with those adjacent portions. A control zone may include two or more contiguous portions of a worksite, such as a field, for which a control parameter corresponding to the control zone for controlling a controllable subsystem is constant. For example, a response time to alter a setting of controllable subsystems 316 may be inadequate to satisfactorily respond to changes in values contained in a map, such as predictive map 264. In that case, control zone generator 313 parses the map and identifies control zones that are of a defined size to accommodate the response time of the controllable subsystems 316. In another example, control zones may be sized to reduce wear from excessive actuator movement resulting from continuous adjustment. In some examples, there may be a different set of control zones for each controllable subsystem 316 or for groups of controllable subsystems 316. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265. In some examples, multiple crops may be simultaneously present in a field if an intercrop production system is implemented. In that case, predictive map generator 312 and control zone generator 313 are able to identify the location and characteristics of the two or more crops and then generate predictive map 264 and predictive map with control zones 265 accordingly.

It will also be appreciated that control zone generator 313 can cluster values to generate control zones and the control zones can be added to predictive control zone map 265, or a separate map, showing only the control zones that are generated. In some examples, the control zones may be used for controlling or calibrating mobile machine 100 or both. In other examples, the control zones may be presented to the operator 360 and used to control or calibrate mobile machine 100, and, in other examples, the control zones may be presented to the operator 360 or another user, such as a remote user 366, or stored for later use.

Predictive map 264 or predictive control zone map 265 or both are provided to control system 314, which generates control signals based upon the predictive map 264 or predictive control zone map 265 or both. In some examples, communication system controller 329 controls communication system 306 to communicate the predictive map 264 or predictive control zone map 265 or control signals based on the predictive map 264 or predictive control zone map 265 to other mobile machines that are operating at the same worksite or in the same operation. In some examples, communication system controller 329 controls the communication system 306 to send the predictive map 264, predictive control zone map 265, or both to other remote systems, such as remote computing systems 368.

Interface controller 330 is operable to generate control signals to control interface mechanisms, such as operator interface mechanisms 318 or user interfaces 364, or both. The interface controller 330 is also operable to present the predictive map 264 or predictive control zone map 265 or other information derived from or based on the predictive map 264, predictive control zone map 265, or both to operator 360 or a remote user 366, or both. Operator 360 may be a local operator or a remote operator. As an example, interface controller 330 generates control signals to control a display mechanism to display one or both of predictive map 264 and predictive control zone map 265 for the operator 260 or a remote user 366, or both. Interface controller 330 may generate operator or user actuatable mechanisms that are displayed and can be actuated by the operator or user to interact with the displayed map. The operator or user can edit the map by, for example, correcting a value displayed on the map, based on the operator's or the user's observation.

Path planning controller 334 illustratively generates control signals to control steering subsystem 352 to steer mobile machine 100 according to a desired path or according to desired parameters, such as desired steering angles based on one or more of the predictive map 264, the predictive control zone map 265, and the predictive model 311. Path planning controller can control a path planning system to generate a route for agricultural harvester 100 and can control propulsion subsystem 350 and steering subsystem 352 to steer agricultural harvester 100 along that route.

Propulsion controller 331 illustratively generates control signals to control propulsion subsystem 350 to control a speed characteristic, such as one or more of travel speed, acceleration, and deceleration, based on one or more of the predictive map 264, the predictive control zone map 265, and the predictive model 311. In one example, propulsion controller 331 illustratively generates control signals to control a speed characteristic of mobile machine 100. In another example propulsion controller 331 illustratively generates control signals to control a speed characteristic of another machine 375, such as another machine operating in concert with mobile machine 100. For example, mobile machine 100 can be an agricultural harvester 101, another machine 375 can be a material transport machine such as material transport machine 201 or 251. Propulsion controller 331 can generate control signals to control a speed characteristic of mobile machine 100 or another machine 375, or both, such as during a material transfer operation to desirably align mobile machine 100 and another machine to desirably transfer material.

Material transfer controller 335 illustratively generates control signals to control material transfer subsystem 341 to control operation of the material transfer subsystem 341, such as the position of spout 342, the position of chute 344, the speed at which auger 345 operates to propel material from material receptacles 307 through chute 344 and spout 342, as well as to initiate or end a material transfer operation. Material transfer controller generates control signal to control material transfer subsystem based on one or more of the predictive map 264, the predictive control zone map 265, and the predictive model 311. In one example, the position of spout 342 or chute 344, or both, can be controlled relative to mobile machine 100 or relative to another machine 375, such as another machine operating in concert with mobile machine 100. For example, mobile machine 100 can be an agricultural harvester 101, another machine 375 can be a material transport machine such as material transport machine 201 or 251. Material transfer controller 335 can generate control signals to control a position of spout 342 or chute 344, or both, relative to mobile machine 100 or another machine 375, such as during a material transfer operation to desirably transfer material.

Zone controller 336 illustratively generates control signals to control one or more controllable subsystems 316 to control operation of the one or more controllable subsystems based on the predictive control zone map 265.

Other controllers 337 included on the mobile machine 100, or at other locations in agricultural system 300, can control other subsystems based on the predictive map 264 or predictive control zone map 265 or both as well.

While the illustrated example of FIG. 3 shows that various components of agricultural system architecture 300 are located on mobile machine 100, it will be understood that in other examples one or more of the components illustrated on mobile machine 100 in FIG. 3 can be located at other locations, such as one or more remote computing systems 368. For instance, one or more of data stores 302, map selector 309, predictive model generator 310, predictive model 311, predictive map generator 312, functional predictive maps 263 (e.g., 264 and 265), control zone generator 313, and control system 314 can be located remotely from mobile machine 100 but can communicate with mobile machine 100 via communication system 306 and network 359. Thus the predictive models 311 and functional predictive maps 263 may be generated at remote locations away from mobile machine 100 and communicated to mobile machine 100 over network 302, for instance, communication system 306 can download the predictive models 311 and functional predictive maps 263 from the remote locations and store them in data store 302. In other examples, mobile machine 100 may access the predictive models 311 and functional predictive maps 263 at the remote locations without downloading the predictive models 311 and functional predictive maps 263. The information used in the generation of the predictive models 311 and functional predictive maps 263 may be provided to the predictive model generator 310 and the predictive map generator 312 at those remote locations over network 359, for example in-situ sensor data generator by in-situ sensors 308 can be provided over network 359 to the remote locations. Similarly, information maps 358 can be provided to the remote locations.

Figure 4:
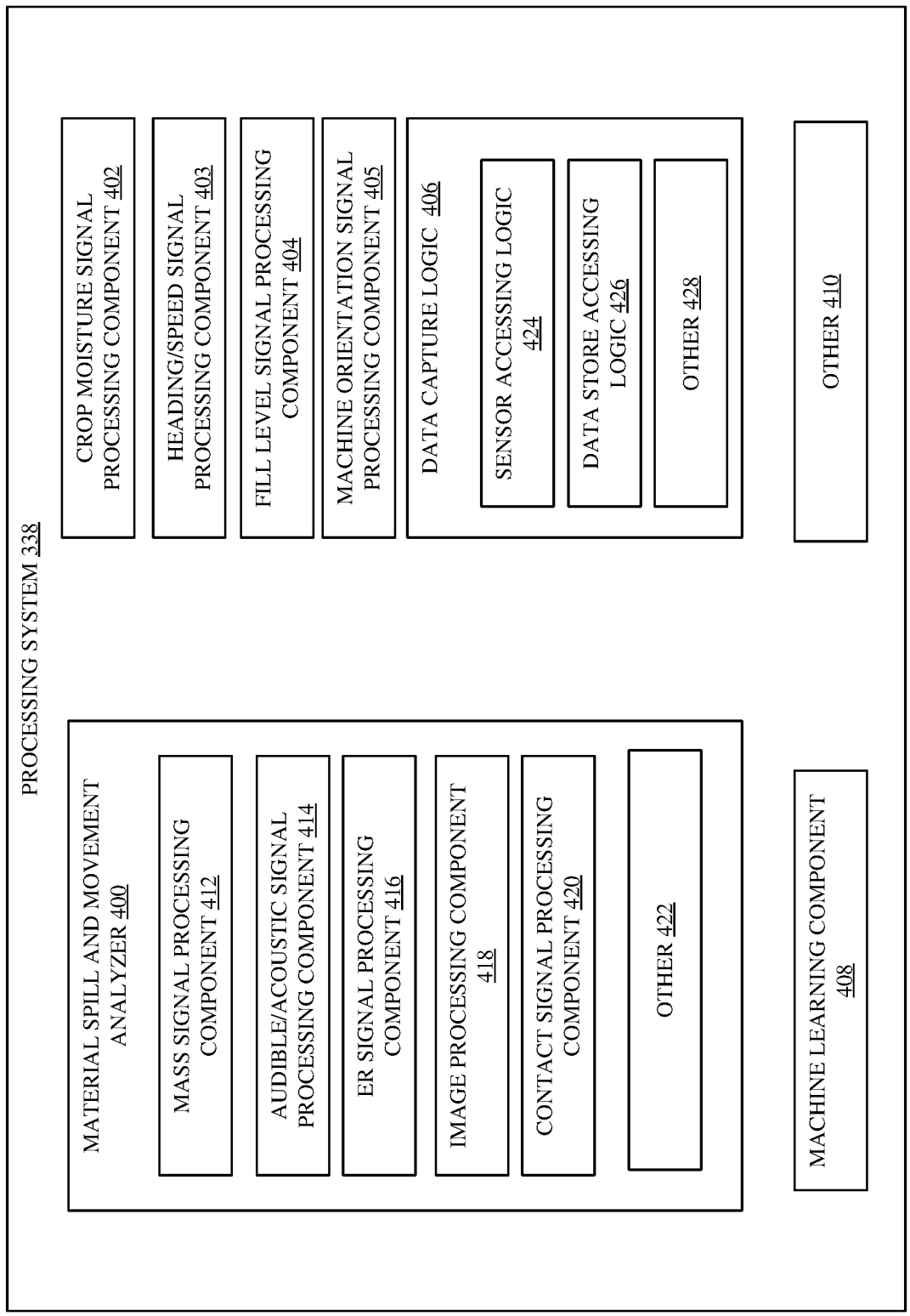
FIG. 4 is a block diagram showing the processing system of the agricultural system shown in FIG. 3 in more detail, according to some examples of the present disclosure.

FIG. 4 is a block diagram illustrating one example of processing system 338 in more detail. Processing system 338 illustratively includes material spill and movement analyzer 400, crop moisture signal processing component 402, heading/speed signal processing component 403, fill level signal processing component 404, machine orientation signal processing component 405, data capture logic 406, machine learning logic 408, and can include other functionality 410 as well, including, but not limited to, other signal processing components. Material spill and movement analyzer 400, itself, includes mass signal processing component 412, audible/acoustic signal processing component 414, electromagnetic radiation (ER) signal processing component 416, image processing component 418, contact signal processing component 422, and can include other processing functionality 422 as well. Data capture logic 406, itself, includes sensor accessing logic 424, data store accessing logic 426, and can include other items 428 as well.

In operation, processing system 338 processes sensor data generated by in-situ sensors 308 to generate processed sensor data indicative of one or more characteristics. For example, processing system 338 can identify material dynamics characteristics, for instance one or more of material spill characteristics, such as the occurrence, amount, and location of material spill and material movement characteristics, such as the occurrence, amount, distance of material movement, and direction of material movement. In some examples, material movement characteristics can also include proximal location to which material moved and processing system 338 can also determine a proximal location to which the material moved to within the material receptacle. For instance, it may be that the material moved to such a degree that it came within a threshold distance of a perimeter of the material receptacle (and thus was in danger of spilling out of the material receptacle) In further examples, processing system 338 can identify material mass characteristics, material center of mass characteristics, machine heading, machine speed characteristics, such as travel speed, acceleration, and deceleration, machine orientation characteristics, such as pitch and roll of mobile machine 100, crop moisture characteristics, material fill level, as well as various other characteristics.

Data capture logic 406 captures or obtains data that can be used by other items in processing system 338. Sensor accessing logic 424 can be used by processing system 338 to obtain or otherwise access sensor data (or values indicative of the sensed variables/characteristics) provided from in-situ sensors 308. Additionally, data store accessing logic 426 can be used by processing system 338 to obtain or access data stored on data stores 302. Upon obtaining various data, processing system 338, processes the data to identify characteristics at the worksite.

For instance, material spill and movement analyzer 400 processes data, such as sensor data from material spill and movement sensors 180, to identify characteristics of material spill or material movement, or both, as well as other characteristics of the material, such as mass of the material, center of mass of the material, as well as material fill level.

Mass signal processing component 412 obtains mass sensor data generated by mass sensors 380 and processes the mass sensor data to identify a mass signal value indicative of a mass (i.e., weight) of material in material receptacles 307. In some examples, mass sensors 380 generate an electrical signal indicative of the mass of material in material receptacle 307. Mass signal processing component 412 identifies a value of the electrical signal to determine a mass of the material in material receptacles 307. Mass signal processing component 412 also identifies a change of the mass signal value over time to determine a change in the mass of the material in material receptacle 407. The identified change in the mass of the material in material receptacle 407 can be used by material spill and movement analyzer 400 to identify characteristics of material spill or material movement, or both. For example, a decrease in the mass signal value can indicate material spillage from material receptacles 307, and the amount of decrease can indicate the amount of material spilled from material receptacles 307. In another example, where multiple mass sensors 380 are utilized, a decrease in the signal value of one mass sensor and an increase in the signal value of another mass sensor can indicate characteristics of material movement, such as the occurrence of material movement, the amount of material moved, the distance of material movement, and the direction of material movement. In some examples, the change in the mass signal value can be compared to an expected change in the mass signal value to determine the occurrence of material spill and/or the amount of material spill. For instance, where mobile machine 100 is receiving material in material receptacles 307, such as from a material transfer subsystem of another machine, the mass signal value may not be increasing or may not be increasing at the expected rate. For instance, knowing the material transfer rate of the transferring vehicle (e.g., 10 bushels per second) and the weight of the material being transferred (e.g., 56 pounds per bushel of corn), an expected mass signal value change (560 pounds per second) can be determined. Where there is no change in the mass signal value or where the mass signal value does not change at the expected rate, material spill and movement analyzer 400 can identify characteristics of material spill, such as the occurrence of material spill and the amount of material spilled. It will be understood that a mass signal value indicative of an empty weight of the mobile machine 100, or an empty weight of material receptacles 307, can be stored in data stores 308 and accessed by mass signal processing component 412 such that the generated mass signal value can be compared to the empty weight mass signal value. In some examples, at the beginning of an operation, when the mobile machine is empty (or at least material from the current operation has not yet been stored in the material receptacle), a mass signal value can be generated and used as a reference.

Additionally, where more than one mass sensor 380 is used, the mass signal value generated by each mass sensor 380 can be aggregated to derive a total mass of the material in material receptacle 307, additionally, the multiple mass signal values can be used to derive a distribution of the mass in material receptacle 307 as well as to identify a center of mass of the material in material receptacle 307.

Audible/acoustic signal processing component 414 obtains audible/acoustic sensor data generated by audible/acoustic sensors 382 and processes the audible/acoustic sensor data to identify an audible/acoustic signal value indicative of a noise generated by contact between material from material receptacles 307 and objects outside of material receptacle 307 or noise generated by movement of the material within material receptacle 307, or both. In some examples, audible/acoustic sensors 382 generate an electrical signal in response to contact between material from material receptacles 307 and object(s) outside of material receptacle 307 or noise generated by movement of material in material receptacles 307, or both. Audible/acoustic signal processing component 414 identifies a value of the electrical signal. The identified audible/acoustic signal value can be used by material spill and movement analyzer 414 to identify characteristics of material spill or characteristics of material movement, or both. For instance, the audible/acoustic signal value may vary from a value at which no material spillage occurs and a value at which at least some material spillage occurs (e.g., a threshold value). An audible/acoustic signal value at or exceeding the threshold value can indicate the occurrence of material spill. The amount to which the audible/acoustic signal value exceeds the threshold value can indicate an amount of material spilled (e.g., a higher audible/acoustic signal value may indicate that more material spilled as compared to a lower audible acoustic signal value). Similarly, the audible/acoustic signal may vary from a value at which no material movement occurs and a value at which at least some material movement occurs (e.g., a threshold value). An audible/acoustic signal value at or exceeding the threshold value can indicate the occurrence of material movement. The amount to which the audible acoustic signal value exceeds the threshold value can indicate an amount of material spilled (e.g., higher audible/acoustic signal value may indicate that more material moved as compared to a lower audible acoustic signal). Additionally, audible/acoustic signal processing component 414 can identify an audible/acoustic signal width value which indicates an amount of time that the audible/acoustic signal value was at or exceeded a threshold value. The audible/acoustic signal width value can be used by material spill and movement analyzer 400 to determine an amount of material spilled or moved, or both, (e.g., the longer the audible/acoustic signal value is at or exceeds the threshold value, the more material that is spilled or moved). Audible/acoustic signal processing component 414 can also generate an aggregated audible/acoustic signal value indicative of an aggregate audible/acoustic signal value over a given period of time, such as during a period of time in which the audible/acoustic signal value was at or exceeded the threshold value. The aggregated audible/acoustic signal value can be used by material spill and movement analyzer 400 to determine an amount of material spilled or an amount of material moved. Additionally, based on the position of the audible/acoustic sensors 382 and the audible/acoustic signal, material spill and movement analyzer 400 can also identify a location of material spill or a direction of material movement as well, in some examples, a proximal location to which the material moved, such as a proximity to a perimeter of the material receptacle.

Electromagnetic radiation (ER) signal processing 416 obtains electromagnetic radiation (ER) sensor data from electromagnetic (ER) sensors 384 and processes the ER sensor data to identify an ER signal value indicative of a characteristic of the electromagnetic radiation received by ER sensors 384. It will be understood that electromagnetic radiation includes various types of radiation, including radio, microwave, infrared, visible light, ultraviolet, X-ray, and gamma ray. Thus, ER sensors 384, as discussed herein, contemplate the detection of any of the forms of radiation on the electromagnetic spectrum. In some examples, ER sensors 384 generate an electrical signal in response to received electromagnetic radiation. ER signal processing 416 identifies a value of the electrical signal. The identified ER signal value can be used by material spill and movement analyzer 400 to identify characteristics of material spill or material movement, or both. For instance, the ER signal value may vary from a value at which no material spillage occurs and a value at which at least some material spillage occurs (e.g., a threshold value). An ER signal value at or exceeding the threshold value can indicate the occurrence of material spill. The amount to which the ER signal value exceeds the threshold value can indicate an amount of material spilled (e.g., the amount to which the electromagnetic radiation was disturbed by the presence of material may indicate more material having spilled). Similarly, the ER signal value may vary from a value at which no material movement occurs and a value at which at least some material movement occurs (e.g., a threshold value). An ER signal value at or exceeding the threshold value can indicate the occurrence of material movement. The amount to which the ER signal value exceeds the threshold value can indicate an amount of material moved (e.g., the amount to which the electromagnetic radiation was disturbed by the presence of material may indicate more material having moved). Additionally, ER signal processing component 416 can identify an ER signal width value which indicates an amount of time that the ER signal value was at or exceeded the threshold value. The ER signal width value can be used by material spill and movement analyzer 400 to determine an amount of material spilled or moved (e.g., the longer the ER signal value is at or exceeds the threshold value, the more material that is spilled or moved). ER signal processing component 416 can also generate an aggregated ER signal value indicative of an aggregate ER signal value over a given period of time, such as during a period of time in which the ER signal value was at or exceeded the threshold value. The aggregated ER signal value can be used by material spill and movement analyzer 400 to determine an amount of material spilled or moved. Additionally, based on the position of the ER sensors 384 and the ER signal, material spill and movement analyzer 400 can also identify a location of material spill or a direction of material movement as well, in some examples, a proximal location to which the material moved, such as a proximity to a perimeter of the material receptacle.

Image processing component 418 obtains images generated by imaging systems and processes the images to identify material spill characteristics, such as the occurrence of material spill based on the presence of material in an area outside of material receptacle 307 as well as to identify an amount of time in which material was present in an area outside of material receptacle 307 and an amount of material present within the area outside of material receptacle, as well as the location of the material spill. Additionally, image processing component 418 processes images generated by imaging system 386 to identify characteristics of material movement, such as the occurrence of material movement, the amount of material moved, a distance of material movement, the direction in which the material moved, as well as a proximal location to which the material moved, such as a proximity to a perimeter of the material receptacle. Image processing component 418 processes images generated by imaging system 386 to identify a characteristic indicative of the center of mass of the material within material receptacles 307, such as by identifying the mean position of the material composing the material pile within a material receptacle. Identifying the center of mass of material within the material receptacle can include identifying a top surface of the material pile relative to a perimeter (e.g., top edge) of the material receptacle and, knowing the dimensions of the material receptacle 307 (which can be stored in data store 302), identifying a center of mass of the material.

In some examples, the images obtained by image processing 418 may include areas outside of material receptacle 307 and areas inside of material receptacle 307. In such an example, image processing 426 can identify zones of the image which are outside of material receptacle 307, such that material present within those zones are indicative of characteristics of material spill, as well as identify zones of the image which are inside of the material receptacle such that material present within those zones are indicative of material movement characteristics or material center of mass characteristics, or both. In other examples, there may be dedicated imaging systems, with certain imaging systems dedicated to imaging only areas outside of material receptacle with other certain imaging systems dedicated to imaging only areas inside of the material receptacle.

Image processing component 418 processes the images to identify material, such as grain, in the image in areas outside of material receptacle 307. Based on the identification of material in the image in areas outside of material receptacle 307, material spill and movement analyzer 400 can determine the occurrence of material spill. Further, image processing component 418 can identify an amount of material present in areas outside of material receptacle 307, such as by summation of identified individual materials, such as individual grains, or by calculation of a volume based on an area of the image taken up by identified material. These are merely some examples. Based on the identified amount of material in the image in areas outside of material receptacle 307, material spill and movement analyzer 400 can identify the amount of material spilled. Additionally, image processing component 418 can identify an amount of time during which material was present in areas outside of material receptacle 307 as well as an amount of material present in areas outside of material receptacle 307 over that period of time, on the basis of which material spill and movement analyzer can identify the amount of material spilled.

It will be understood that image processing 426 can utilize a variety of image processing techniques or methods, such as sequential image comparison, RGB, edge detection, black/white analysis, machine learning, neural networks, pixel testing, pixel clustering, shape detection, as well any number of other suitable image processing and data extraction techniques and/or methods.

Contact signal processing component 420 obtains contact sensor data from contact sensors 388 and processes the contact sensor data to identify a contact signal value indicative of contact between material and contact sensors 388. In some examples, contact sensors 388 generate an electrical signal in response to contact between material and contact sensors 388. Contact signal processing component 420 identifies a value of the electrical signal. The identified contact signal value can be used by material spill and movement analyzer 400 to identify the occurrence of material spill as well as to identify an amount of material spilled. For instance, the contact signal value may vary from a value at which no material spillage occurs and a value at which at least some material spillage occurs (e.g., a threshold value). A contact signal value at or exceeding the threshold value can indicate the occurrence of material spill. Additionally, the amount to which the contact signal value exceeds the threshold value can indicate an amount of material spilled (e.g., a higher contact signal value may indicate that more material spilled as compared to a lower contact signal value). Similarly, the identified contact signal value can be used by material spill and movement analyzer 400 to identify the occurrence of material movement as well as to identify an amount of material moved. For instance, the contact signal value may vary from a value at which no material movement occurs and a value at which at least material movement occurs (e.g., a threshold value). A contact signal value at or exceeding the threshold value can indicate the occurrence of material movement. Additionally, the amount to which the contact signal value exceeds the threshold value can indicate an amount of material moved (e.g., a higher contact signal value may indicate that more material moved as compared to a lower contact signal value). Additionally, contact signal processing 428 can identify a contact signal value width value which indicates an amount of time that the contact signal value was at or exceeded the threshold value. The contact signal width value can be used by material spill and movement analyzer 400 to identify determine an amount of material spilled (e.g., the longer the contact signal value is at or exceeds the threshold value, the more material that is spilled) or an amount of material moved (e.g., the longer the contact signal value is at or exceeds the threshold value, the more material that is moved). Contact signal processing component 420 can also generate an aggregated contact signal value indicative of an aggregate contact signal value over a given period of time, such as during a period of time in which the contact signal value was at or exceeded the threshold value. The aggregated contact signal value can be used by material spill and movement analyzer 400 to determine an amount of material spilled or an amount of material moved. Additionally, based on the position of the contact sensors 388 and the contact signal, material spill and movement analyzer 400 can also identify a location of material spill, a direction of material movement or distance of material movement, or both. In other examples, based on the position of the contact sensors 388 and the contact signal, material spill and movement analyzer 400 can also identify a fill level of the material receptacle as well, in some examples, a proximal location to which the material moved, such as a proximity to a perimeter of the material receptacle.

Crop moisture signal processing component 402 obtains crop moisture sensor data from crop moisture sensors 326 and processes the crop moisture sensor data to identify a crop moisture signal value indicative of a moisture content of crop material. In some examples, crop moisture sensors 326 generate an electrical signal in response to crop moisture detection. Crop moisture signal processing component 402 identifies a value of the electrical signal to indicate a moisture content, such as a percentage or other value, of the crop material.

Heading/speed signal processing component 403 obtains heading and speed sensor data from heading/speed sensors 325 or from geographic position sensor 304, or both, and processes the heading and speed sensor data to identify a heading of mobile machine 100 as well as speed characteristic(s) (e.g., travel speed, acceleration, deceleration, etc.) of mobile machine 100. In some examples, speed sensors 325 sense the speed characteristics of mobile machine 100 by sensing the speed of rotation of ground engaging elements, speed of rotation of a drive shaft, speed of rotation of an axle, or various other component. The speed of rotation of the various components can indicate a travel speed of the mobile machine, an acceleration of the mobile machine 100, as well as a deceleration of mobile machine 100. In some examples, a change in speed of rotation over time can be identified to identify an acceleration or deceleration of mobile machine 100. In other examples, heading/speed signal processing component 403 utilizes geographic position information from geographic position sensors 304 to identify a heading, travel speed, acceleration, or deceleration of mobile machine 100.

Fill level signal processing component 404 obtains fill level sensor data from fill level sensors 324 or from material spill and movement sensors 180, or both, and processes the fill level sensor data to identify a fill level of a material receptacle 307 of mobile machine 100. For example, one or more ER sensors, such as 384 or other ER sensors, can be placed at various locations within the interior of material receptacle 307, and detected presence of material at that location, as indicated by an ER signal, can be used by fill level signal processing system 404 to identify a fill level value of material receptacle 307. In another example, one or more contact sensors, such as contact sensors 388 or other contact sensors, can be placed at various locations within the interior of material receptacle 307 and detected presence of material at that location, as indicated by a contact signal, can be used by fill level signal processing to identify a fill level value of material receptacle 307. In another example, one or more mass sensors, such as mass sensors 380 or other mass sensors, generate a mass signal indicative of the mass of the material within the material receptacle 307. The mass signal can be processed by fill level signal processing component 404 to identify a fill level value of material receptacle 307. For instance, the capacity of the material receptacle can be known (e.g., stored in data store 302), such as a bushel capacity, for instance 500 bushels. The material being placed in the material receptacle as well as the weight per unit of the material (e.g., weight per bushel) can also be known (e.g., stored in a data store). The current mass of the material in the material receptacle 307 can thus be used to derive a fill level of the material receptacle 307. In another example, fill level signal processing component can process an image generated by an imaging system, such as imaging system 386 or other imaging systems, to identify a top surface of the material pile relative to a perimeter (e.g., top edge) of the material receptacle 307 and, knowing the dimensions of the material receptacle 307 (which can be stored in data store 302), identifying a fill level value. In another example, one or more mass flow sensors can measure the amount of material entering the material receptacle, such as a mass flow sensor disposed along clean grain elevator 130, and can generate a signal indicative of a mass flow of material. The mass flow signal can be used by fill level signal processing component 404 to identify a fill level value of material receptacle 307. In some examples, the sensor data value, such as a mass flow sensor signal value, can be aggregated by fill level signal processing component 404 to identify a fill level value of material receptacle 307. For instance, aggregating the mass flow signal value since the last time the material receptacle 307 was emptied.

Machine orientation signal processing component 405 obtains machine orientation sensor data from machine orientation sensors 327 and processes the machine orientation sensor data to identify a machine orientation signal value indicative of an orientation (e.g., pitch, roll, and/or yaw) of mobile machine 100 at the worksite. In some examples, machine orientation sensors generate an electrical signal in response to machine orientation detection. Machine orientation signal processing component 405 identifies a value of the electrical signal to indicate an orientation value, such as a degree of pitch, roll, or yaw, of the mobile machine 100.

It will be understood that processing components 402, 403, 404, 405, 406, and 412-422 can utilize sensor signal filtering, such as noise filtering, sensor signal categorization, normalization, aggregation, as well as a variety of other processing techniques.

FIG. 4 also shows that processing system 338 can include machine learning component 408. Machine learning component 408 can include a machine learning model that can include machine learning algorithm(s), such as, but not limited to, memory networks, Bayes systems, decision tress, Eigenvectors, Eigenvalues and Machine Learning, Evolutionary and Genetic Algorithms, Expert Systems/Rules, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning, and the like.

Machine learning component 408 can improve the identification of characteristics, by improving the algorithmic process for the determination, such as by improving the recognition of values and/or characteristics indicated by sensor data. Machine learning component 408 can also utilize a closed-loop style learning algorithm such as one or more forms of supervised machine learning.

Figure 5:
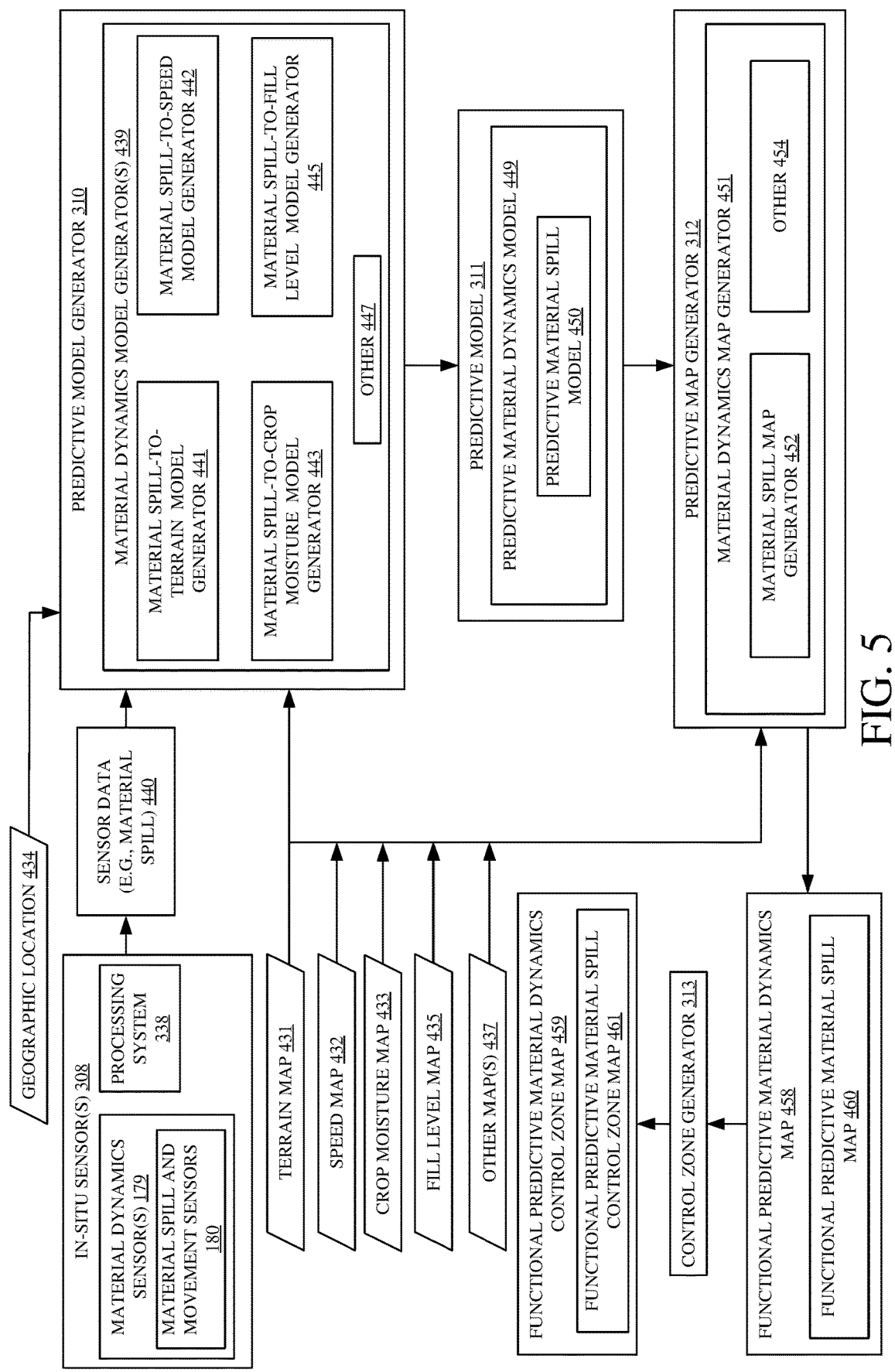
FIG. 5 is a block diagram showing one example of a predictive model generator and predictive map generator.

FIG. 5 is a block diagram of a portion of the agricultural system architecture 300 shown in FIG. 3. Particularly, FIG. 5 shows, among other things, examples of the predictive model generator 310 and the predictive map generator 312 in more detail. FIG. 5 also illustrates information flow among the various components shown. The predictive model generator 310 receives one or more of a terrain map 431, a speed map 432, a crop moisture map 433, a fill level map 435, or another type of map 437. Predictive model generator also receives a geographic location 434, or an indication of a geographic location, from geographic positions sensor 304. In-situ sensors 308 illustratively include material dynamics sensors 179, which include material spill and movement sensors 180, as well as a processing system 338. In some instances, material spill and movement sensors 180 may be located on-board mobile machine 100. In the illustrated example of FIG. 5, processing system 338 processes sensor data generated from material spill and movement sensors 180 to generate processed sensor data 440 indicative of material spill values. While the processing system 338 is illustrated as part of in-situ sensors 308 in FIG. 5, in other examples processing system 338 can be separate from but in operable communication with in-situ sensors 308, such as the example shown in FIG. 3.

As shown in FIG. 5, the example predictive model generator 310 includes, as examples of material dynamics model generators 439, one or more of a material spill-to-terrain model generator 441, a material spill-to-speed model generator 442, a material spill-to-crop moisture model generator 443, and a material spill-to-fill level model generator 445. In other examples, the predictive model generator 310 may include additional, fewer, or different components than those shown in the example of FIG. 5. Consequently, in some examples, the predictive model generator 310 may include other items 447 as well, which may include other types of predictive model generators to generate other types of material spill models, such as a material spill-to-other map characteristic model generator.

Material spill-to-terrain model generator 441 identifies a relationship between material spill detected in in-situ sensor data 440, at a geographic location corresponding to where the sensor data indicating the material spill were obtained, and terrain value(s) from the terrain map 431 corresponding to the same location in the worksite where the material spill was detected. Based on this relationship established by material spill-to-terrain model generator 441, material spill-to-terrain model generator 441 generates a predictive material spill model. The predictive material spill model is used by material spill map generator 452 to predict material spill at different locations in the worksite based upon the georeferenced terrain value(s) contained in the terrain map 431 at the same locations in the worksite. Thus, for a given location in the worksite, material spill can be predicted at the given location based on the predictive material spill model and the terrain value(s), from the terrain map 431, at that given location.

Material spill-to-speed model generator 442 identifies a relationship between material spill detected in in-situ sensor data 440, at a geographic location corresponding to where the sensor data indicating the material spill were obtained, and speed value(s) from the speed map 432 corresponding to the same location in the worksite where the material spill was detected. Based on this relationship established by material spill-to-speed model generator 442, material spill-to-speed model generator 442 generates a predictive material spill model. The predictive material spill model is used by material spill map generator 452 to predict material spill at different locations in the worksite based upon the georeferenced speed value(s) contained in the speed map at the same locations in the worksite. Thus, for a given location in the worksite, material spill can be predicted at the given location based on the predictive material spill model and the speed value(s), from the speed map 432, at that given location.

Material spill-to-crop moisture model generator 443 identifies a relationship between material spill detected in in-situ sensor data 440, at a geographic location corresponding to where the sensor data indicating the material spill were obtained, and crop moisture value(s) from the crop moisture map 433 corresponding to the same location in the worksite where the material spill was detected. Based on this relationship established by material spill-to-crop moisture model generator 443, material spill-to-crop moisture model generator 443 generates a predictive material spill model. The predictive material spill model is used by material spill map generator 452 to predict material spill at different locations in the worksite based upon the georeferenced crop moisture value(s) contained in the crop moisture map 433 at the same locations in the worksite. Thus, for a given location in the worksite, material spill can be predicted at the given location based on the predictive material spill model and the crop moisture value(s), from the crop moisture map 433, at that given location.

Material spill-to-fill level model generator 445 identifies a relationship between material spill detected in in-situ sensor data 440, at a geographic location corresponding to where the sensor data indicating the material spill were obtained, and fill level value(s) from the fill level map 435 corresponding to the same location in the worksite where the material spill was detected. Based on this relationship established by material spill-to-fill level model generator 445, material spill-to-fill level model generator 445 generates a predictive material spill model. The predictive material spill model is used by material spill map generator 452 to predict material spill at different locations in the worksite based upon the georeferenced fill level value(s) contained in the fill level map 435 at the same locations in the worksite. Thus, for a given location in the worksite, material spill can be predicted at the given location based on the predictive material spill model and the fill level value(s), from the fill level map 435, at that given location.

In light of the above, the predictive model generator 310 is operable to produce a plurality of predictive material spill models, as examples of predictive material dynamics models, such as one or more of the predictive material spill models generated by model generators 441, 442, 443, 445 and 447. In another example, two or more of the predictive models described above may be combined into a single predictive material spill model, such as a predictive material spill model that predicts material spill based upon two or more of the terrain value(s), the speed value(s), the crop moisture values, and the fill level values at different locations in the field. Any of these material spill models, or combinations thereof, are represented collectively by predictive material spill model 450 in FIG. 5. Predictive material spill model 450 is an example of a predictive material dynamics model 449.

The predictive material spill model 450 is provided to predictive map generator 312. In the example of FIG. 5, predictive map generator 312 includes a material spill map generator 452, as an example of a material dynamics map generator 451. In other examples, predictive map generator 312 may include additional or different map generators. Thus, in some examples, predictive map generator 312 may include other items 454 which may include other types of map generators to generate other types of maps.

Material spill map generator 452 receives one or more of the terrain map 431, the speed map 432, the crop moisture map 433, and the fill level map 435 along with the predictive material spill model 450 which predicts material spill based upon one or more of a terrain value, a speed value, a crop moisture value, and a fill level value and generates a predictive map that predicts material spill at different locations in the worksite.

Predictive map generator 312 outputs a functional predictive material spill map 460 that is predictive of material spill. The functional predictive material spill map 460 is an example of a functional predictive material dynamics map 458. The functional predictive material spill map is a predictive map 264. The functional predictive material spill map 460 predicts material spill at different locations in a worksite. The functional predictive material spill map 460 may be provided to control zone generator 313, control system 314, or both. Control zone generator 313 generates control zones and incorporates those control zones into the functional predictive material spill map 460 to produce a predictive control zone map 265, that is a functional predictive material spill control zone map 461. The functional predictive material spill control zone map 461 is an example of a functional predictive material dynamics control zone map 459. One or both of functional predictive material spill map 460 and functional predictive material spill control zone map 461 may be provided to control system 314, which generates control signals to control one or more of the controllable subsystems 316 based upon the functional predictive material spill map 460, the functional predictive material spill control zone map 461, or both.

Figure 6A:
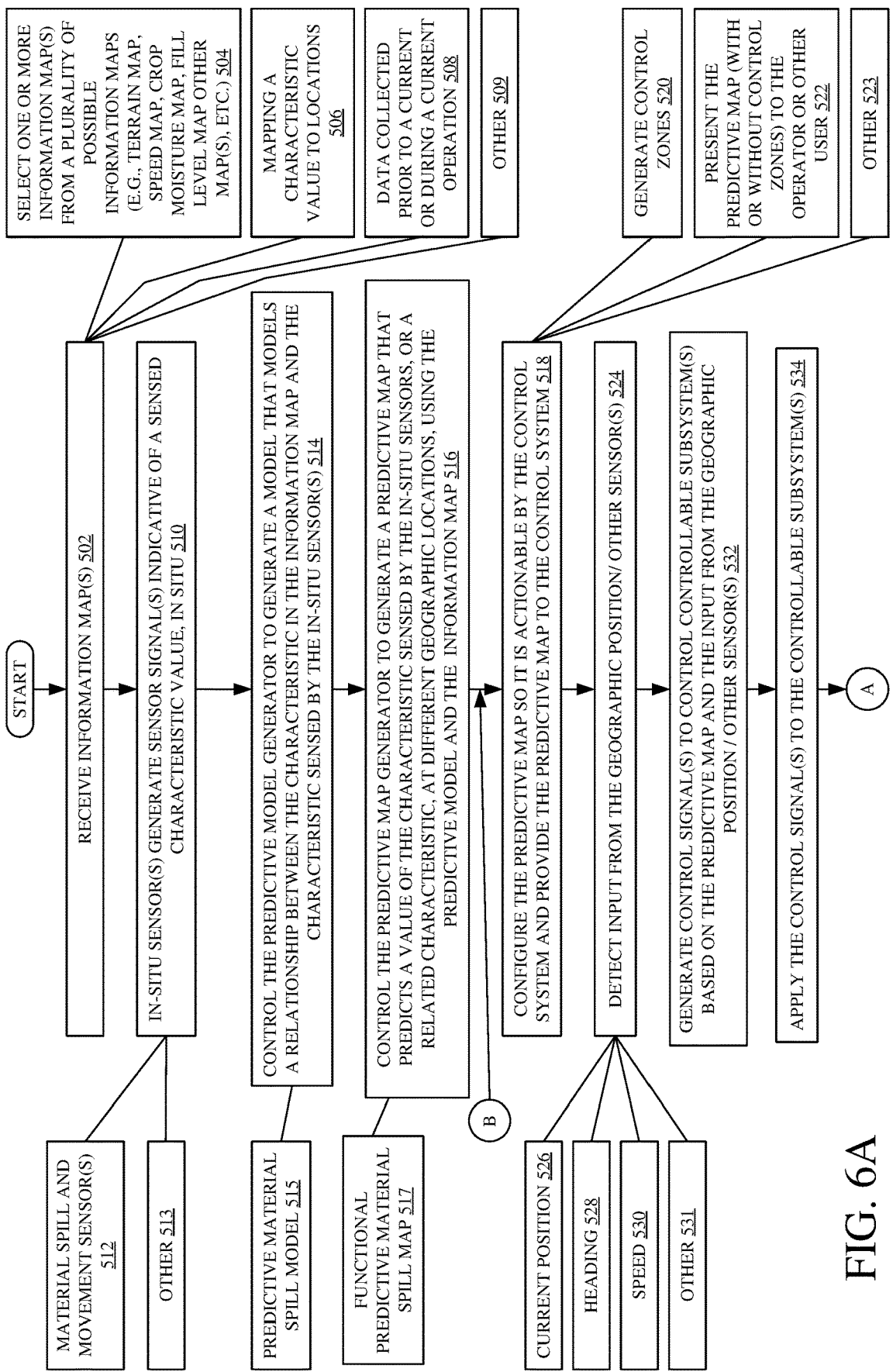
FIGS. 6A-6B (collectively referred to herein as FIG. 6) show a flow diagram illustrating one example of operation of an agricultural system in generating a map.
Figure 6B:
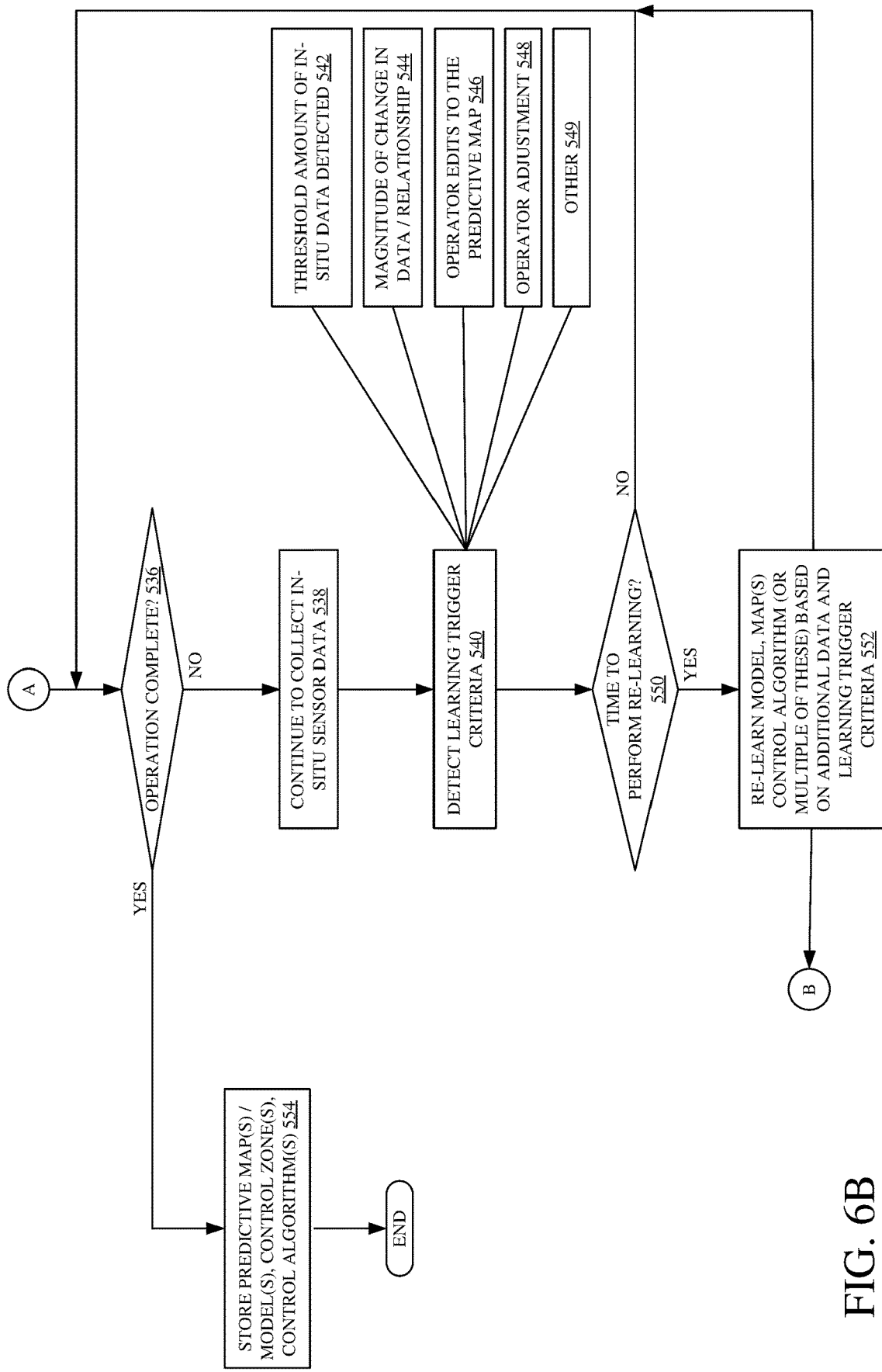

FIGS. 6A-6B (collectively referred to herein as FIG. 6) show a flow diagram illustrating one example of the operation of agricultural system architecture 300 in generating a predictive model and a predictive map At block 502, agricultural system 300 receives one or more information maps 358. Examples of information maps 358 or receiving information maps 358 are discussed with respect to blocks 504, 506, 508, and 509. As discussed above, information maps 358 map values of a variable, corresponding to a characteristic, to different locations, as indicated at block 506. As indicated at block 504, receiving the information maps 358 may involve selecting one or more of a plurality of possible information maps 358 that are available. For instance, one information map 358 may be a terrain map, such as terrain map 431. Another information map 358 may be a speed map, such as speed map 432. Another information map may be a crop moisture map, such as crop moisture map 433. Another information map may be a fill level map, such as fill level map 435. Various other maps, such as other maps 437, are contemplated herein. The process by which one or more information maps 358 are selected can be manual, semi-automated, or automated. The information maps 358 can be based on data collected prior to a current operation. For instance, the data may be collected based on aerial images taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations may be outfitted with one or more sensors that generate sensor data indicative of one or more characteristics. For example, the sensed speed and orientation of mobile machine 100 operating at the worksite in past year may be used as data to generate the information maps 358. In other examples, and as described above, the information maps 358 may be predictive maps having predictive values, such as a predictive speed map having predictive speed values, a predictive terrain map having predictive terrain values, a predictive crop moisture map having predictive crop moisture values, and a predictive fill level map having predictive fill level values. The predictive information map 358 can be generated by predictive map generator 312 based on a model generated by predictive model generator 310. The data for the information maps 358 can be obtained by agricultural system 300 using communication system 306 and stored in data store 302. The data for the information maps 358 can be obtained by agricultural system 300 using communication system 306 in other ways as well, and this is indicated by block 509 in the flow diagram of FIG. 6.

As mobile machine 100 is operating, in-situ sensors 308 generate sensor signals indicative of one or more in-situ data values indicative of a characteristic, for example, material dynamics sensors 179, such as material spill and movement sensors 180, generate sensor signals indicative of one or more in-situ data values indicative of material dynamics, such as material spill, as indicated by block 512. In some examples, data from in-situ sensors 308 is georeferenced using position, heading, or speed data from geographic position sensor 304.

Predictive model generator 310 controls one or more material dynamics model generators 439, such as one or more of the material spill-to-terrain model generator 441, material spill-to-speed model generator 442, material spill-to-crop moisture model generator 443, and material spill-to-fill level model generator 445 to generate a model that models the relationship between the mapped values, such as the terrain values, the speed values, the crop moisture values, and the fill level values contained in the respective information map and the in-situ values sensed by the in-situ sensors 308 as indicated by block 514. Predictive model generator 310 generates a predictive material dynamics model 449, such as predictive material spill model 450 as indicated by block 515.

The relationship or model generated by predictive model generator 310 is provided to predictive map generator 312. Predictive map generator 312 controls a predictive material dynamics map generator 451, such as predictive material spill map generator 452, to generate a functional predictive material dynamics map 458, such as functional predictive material spill map that predicts material spill (or sensor value(s) indictive of material spill) at different geographic locations in a worksite at which mobile machine 100 is operating using the predictive material spill model 450 and one or more of the information maps, such as terrain map 431, speed map 432, crop moisture map 433, and fill level map 435 as indicated by block 516.

It should be noted that, in some examples, the functional predictive material spill map 460 may include two or more different map layers. Each map layer may represent a different data type, for instance, a functional predictive material spill map 460 that provides two or more of a map layer that provides predictive material spill based on terrain values from terrain map 431, a map layer that provides predictive material spill based on speed values from speed map 432, a map layer that provides predictive material spill based on crop moisture values from crop moisture map 433, and a map layer that provides predictive material spill based on fill level values from fill level map 435. In other examples, functional predictive material spill map 460 may include a map layer that provides predictive material spill based on two or more of terrain values from terrain map 431, speed values from speed map 432, crop moisture values from crop moisture map 433, and fill level values from fill level map 435.

At block 518, predictive map generator 312 configures the functional predictive material spill map 460 so that the functional predictive material spill map 460 is actionable (or consumable) by control system 314. Predictive map generator 312 can provide the functional predictive material spill map 460 to the control system 314 or to control zone generator 313, or both. Some examples of the different ways in which the functional predictive material spill map 460 can be configured or output are described with respect to blocks 518, 520, 522, and 523. For instance, predictive map generator 312 configures functional predictive material spill map 460 so that functional predictive material spill map 460 includes values that can be read by control system 314 and used as the basis for generating control signals for one or more of the different controllable subsystems 316 of mobile machine 100, as indicated by block 518.

At block 520, control zone generator 313 can divide the functional predictive material spill map 460 into control zones based on the values on the functional predictive material spill map 460 to generate functional predictive material spill control zone map 461, as an example of a functional predictive material dynamics control zone map 459. Contiguously-geolocated values that are within a threshold value of one another can be grouped into a control zone. The threshold value can be a default threshold value, or the threshold value can be set based on an operator input, based on an input from an automated system, or based on other criteria. A size of the zones may be based on a responsiveness of the control system 314, the controllable subsystems 316, based on wear considerations, or on other criteria.

At block 522, predictive map generator 312 configures functional predictive material spill map 460 for presentation to an operator or other user. At block 522, control zone generator 313 can configure functional predictive material spill control zone map 461 for presentation to an operator or other user. When presented to an operator or other user, the presentation of the functional predictive material spill map 460 or of functional predictive material spill control zone map 461 or both may contain one or more of the predictive values on the functional predictive material spill map 460 correlated to geographic location, the control zones of functional predictive material spill control zone map 461 correlated to geographic location, and settings values or control parameters that are used based on the predicted values on predictive map 460 or control zones on predictive control zone map 461. The presentation can, in another example, include more abstracted information or more detailed information. The presentation can also include a confidence level that indicates an accuracy with which the predictive values on predictive map 460 or the control zones on predictive control zone map 461 conform to measured values that may be measured by sensors on mobile machine 100 as mobile machine 100 operates at the worksite. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of mobile machine 100 may be unable to see the information corresponding to the predictive map 460 or make any changes to machine operation. A supervisor, such as a supervisor at a remote location, however, may be able to see the predictive map 460 on the display but be prevented from making any changes. A manager, who may be at a separate remote location, may be able to see all of the elements on predictive map 460 and also be able to change the predictive map 460. In some instances, the predictive map 460 accessible and changeable by a manager located remotely may be used in machine control. This is one example of an authorization hierarchy that may be implemented. The predictive map 460 or predictive control zone map 461 or both can be configured in other ways as well, as indicated by block 523.

At block 524, input from geographic position sensor 304 and other in-situ sensors are received by the control system 314. Particularly, at block 526, control system 314 detects an input from the geographic position sensor 304 identifying a geographic location of mobile machine 100. Block 528 represents receipt by the control system 314 of sensor inputs indicative of trajectory or heading of mobile machine 100, and block 530 represents receipt by the control system 314 of a speed of agricultural harvester 100. Block 531 represents receipt by the control system 314 of other information from various in-situ sensors 308.

At block 532, control system 314 generates control signals to control the controllable subsystems 316 based on the functional predictive material spill map 460 or the functional predictive material spill control zone map 461 or both and the input from the geographic position sensor 304 and any other in-situ sensors 308, such as heading and/or speed inputs from heading/speed sensors 325. At block 534, control system 314 applies the control signals to the controllable subsystems 316. It will be appreciated that the particular control signals that are generated, and the particular controllable subsystems 316 that are controlled, may vary based upon one or more different things. For example, the control signals that are generated and the controllable subsystems 316 that are controlled may be based on the type of functional predictive material spill map 460 or functional predictive material spill control zone map 461 or both that is being used. Similarly, the control signals that are generated and the controllable subsystems 216 that are controlled and the timing of the control signals can be based on various latencies of mobile machine 100 and the responsiveness of the controllable subsystems 316.

By way of example, propulsion controller 331 of control system 314 can generate control signals to control propulsion subsystem 350 to control one or more propulsion parameters of mobile machine 100, such as one or more of the speed at which the mobile machine travels, the deceleration of mobile machine 100, and the acceleration of mobile machine 100. For instance, functional predictive material spill map 460 or functional predictive material spill control zone map 461 may predict material spill in area(s) of the worksite ahead of or around mobile machine 100, in which case, propulsion controller 331 can generate control signals to control propulsion system 350 to control a propulsion parameter, such as travel speed, acceleration, deceleration, etc., at those area(s). In another example, path planning controller 334 of control system 314 can generate control signals to control steering subsystem 352 to control a route parameter of mobile machine 100, such as one or more of a commanded path at the worksite over which mobile machine 100 travels, and the steering of mobile machine 100. For instance, functional predictive material spill map 460 or functional predictive material spill control zone map 461, or both, may predict material spill in area(s) of the worksite ahead of or around mobile machine 100, in which case, path planning controller 334 can generate control signals to control steering subsystem 352 to cause mobile machine 100 to avoid traveling those area(s) or to travel through them in a different manner, such as with limited steering angles. In another example, material transfer controller 335 of control system 314 can generate control signals to control material transfer subsystem 341 to initiate or end a material transfer operation. These are merely some examples. Control system 314 can generate a variety of different control signals to control a variety of different controllable subsystems 316 based on functional predictive material spill map 460 or functional predictive material spill control zone map 461, or both.

At block 536, a determination is made as to whether the operation has been completed. If the operation is not completed, the processing advances to block 538 where in-situ sensor data from geographic position sensor 304 and in-situ sensors 308 (and perhaps other sensors) continue to be read.

In some examples, at block 540, agricultural system 300 can also detect learning trigger criteria to perform machine learning on one or more of the functional predictive material spill map 460, functional predictive material spill control zone map 461, predictive material spill model 450, the zones generated by control zone generator 313, one or more control algorithms implemented by the controllers in the control system 314, and other triggered learning.

The learning trigger criteria can include any of a wide variety of different criteria. Some examples of detecting trigger criteria are discussed with respect to blocks 542, 544, 546, 548, and 549. For instance, in some examples, triggered learning can involve recreation of a relationship used to generate a predictive model when a threshold amount of in-situ sensor data are obtained from in-situ sensors 308. In such examples, receipt of an amount of in-situ sensor data from the in-situ sensors 308 that exceeds a threshold triggers or causes the predictive model generator 310 to generate a new predictive model that is used by predictive map generator 312. Thus, as mobile machine 100 continues an operation, receipt of the threshold amount of in-situ sensor data from the in-situ sensors 308 triggers the creation of a new relationship represented by a new predictive material spill model 450 generated by predictive model generator 310. Further, a new functional predictive material spill map 460, a new functional predictive material spill control zone map 461, or both can be generated using the new predictive material spill model 450. Block represents detecting a threshold amount of in-situ sensor data used to trigger creation of a new predictive model.

In other examples, the learning trigger criteria may be based on how much the in-situ sensor data from the in-situ sensors 308 are changing, such as over time or compared to previous values. For example, if variations within the in-situ sensor data (or the relationship between the in-situ sensor data and the information in the one or more information maps 358) are within a selected range or is less than a defined amount, or below a threshold value, then a new predictive model is not generated by the predictive model generator 310. As a result, the predictive map generator 312 does not generate a new functional predictive material spill map 460, a new functional predictive material spill control zone map 461, or both. However, if variations within the in-situ sensor data are outside of the selected range, are greater than the defined amount, or are above the threshold value, for example, then the predictive model generator 310 generates a new predictive model 450 using all or a portion of the newly received in-situ sensor data that the predictive map generator 312 uses to generate a new predictive map 460 which can be provided to control zone generator 313 for the creation of a new predictive control zone map 461. At block 544, variations in the in-situ sensor data, such as a magnitude of an amount by which the data exceeds the selected range or a magnitude of the variation of the relationship between the in-situ sensor data and the information in the one or more information maps, can be used as a trigger to cause generation of one or more of a new predictive model 450, a new predictive map 460, and a new predictive control zone map 461. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 310 switches to a different information map (different from the originally selected information map), then switching to the different information map may trigger re-learning by predictive model generator 310, predictive map generator 312, control zone generator 313, control system 314, or other items. In another example, transitioning of mobile machine 100 to a different topography or to a different control zone may be used as learning trigger criteria as well.

In some instances, operator 360 or user 366 can also edit the functional predictive material spill map 460 or functional predictive material spill control zone map 461 or both. The edits can change a value on the functional predictive material spill map 460, change a size, shape, position, or existence of a control zone on functional predictive material spill control zone map 461, or both. Block 546 shows that edited information can be used as learning trigger criteria.

In some instances, it may also be that operator 360 or user 366 observes that automated control of a controllable subsystem 316, is not what the operator or user desires. In such instances, the operator 360 or user 366 may provide a manual adjustment to the controllable subsystem 316 reflecting that the operator 360 or user 366 desires the controllable subsystem 316 to operate in a different way than is being commanded by control system 314. Thus, manual alteration of a setting by the operator 360 or user 366 can cause one or more of predictive model generator 310 to relearn a model, predictive map generator 312 to regenerate functional predictive material spill map 460, control zone generator 313 to regenerate one or more control zones on functional predictive material spill control zone map 461, and control system 314 to relearn a control algorithm or to perform machine learning on one or more of the controller components 329 through 337 in control system 314 based upon the adjustment by the operator 360 or user 366, as shown in block 548. Block 549 represents the use of other triggered learning criteria.

In other examples, relearning may be performed periodically or intermittently based, for example, upon a selected time interval such as a discrete time interval or a variable time interval, as indicated by block 550.

If relearning is triggered, whether based upon learning trigger criteria or based upon passage of a time interval, as indicated by block 550, then one or more of the predictive model generator 310, predictive map generator 312, control zone generator 313, and control system 314 performs machine learning to generate a new predictive model, a new predictive map, a new control zone, and a new control algorithm, respectively, based upon the learning trigger criteria. The new predictive model, the new predictive map, the new control zone, and the new control algorithm are generated using any additional data that has been collected since the last learning operation was performed. Performing relearning is indicated by block 552.

If the operation has not been completed, operation moves from block 552 to block such that operation of the mobile machine 100 can be controlled based on the new predictive map, a new control zone, or a new control algorithm.

If the operation has been completed, operation moves from block 552 to block 554 where one or more of the functional predictive material spill map 460, functional predictive material spill control zone map 461, the predictive material spill model 450 generated by predictive model generator 310, control zone(s), and control algorithm(s) are stored. The predictive map 460, predictive control zone map 461, predictive model 450, control zone(s), and control algorithm(s) may be stored locally on data store 302 or sent to a remote system using communication system 306 for later use.

Figure 7:
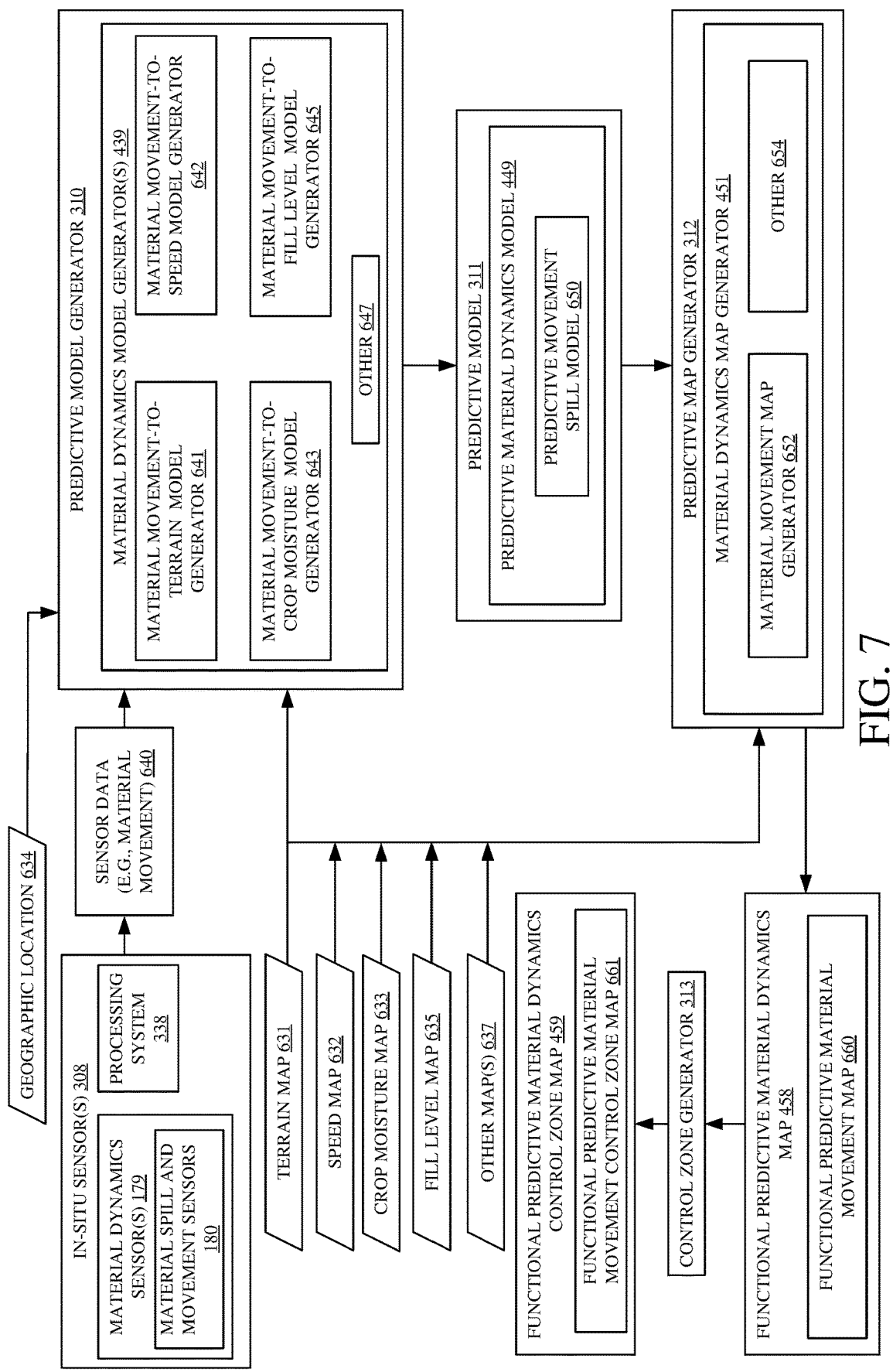
FIG. 7 is a block diagram showing one example of a predictive model generator and predictive map generator.

FIG. 7 is a block diagram of a portion of the agricultural system architecture 300 shown in FIG. 3. Particularly, FIG. 7 shows, among other things, examples of the predictive model generator 310 and the predictive map generator 312 in more detail. FIG. 7 also illustrates information flow among the various components shown. The predictive model generator 310 receives one or more of a terrain map 631, a speed map 632, a crop moisture map 633, a fill level map 635 or another type of map 635. In some examples terrain map 631 can be similar to terrain map 431, speed map 632 can be similar to speed map 432, crop moisture map 633 can be similar to crop moisture map 433, and fill level map 635 can be similar to fill level map 435. Predictive model generator also receives a geographic location 634, or an indication of a geographic location, from geographic positions sensor 304. In-situ sensors 308 illustratively include material dynamics sensors 179, which include material spill and movement sensors 180, as well as a processing system 338. In some instances, material spill and movement sensors 180 may be located on-board mobile machine 100. In the illustrated example, the processing system 338 processes sensor data generated from material spill and movement sensors 180 to generate processed sensor data 640 indicative of material movement values. While the processing system 338 is illustrated as part of in-situ sensors 308 in FIG. 7, in other examples processing system 338 can be separate from but in operable communication with in-situ sensors 308, such as the example shown in FIG. 3.

As shown in FIG. 7, the example predictive model generator 310 includes, as examples of material dynamics model generators 439, one or more of a material movement-to-terrain model generator 641, a material movement-to-speed model generator 642, a material movement-to-crop moisture model generator 643, and a material movement-to-fill level model generator 645. In other examples, the predictive model generator 310 may include additional, fewer, or different components than those shown in the example of FIG. 7. Consequently, in some examples, the predictive model generator 310 may include other items 647 as well, which may include other types of predictive model generators to generate other types of material movement models, such as a material movement-to-other map characteristic model generator.

Material movement-to-terrain model generator 641 identifies a relationship between material movement detected in in-situ sensor data 640, at a geographic location corresponding to where the sensor data indicating the material movement were obtained, and terrain value(s) from the terrain map 631 corresponding to the same location in the worksite where the material movement was detected. Based on this relationship established by material movement-to-terrain model generator 641, material movement-to-terrain model generator 641 generates a predictive material movement model. The predictive material movement model is used by material movement map generator 652 to predict material movement at different locations in the worksite based upon the georeferenced terrain value(s) contained in the terrain map 631 at the same locations in the worksite. Thus, for a given location in the worksite, material movement can be predicted at the given location based on the predictive material movement model and the terrain value(s), from the terrain map 631, at that given location.

Material movement-to-speed model generator 642 identifies a relationship between material movement detected in in-situ sensor data 640, at a geographic location corresponding to where the sensor data indicating the material movement were obtained, and speed value(s) from the speed map 632 corresponding to the same location in the worksite where the material movement was detected. Based on this relationship established by material movement-to-speed model generator 642, material movement-to-speed model generator 642 generates a predictive material movement model. The predictive material movement model is used by material movement map generator 652 to predict material movement at different locations in the worksite based upon the georeferenced speed value(s) contained in the speed map 632 at the same locations in the worksite. Thus, for a given location in the worksite, material movement can be predicted at the given location based on the predictive material movement model and the speed value(s), from the speed map 632, at that given location.

Material movement-to-crop moisture model generator 643 identifies a relationship between material movement detected in in-situ sensor data 640, at a geographic location corresponding to where the sensor data indicating the material movement were obtained, and crop moisture value(s) from the crop moisture map 632 corresponding to the same location in the worksite where the material movement was detected. Based on this relationship established by material movement-to-crop moisture model generator 643, material movement-to-crop moisture model generator 643 generates a predictive material movement model. The predictive material movement model is used by material movement map generator 652 to predict material movement at different locations in the worksite based upon the georeferenced crop moisture value(s) contained in the crop moisture map 633 at the same locations in the worksite. Thus, for a given location in the worksite, material movement can be predicted at the given location based on the predictive material movement model and the crop moisture value(s), from the crop moisture map 633, at that given location.

Material movement-to-fill level model generator 645 identifies a relationship between material movement detected in in-situ sensor data 640, at a geographic location corresponding to where the sensor data indicating the material movement were obtained, and fill level value(s) from the fill level map 635 corresponding to the same location in the worksite where the material movement was detected. Based on this relationship established by material movement-to-fill level model generator 645, material movement-to-fill level model generator 645 generates a predictive material movement model. The predictive material movement model is used by material movement map generator 652 to predict material movement at different locations in the worksite based upon the georeferenced fill level value(s) contained in the fill level map 635 at the same locations in the worksite. Thus, for a given location in the worksite, material movement can be predicted at the given location based on the predictive material movement model and the fill level value(s), from the fill level map 635, at that given location.

In light of the above, the predictive model generator 310 is operable to produce a plurality of predictive material movement models, as examples of predictive material dynamics models, such as one or more of the predictive material movement models generated by model generators 641, 642, 643, 645 and 647. In another example, two or more of the predictive models described above may be combined into a single predictive material movement model, such as a predictive material movement model that predicts material movement based upon two or more of the terrain value(s), the speed value(s), the crop moisture value(s), and the fill level value(s) at different locations in the worksite. Any of these material spill models, or combinations thereof, are represented collectively by predictive material movement model 650 in FIG. 7. Predictive material movement model 650 is an example of a predictive material dynamics model 449.

The predictive material spill model 650 is provided to predictive map generator 312. In the example of FIG. 7, predictive map generator 312 includes a material movement map generator 652, as an example of a material dynamics map generator. In other examples, predictive map generator 312 may include additional or different map generators. Thus, in some examples, predictive map generator 312 may include other items 654 which may include other types of map generators to generate other types of maps.

Material movement map generator 652 receives one or more of the terrain map 631, the speed map 632, the crop moisture map 633, and the fill level map 635 along with the predictive material movement model 650 which predicts material movement based upon one or more of a terrain value, a speed value, a crop moisture value, and a fill level value and generates a predictive map that predicts material movement at different locations in the worksite.

Predictive map generator 312 outputs a functional predictive material movement map 660 that is predictive of material movement. The functional predictive material movement map 660 is an example of a functional predictive material dynamics map 458. The functional predictive material movement map 660 is a predictive map 264. The functional predictive material movement map 660 predicts material movement at different locations in a worksite. The functional predictive material movement map 660 may be provided to control zone generator 313, control system 314, or both. Control zone generator 313 generates control zones and incorporates those control zones into the functional predictive material movement map 660 to produce a predictive control zone map 265, that is a functional predictive material movement control zone map 661. The functional predictive material movement control zone map 661 is an example of a functional predictive material dynamics control zone map 459. One or both of functional predictive material movement map 660 and functional predictive material movement control zone map 661 may be provided to control system 314, which generates control signals to control one or more of the controllable subsystems 316 based upon the functional predictive material movement map 660, the functional predictive material movement control zone map 661, or both.

Figure 8A:
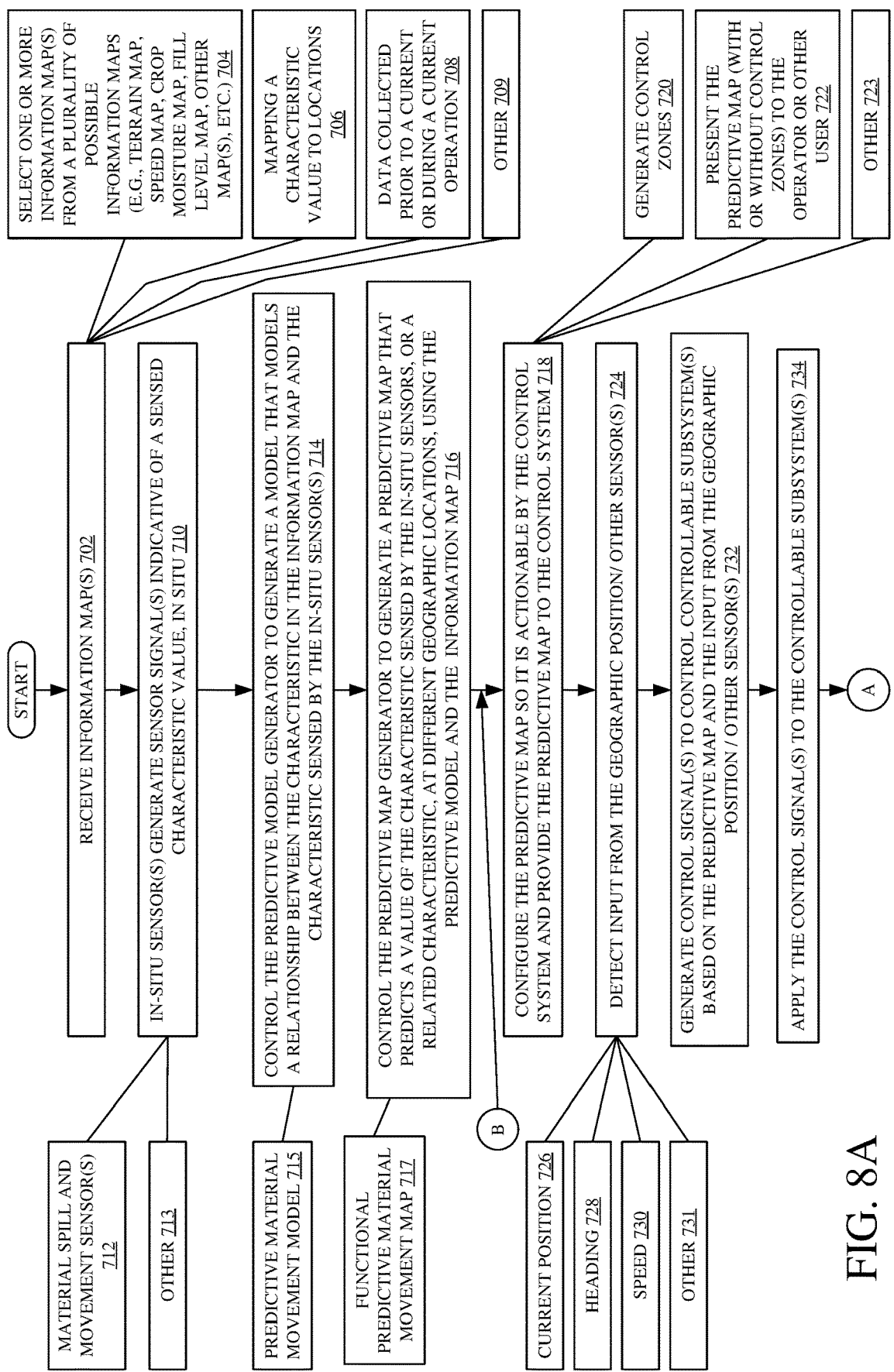
FIGS. 8A-8B (collectively referred to herein as FIG. 8) show a flow diagram illustrating one example of operation of an agricultural system in generating a map.
Figure 8B:
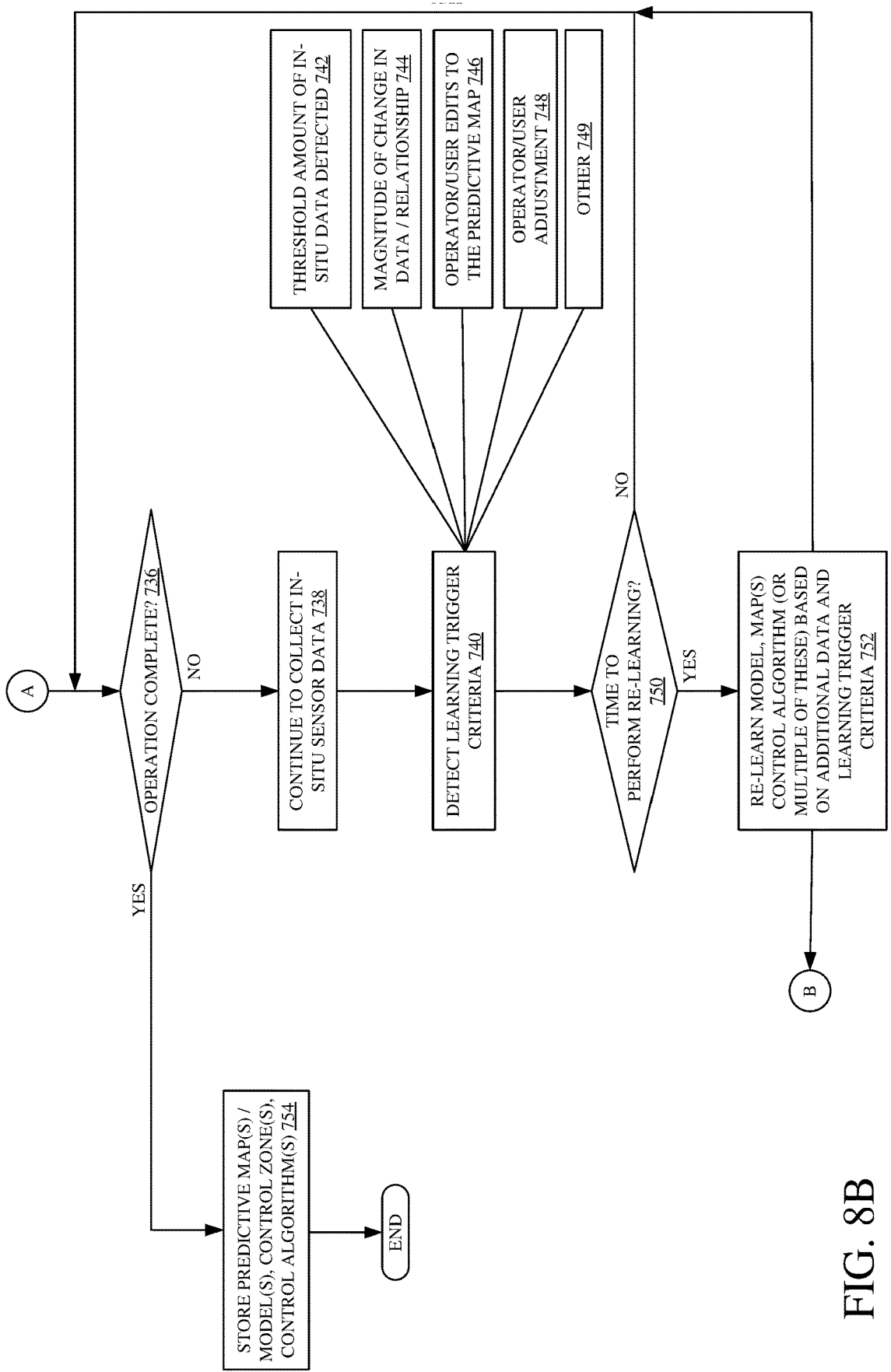

FIGS. 8A-8B (collectively referred to herein as FIG. 8) show a flow diagram illustrating one example of the operation of agricultural system architecture 300 in generating a predictive model and a predictive map At block 702, agricultural system 300 receives one or more information maps 358. Examples of information maps 358 or receiving information maps 358 are discussed with respect to blocks 704, 706, 708, and 709. As discussed above, information maps 358 map values of a variable, corresponding to a characteristic, to different locations, as indicated at block 706. As indicated at block 704, receiving the information maps 358 may involve selecting one or more of a plurality of possible information maps 358 that are available. For instance, one information map may be a terrain map, such as terrain map 631. Another information map 358 may be a speed map, such as speed map 632. Another information map 358 may be a crop moisture map, such as crop moisture map 633. Another information map 358 may be a fill level map, such as fill level map 635. Various other maps, such as other maps 637, are contemplated herein. The process by which one or more information maps 358 are selected can be manual, semi-automated, or automated. The information maps 358 can be based on data collected prior to a current operation. For instance, the data may be collected based on aerial images taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations may be outfitted with one or more sensors that generate sensor data indicative of one or more characteristics. For example, the sensed speed and orientation of mobile machine 100 operating at the worksite in a past year may be used as data to generate the information maps 358. In other examples, and as described above, the information maps 358 may be predictive maps having predictive values, such as a predictive speed map having predictive speed values, a predictive terrain map having predictive terrain values, a predictive crop moisture map having predictive crop moisture values, and a predictive fill level map having predictive fill level values. The predictive information map 358 can be generated by predictive map generator 312 based on a model generated by predictive model generator 310. The data for the information maps 358 or the information maps 358, or both, can be obtained by agricultural system 300 using communication system 306 and stored in data store 302. The data for the information maps 358 can be obtained by agricultural system 300 using communication system 306 in other ways as well, and this is indicated by block 709 in the flow diagram of FIG. 8.

As mobile machine 100 is operating, in-situ sensors 308 generate sensor signals indicative of one or more in-situ data values indicative of a characteristic, for example, material dynamics sensors 179, such as material spill and movement sensors 180, generate sensor signals indicative of one or more in-situ data values indicative of material dynamics, such as material movement, as indicated by block 712. In some examples, data from in-situ sensors 308 is georeferenced using position, heading, or speed data from geographic position sensor 304.

Predictive model generator 310 controls one or more of the material dynamics model generators 439, such as one or more of the material movement-to-terrain model generator 641, the material movement-to-speed model generator 642, the material movement-to-crop moisture model generator 643, and the material movement-to-fill level model generator 645 to generate a model that models the relationship between the mapped values, such as the terrain values, the speed values, the crop moisture values, and the fill level values contained in the respective information map and the in-situ values sensed by the in-situ sensors 308 as indicated by block 714. Predictive model generator 310 generates a predictive material dynamics model 449, such as predictive material movement model 650 as indicated by block 715.

The relationship or model generated by predictive model generator 310 is provided to predictive map generator 312. Predictive map generator 312 controls predictive material dynamics map generator 451, such as predictive material movement map generator 652 to generate a functional predictive material dynamics map 458, such as functional predictive material movement map 660 that predicts material movement (or sensor value(s) indicative of material movement) at different geographic locations in a worksite at which mobile machine 100 is operating using the predictive material movement model 650 and one or more of the information maps, such as terrain map 631, speed map 632, crop moisture map 633, and fill level map 635 as indicated by block 716.

It should be noted that, in some examples, the functional predictive material movement map 660 may include two or more different map layers. Each map layer may represent a different data type, for instance, a functional predictive material movement map 660 that provides two or more of a map layer that provides predictive material movement based on terrain values from terrain map 631, a map layer that provides predictive material movement based on speed values from speed map 632, a map layer that provides predictive material movement based on crop moisture values from crop moisture map 633, and a map layer that provides predictive material movement based on fill level values from fill level map 635. In other examples, functional predictive material movement can include a map layer that provides predictive material movement based on two or more of terrain values from terrain map 631, speed values from speed map 632, crop moisture values from crop moisture map 633, and fill level values from fill level map 635.

At block 718, predictive map generator 312 configures the functional predictive material movement map 660 so that the functional predictive material movement map 660 is actionable (or consumable) by control system 314. Predictive map generator 312 can provide the functional predictive material movement map 660 to the control system 314 or to control zone generator 313, or both. Some examples of the different ways in which the functional predictive material movement map 660 can be configured or output are described with respect to blocks 718, 720, 722, and 723. For instance, predictive map generator 312 configures functional predictive material movement map 660 so that functional predictive material movement map 660 includes values that can be read by control system 314 and used as the basis for generating control signals for one or more of the different controllable subsystems 316 of mobile machine 100, as indicated by block 718.

At block 720, control zone generator 313 can divide the functional predictive material movement map 660 into control zones based on the values on the functional predictive material movement map 660 to generate functional predictive material movement control zone map 661, as an example of a functional predictive material dynamics control zone map 459. Contiguously-geolocated values that are within a threshold value of one another can be grouped into a control zone. The threshold value can be a default threshold value, or the threshold value can be set based on an operator input, based on an input from an automated system, or based on other criteria. A size of the zones may be based on a responsiveness of the control system 314, the controllable subsystems 316, based on wear considerations, or on other criteria.

At block 722, predictive map generator 312 configures functional predictive material movement map 660 for presentation to an operator or other user. At block 722, control zone generator 313 can configure functional predictive material movement control zone map 661 for presentation to an operator or other user. When presented to an operator or other user, the presentation of the functional predictive material movement map 660 or of the functional predictive material movement control zone map 661 or both may contain one or more of the predictive values on the functional predictive material movement map 660 correlated to geographic location, the control zones of functional predictive material movement control zone map 661 correlated to geographic location, and settings values or control parameters that are used based on the predicted values on predictive map 660 or control zones on predictive control zone map 661. The presentation can, in another example, include more abstracted information or more detailed information. The presentation can also include a confidence level that indicates an accuracy with which the predictive values on predictive map 660 or the control zones on predictive control zone map 661 conform to measured values that may be measured by sensors on mobile machine 100 as mobile machine 100 operates at the worksite. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of mobile machine 100 may be unable to see the information corresponding to the predictive map 660 or make any changes to machine operation. A supervisor, such as a supervisor at a remote location, however, may be able to see the predictive map 660 on the display but be prevented from making any changes. A manager, who may be at a separate remote location, may be able to see all of the elements on predictive map 660 and also be able to change the predictive map 660. In some instances, the predictive map 660 accessible and changeable by a manager located remotely may be used in machine control. This is one example of an authorization hierarchy that may be implemented. The predictive map 660 or predictive control zone map 661 or both can be configured in other ways as well, as indicated by block 723.

At block 724, input from geographic position sensor 304 and other in-situ sensors 308 are received by the control system 314. Particularly, at block 726, control system 314 detects an input from the geographic position sensor 304 identifying a geographic location of mobile machine 100. Block 728 represents receipt by the control system 314 of sensor inputs indicative of trajectory or heading of mobile machine 100, and block 730 represents receipt by the control system 314 of a speed of agricultural harvester 100. Block 731 represents receipt by the control system 314 of other information from various in-situ sensors 308.

At block 732, control system 314 generates control signals to control the controllable subsystems 316 based on the functional predictive material movement map 660 or the functional predictive material movement control zone map 661 or both and the input from the geographic position sensor 304 and any other in-situ sensors 308, such as heading and/or speed inputs from heading/speed sensors 325. At block 734, control system 314 applies the control signals to the controllable subsystems 316. It will be appreciated that the particular control signals that are generated, and the particular controllable subsystems 316 that are controlled, may vary based upon one or more different things. For example, the control signals that are generated and the controllable subsystems 316 that are controlled may be based on the type of functional predictive material movement map 660 or functional predictive material movement control zone map 661 or both that is being used. Similarly, the control signals that are generated and the controllable subsystems 316 that are controlled and the timing of the control signals can be based on various latencies of mobile machine 100 and the responsiveness of the controllable subsystems 316.

By way of example, propulsion controller 331 of control system 314 can generate control signals to control propulsion subsystem 350 to control one or more propulsion parameters of mobile machine 100, such as one or more of the speed at which the mobile machine travels, the deceleration of mobile machine 100, and the acceleration of mobile machine 100. For instance, functional predictive material movement map 660 or functional predictive material movement control zone map 661 may predict material movement in area(s) of the worksite ahead of or around mobile machine 100, in which case, propulsion controller 331 can generate control signals to control propulsion system 350 to control a propulsion parameter, such as travel speed, acceleration, deceleration, etc., at those area(s). In another example, path planning controller 334 of control system 314 can generate control signals to control steering subsystem 352 to control a route parameter of mobile machine 100, such as one or more of a commanded path at the worksite over which mobile machine 100 travels, and the steering of mobile machine 100. For instance, functional predictive material movement map 660 or functional predictive material movement control zone map 661, or both, may predict material movement in area(s) of the worksite ahead of or around mobile machine 100, in which case, path planning controller 334 can generate control signals to control steering subsystem 352 to cause mobile machine 100 to avoid traveling those area(s) or to travel through them in a different manner, such as with limited steering angles. In another example, material transfer controller 335 of control system 314 can generate control signals to control material transfer subsystem 341 to initiate or end a material transfer operation. These are merely some examples. Control system 314 can generate a variety of different control signals to control a variety of different controllable subsystems 316 based on functional predictive material movement map 660 or functional predictive material movement control zone map 661, or both.

At block 736, a determination is made as to whether the operation has been completed. If the operation is not completed, the processing advances to block 738 where in-situ sensor data from geographic position sensor 304 and in-situ sensors 308 (and perhaps other sensors) continue to be read.

In some examples, at block 740, agricultural system 300 can also detect learning trigger criteria to perform machine learning on one or more of the functional predictive material movement map 660, functional predictive material movement control zone map 661, predictive material movement model 650, the zones generated by control zone generator 313, one or more control algorithms implemented by the controllers in the control system 314, and other triggered learning.

The learning trigger criteria can include any of a wide variety of different criteria. Some examples of detecting trigger criteria are discussed with respect to blocks 742, 744, 746, 748, and 749. For instance, in some examples, triggered learning can involve recreation of a relationship used to generate a predictive model when a threshold amount of in-situ sensor data are obtained from in-situ sensors 308. In such examples, receipt of an amount of in-situ sensor data from the in-situ sensors 308 that exceeds a threshold triggers or causes the predictive model generator 310 to generate a new predictive model that is used by predictive map generator 312. Thus, as mobile machine 100 continues an operation, receipt of the threshold amount of in-situ sensor data from the in-situ sensors 308 triggers the creation of a new relationship represented by a new predictive material movement model 650 generated by predictive model generator 310. Further, a new functional predictive material movement map 660, a new functional predictive material movement control zone map 661, or both can be generated using the new predictive material movement model 650. Block 742 represents detecting a threshold amount of in-situ sensor data used to trigger creation of a new predictive model.

In other examples, the learning trigger criteria may be based on how much the in-situ sensor data from the in-situ sensors 308 are changing, such as over time or compared to previous values. For example, if variations within the in-situ sensor data (or the relationship between the in-situ sensor data and the information in the one or more information maps 358) are within a selected range or is less than a defined amount, or below a threshold value, then a new predictive model is not generated by the predictive model generator 310. As a result, the predictive map generator 312 does not generate a new functional predictive material movement map 660, a new functional predictive material movement control zone map 661, or both. However, if variations within the in-situ sensor data are outside of the selected range, are greater than the defined amount, or are above the threshold value, for example, then the predictive model generator 310 generates a new predictive model 650 using all or a portion of the newly received in-situ sensor data that the predictive map generator 312 uses to generate a new predictive map 660 which can be provided to control zone generator 313 for the creation of a new predictive control zone map 661. At block 744, variations in the in-situ sensor data, such as a magnitude of an amount by which the data exceeds the selected range or a magnitude of the variation of the relationship between the in-situ sensor data and the information in the one or more information maps, can be used as a trigger to cause generation of one or more of a new predictive model 650, a new predictive map 660, and a new predictive control zone map 661. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 310 switches to a different information map (different from the originally selected information map), then switching to the different information map may trigger re-learning by predictive model generator 310, predictive map generator 312, control zone generator 313, control system 314, or other items. In another example, transitioning of mobile machine 100 to a different topography or to a different control zone may be used as learning trigger criteria as well.

In some instances, operator 360 or user 366 can also edit the functional predictive material movement map 660 or functional predictive material movement control zone map 661 or both. The edits can change a value on the functional predictive material movement map 660, change a size, shape, position, or existence of a control zone on functional predictive material movement control zone map 661, or both. Block 746 shows that edited information can be used as learning trigger criteria.

In some instances, it may also be that operator 360 or user 366 observes that automated control of a controllable subsystem 316, is not what the operator or user desires. In such instances, the operator 360 or user 366 may provide a manual adjustment to the controllable subsystem 316 reflecting that the operator 360 or user 366 desires the controllable subsystem 316 to operate in a different way than is being commanded by control system 314. Thus, manual alteration of a setting by the operator 360 or user 366 can cause one or more of predictive model generator 310 to relearn a model, predictive map generator 312 to regenerate functional predictive material movement map 660, control zone generator 313 to regenerate one or more control zones on functional predictive material movement control zone map 661, and control system 314 to relearn a control algorithm or to perform machine learning on one or more of the controller components 329 through 337 in control system 314 based upon the adjustment by the operator 360 or user 366, as shown in block 748. Block 749 represents the use of other triggered learning criteria.

In other examples, relearning may be performed periodically or intermittently based, for example, upon a selected time interval such as a discrete time interval or a variable time interval, as indicated by block 750.

If relearning is triggered, whether based upon learning trigger criteria or based upon passage of a time interval, as indicated by block 750, then one or more of the predictive model generator 310, predictive map generator 312, control zone generator 313, and control system 314 performs machine learning to generate a new predictive model, a new predictive map, a new control zone, and a new control algorithm, respectively, based upon the learning trigger criteria. The new predictive model, the new predictive map, the new control zone, and the new control algorithm are generated using any additional data that has been collected since the last learning operation was performed. Performing relearning is indicated by block 752.

If the operation has not been completed, operation moves from block 752 to block 718 such that operation of the mobile machine 100 can be controlled based on the new predictive map, a new control zone, or a new control algorithm.

If the operation has been completed, operation moves from block 752 to block 754 where one or more of the functional predictive material movement map 660, functional predictive material movement control zone map 661, the predictive material movement model 650 generated by predictive model generator 310, control zone(s), and control algorithm(s), are stored. The predictive map 660, predictive control zone map 661, predictive model 650, control zone(s), and control algorithm(s), may be stored locally on data store 302 or sent to a remote system using communication system 306 for later use.

Figure 9A:
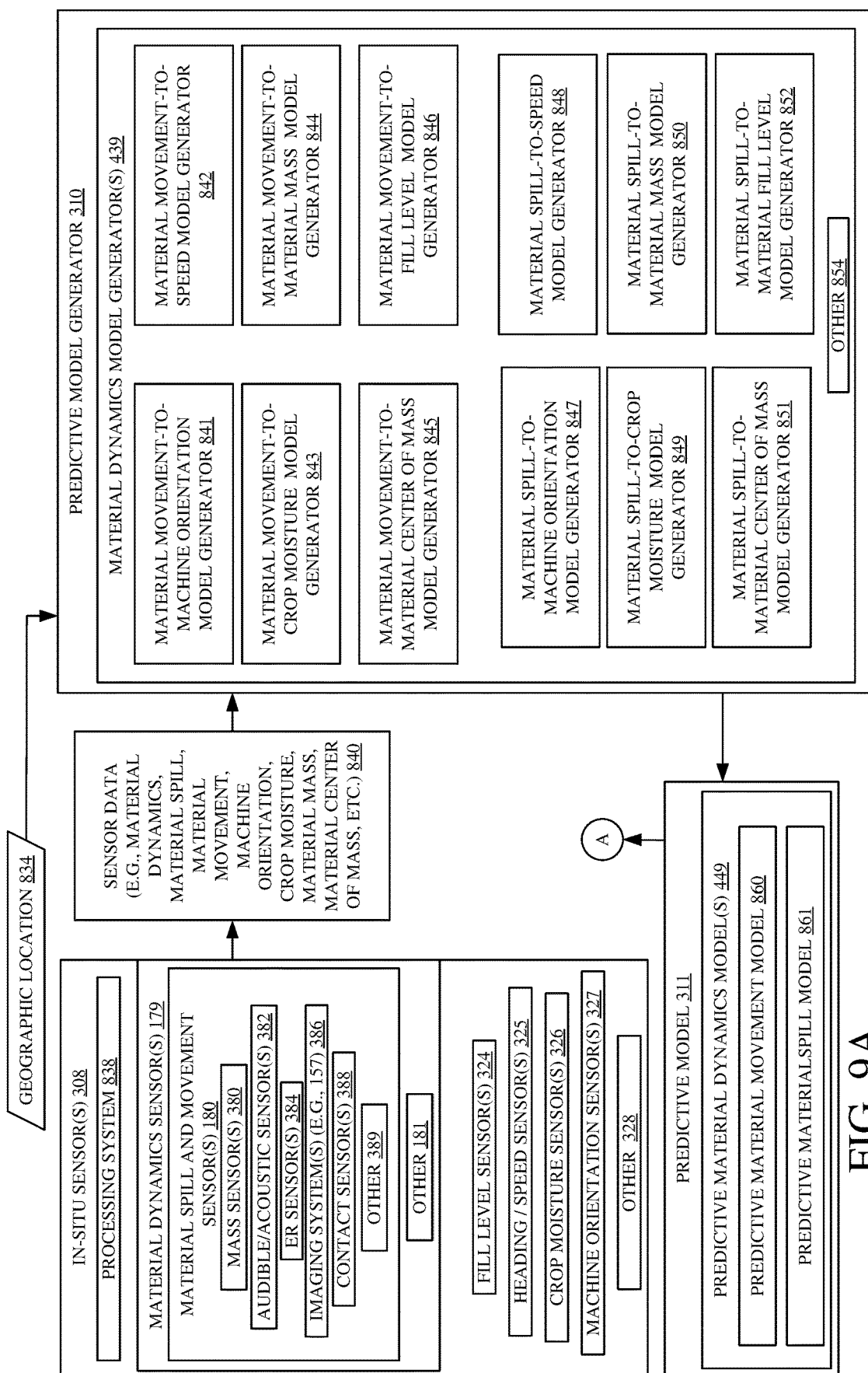
FIG. 9A-B (collectively referred to herein as FIG. 9) is a block diagram showing one example of a predictive model generator and predictive map generator 8.
Figure 9B:
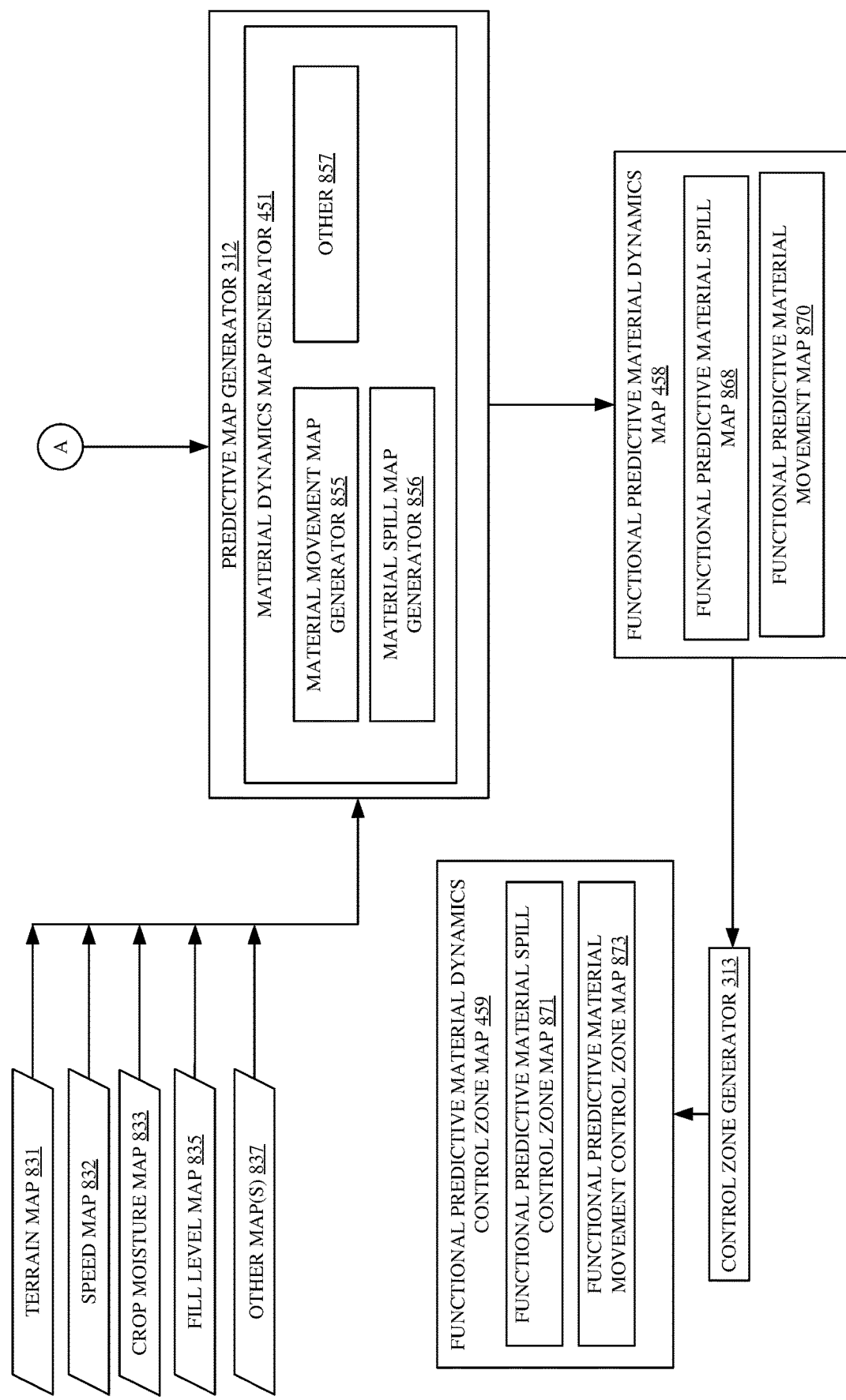

FIG. 9A-9B (collectively referred to herein as FIG. 9) is a block diagram of a portion of the agricultural system architecture 300 shown in FIG. 3. Particularly, FIG. 9 shows, among other things, examples of the predictive model generator 310 in more detail. FIG. 9 also illustrates information flow among the various components shown. In-situ sensors 308 illustratively include material dynamics sensors 179, which include material spill and movement sensors 180. In-situ sensors 308 also include fill level sensors 324, heading/speed sensors 325, crop moisture sensors 326, machine orientation sensors 327, and can include various other sensors 328. In-situ sensors 308 also include a processing system 338. In some instances in-situ sensors 308 may be located on-board mobile machine 100. The processing system 338 processes sensors data generated by in-situ sensors 308 to generate processed sensor data 840 indicative of one or more of machine orientation (pitch, roll, etc.) values, machine speed (travel speed, acceleration, deceleration, etc.) values, crop moisture values, material mass values, material center of mass values, fill level values, and material dynamics values such as material movement values and/or material spill values. While the processing system 338 is illustrated as part of in-situ sensors 308 in FIG. 9, in other examples processing system 338 can be separate from but in operable communication with in-situ sensors 308, such as the example shown in FIG. 3.

As shown in FIG. 9, predictive model generator 310 receives processed sensor data 840 and includes, as examples of material dynamics model generators 439, one or more of a material movement-to-machine orientation model generator 841, a material movement-to-speed model generator 842, a material movement-to-crop moisture model generator 843, a material movement-to-material mass model generator 844, a material movement-to-material center of mass model generator 845, a material movement-to-fill level model generator 846, a material spill-to-machine orientation model generator 847, a material spill-to-speed model generator 848, a material spill-to-crop moisture model generator 849, a material spill-to-material mass model generator 850, a material spill-to-material center of mass model generator 851, and a material spill-to-material fill level model generator 852. In other examples, the predictive model generator 310 may include additional, fewer, or different components than those shown in the example of FIG. 9. Consequently, in some examples, the predictive model generator 310 may include other items 854 as well, which may include other types of predictive model generators to generate other types of material dynamics models, such as a material movement-to-other characteristic model generator or a material spill-to-other characteristic model generator.

Material movement-to-machine orientation model generator 841 identifies a relationship between material movement detected in in-situ sensor data 840 at a geographic location corresponding to where the sensor data indicating the material movement were obtained, and machine orientation detected in in-situ sensor data 840 corresponding to the same location in the worksite where the material movement was detected. Based on this relationship established by material movement-to-machine orientation model generator 841, material movement-to-machine orientation model generator 841 generates a predictive material movement model. The predictive material movement model is used to predict material spill based on machine orientation. Thus, machine orientation characteristics, such as roll, pitch, and/or yaw, of the machine can be detected or input and based on the detected or input machine orientation characteristics and the model, a material movement can be predicted. The predictive material movement model generated by material movement-to-machine orientation model generator 841 can be used in the control of mobile machine 100, such as to control one or more of controllable subsystems 316.

Material movement-to-speed model generator 842 identifies a relationship between material movement detected in in-situ sensor data 840 at a geographic location corresponding to where the sensor data indicating the material movement were obtained, and machine speed characteristics (e.g., travel speed, acceleration, deceleration, etc.) detected in in-situ sensor data 840 corresponding to the same location in the worksite where the material movement was detected. Based on this relationship established by material movement-to-speed model generator 842, material movement-to-speed model generator 842 generates a predictive material movement model. The predictive material movement model is used to predict material spill based on machine speed characteristics. Thus, speed characteristic(s) of the machine can be detected or input and based on the detected or input speed characteristics and the model, a material movement can be predicted. The predictive material movement model generated by material movement-to-speed model generator 842 can be used in the control of mobile machine 100, such as to control one or more of controllable subsystems 316.

Material movement-to-crop moisture model generator 843 identifies a relationship between material movement detected in in-situ sensor data 840 at a geographic location corresponding to where the sensor data indicating the material movement were obtained, and crop moisture detected in in-situ sensor data 840. Based on this relationship established by material movement-to-crop moisture model generator 843, material movement-to-crop moisture model generator 843 generates a predictive material movement model. The predictive material movement model is used to predict material spill based on crop moisture. Thus, a moisture of the crop material can be detected or input and based on the detected or input crop moisture and the model, a material movement can be predicted. The predictive material movement model generated by material movement-to-crop moisture model generator 843 can be used in the control of mobile machine 100. As discussed above, the moisture level of crop carried by mobile machine 100 can affect the angle of repose for a crop material pile carried by mobile machine 100 and thus the crop material may be more or less likely to shift position under certain forces. The predictive material movement model generated by material movement-to-crop moisture model generator 843 can be used in the control of mobile machine 100, such as to control one or more of controllable subsystems 316.

Material movement-to-material mass model generator 844 identifies a relationship between material movement detected in in-situ sensor data 840 at a geographic location corresponding to where the sensor data indicating the material movement were obtained, and mass of material carried by mobile machine 100 detected in in-situ sensor data 840 corresponding to the same location in the worksite where the material movement was detected. Based on this relationship established by material movement-to-material mass model generator 844, material movement-to-material mass model generator 844 generates a predictive material movement model. The predictive material movement model is used to predict material spill based on material mass. Thus, a mass of the material can be detected or input and based on the detected or input mass of the material and the model, a material movement can be predicted. The predictive material movement model generated by material movement-to-material mass model generator 844 can be used in the control of mobile machine 100, such as to control one or more of controllable subsystems 316.

Material movement-to-material center of mass model generator 845 identifies a relationship between material movement detected in in-situ sensor data 840 at a geographic location corresponding to where the sensor data indicating the material movement were obtained, and the center of mass of material carried by mobile machine 100 detected in in-situ sensor data 840 corresponding to the same location in the worksite where the material movement was detected. Based on this relationship established by material movement-to-material center of mass model generator 845, material movement-to-material center of mass model generator 845 generates a predictive material movement model. The predictive material movement model generated by material movement-to-material center of mass model generator 845 can be used in the control of mobile machine 100, such as to control one or more of controllable subsystems 316.

Material movement-to-fill level model generator 846 identifies a relationship between material movement detected in in-situ sensor data 840 at a geographic location corresponding to where the sensor data indicating the material movement were obtained, and the fill level of material receptacle 307 of mobile machine 100 detected in in-situ sensor data 840 corresponding to the same location in the worksite where the material movement was detected. Based on this relationship established by material movement-to-fill level model generator 846, material movement-to-fill level model generator 846 generates a predictive material movement model. The predictive material movement model is used to predict material movement based on fill level of material receptacle 307. Thus, a fill level of material receptacle 307 can be detected or input and based on the detected or input fill level and the model, a material movement can be predicted. The predictive material movement model generated by material movement-to-fill level model generator 846 can be used in the control of mobile machine 100, such as to control one or more of controllable subsystems 316.

In light of the above, the predictive model generator 310 is operable to produce a plurality of predictive material movement models, such as one or more of the predictive material movement models generated by the model generators 841, 842, 843, 844, 845, 846, and 854. In another example, two or more of the predictive models described above may be combined into a single predictive material movement model, such as a predictive material movement model that predicts material movement based upon two or more of speed value(s), machine orientation value(s), crop moisture value(s), material mass value(s), material center of mass value(s), and fill level value(s). Any of these material movement models, or combinations thereof, are represented by predictive material movement model 860 in FIG. 9. Predictive material movement model 860 is an example of a predictive material dynamics model 449.

Predictive material movement model 860 may be provided to control system 314 for use in control of mobile machine 100 or can be presented to the operator or other user, or both.

Material spill-to-machine orientation model generator 847 identifies a relationship between material spill detected in in-situ sensor data 840 at a geographic location corresponding to where the sensor data indicating the material spill were obtained, and machine orientation detected in in-situ sensor data 840 corresponding to the same location in the worksite where the material spill was detected. Based on this relationship established by material spill-to-machine orientation model generator 847, material spill-to-machine orientation model generator 847 generates a predictive material spill model. The predictive material movement model is used to predict material spill based on machine orientation. Thus, machine orientation characteristics, such as roll, pitch, and/or yaw, of the machine can be detected or input and based on the detected or input machine orientation characteristics and the model, a material spill can be predicted. The predictive material spill model generated by material spill-to-machine orientation model generator 847 can be used in the control of mobile machine 100, such as to control one or more of controllable subsystems 316.

Material spill-to-speed model generator 848 identifies a relationship between material spill detected in in-situ sensor data 840 at a geographic location corresponding to where the sensor data indicating the material spill were obtained, and machine speed characteristics (e.g., travel speed, acceleration, deceleration, etc.) detected in in-situ sensor data 840 corresponding to the same location in the worksite where the material spill was detected. Based on this relationship established by material spill-to-speed model generator 848, material spill-to-speed model generator 848 generates a predictive material spill model. The predictive material spill model is used to predict material spill based on machine speed characteristics. Thus, speed characteristic(s) of the machine can be detected or input and based on the detected or input speed characteristics and the model, a material spill can be predicted. The predictive material spill model generated by material spill-to-speed model generator 848 can be used in the control of mobile machine 100, such as to control one or more of controllable subsystems 316.

Material spill-to-crop moisture model generator 849 identifies a relationship between material spill detected in in-situ sensor data 840 at a geographic location corresponding to where the sensor data indicating the material spill were obtained, and crop moisture detected in in-situ sensor data 840. Based on this relationship established by material spill-to-crop moisture model generator 849, material spill-to-crop moisture model generator 849 generates a predictive material spill model. The predictive material spill model is used to predict material spill based on crop moisture. Thus, a moisture of the crop material can be detected or input and based on the detected or input crop moisture and the model, a material spill can be predicted. The predictive material spill model generated by material spill-to-crop moisture model generator 843 can be used in the control of mobile machine 100. As discussed above, the moisture level of crop carried by mobile machine 100 can affect the angle of repose for a crop material pile carried by mobile machine 100 and thus the crop material may be more or less likely to shift position under certain forces, and thus may be more or less likely to spill out of the mobile machine 100. The predictive material spill model generated by material spill-to-crop moisture model generator 849 can be used in the control of mobile machine 100, such as to control one or more of controllable subsystems 316.

Material spill-to-material mass model generator 850 identifies a relationship between material spill detected in in-situ sensor data 840 at a geographic location corresponding to where the sensor data indicating the material spill were obtained, and mass of material carried by mobile machine 100 detected in in-situ sensor data 840 corresponding to the same location in the worksite where the material spill was detected. Based on this relationship established by material spill-to-material mass model generator 850, material spill-to-material mass model generator 850 generates a predictive material spill model. The predictive material spill model is used to predict material spill based on material mass. Thus, a mass of the material can be detected or input and based on the detected or input mass of the material and the model, a material spill can be predicted. The predictive material spill model generated by material spill-to-material mass model generator 850 can be used in the control of mobile machine 100, such as to control one or more of controllable subsystems 316.

Material spill-to-material center of mass model generator 851 identifies a relationship between material spill detected in in-situ sensor data 840 at a geographic location corresponding to where the sensor data indicating the material spill were obtained, and the center of mass of material carried by mobile machine 100 detected in in-situ sensor data 840 corresponding to the same location in the worksite where the material spill was detected. Based on this relationship established by material spill-to-material center of mass model generator 851, material spill-to-material center of mass model generator 851 generates a predictive material spill model. The predictive material spill model generated by material spill-to-material center of mass model generator 851 can be used in the control of mobile machine 100, such as to control one or more of controllable subsystems 316.

Material spill-to-fill level model generator 852 identifies a relationship between material spill detected in in-situ sensor data 840 at a geographic location corresponding to where the sensor data indicating the spill were obtained, and the fill level of material receptacle 307 of mobile machine 100 detected in in-situ sensor data 840 corresponding to the same location in the worksite where the material spill was detected. Based on this relationship established by material spill-to-fill level model generator 852, material spill-to-fill level model generator 852 generates a predictive material spill model. The predictive material spill model is used to predict material spill based on fill level of material receptacle 307. Thus, a fill level of material receptacle 307 can be detected or input and based on the detected or input fill level and the model, a material spill can be predicted. The predictive material spill model generated by material spill-to-fill level model generator 852 can be used in the control of mobile machine 100, such as to control one or more of controllable subsystems 316.

In light of the above, the predictive model generator 310 is operable to produce a plurality of predictive material spill models, such as one or more of the predictive material spill models generated by the model generators 847, 848, 849, 850, 851, 852, and 854. In another example, two or more of the predictive models described above may be combined into a single predictive material spill model, such as a predictive material spill model that predicts material spill based upon two or more of speed value(s), machine orientation value(s), crop moisture value(s), material mass value(s), material center of mass value(s), and fill level value(s). Any of these material spill models, or combinations thereof, are represented by predictive material spill model 861 in FIG. 9. Predictive material spill model 861 is an example of a predictive material dynamics model 449.

Predictive material spill model 861 may be provided to control system 314 for use in control of mobile machine 100 or can be presented to the operator or other user, or both.

In some examples, the predictive material spill model(s) 449 (e.g., one or more of predictive material movement model 860 and predictive material spill model) are provided to predictive map generator 312. As illustrated in FIG. 9, predictive map generator also obtains one or more of a terrain map 831, a speed map 832, a crop moisture map 833, a fill level map 835, and another type of map 837. Terrain map can be similar to terrain map 431 and/or terrain map 631, speed map 832 can be similar to speed map 432 and/or 632, crop moisture map 833 can be similar to crop moisture map 433 and/or 633, and fill level map 835 can be similar to fill level map 435 and/or fill level map 635.

As illustrated in FIG. 9, map generator includes material dynamics map generator 451. Material dynamics map generator 451 includes material movement map generator 855, which can be similar to material movement map generator 652, and material spill map generator 856, which can be similar to material spill map generator 452. In other examples, predictive map generator may include additional or different map generators. Thus, in some examples, predictive map generator 312 may include other items 857 which may include other types of map generators to generate other types of maps.

Material movement generator 855 receives one or more of the terrain map 831, the speed map 832, the crop moisture map 833, and the fill level map 835 along with the predictive material movement model 860 which predicts material movement based upon one or more of a terrain (or machine orientation) value, a speed value, a crop moisture value, and a fill level value and generates a predictive map that predicts material movement at different locations in the worksite.

Predictive map generator 312 outputs a functional predictive material movement map 870 that is predictive of material movement. The functional predictive material movement map 870 is an example of a functional predictive material dynamics map 458. The functional predictive material movement map 870 is a predictive map 264. The functional predictive material movement map 870 predicts material movement at different locations in a worksite. The functional predictive material movement map 870 may be provided to control zone generator 313, control system 314, or both. Control zone generator 313 generates control zones and incorporates those control zones into the functional predictive material movement map 870 to produce a predictive control zone map 265, that is a functional predictive material movement control zone map 873. The functional predictive material movement control zone map 873 is an example of a functional predictive material dynamics control zone map 459. One or both of functional predictive material movement map 870 and functional predictive material movement control zone map 873 may be provided to control system 314, which generates control signals to control one or more of the controllable subsystems 316 based upon the functional predictive material movement map 870, the functional predictive material movement control zone map 873, or both.

The functional predictive material movement map 870 includes predictive values of material movement at different locations at the worksite. The predictive values are based on the predictive material movement model 860 and one or more of the terrain (or machine orientation) value from the terrain map 831, the speed value from the speed map 832, the crop moisture value from the crop moisture map 833, and the fill level value from the fill level map 835 at those different locations.

Material spill map generator 856 receives one or more of the terrain map 831, the speed map 832, the crop moisture map 833, and the fill level map 835 along with the predictive material spill model 861 which predicts material spill based upon one or more of a terrain (or machine orientation) value, a speed value, a crop moisture value, and a fill level value and generates a predictive map that predicts material spill at different locations in the worksite.

Predictive map generator 312 outputs a functional predictive material spill map 868 that is predictive of material spill. The functional predictive material spill map 868 is an example of a functional predictive material dynamics map 458. The functional predictive material spill map 868 is a predictive map 264. The functional predictive material spill map 868 predicts material spill at different locations in a worksite. The functional predictive material spill map 868 may be provided to control zone generator 313, control system 314, or both. Control zone generator 313 generates control zones and incorporates those control zones into the functional predictive material spill map 868 to produce a predictive control zone map 265, that is a functional predictive material spill control zone map 871. The functional predictive material spill control zone map 871 is an example of a functional predictive material dynamics control zone map 459. One or both of functional predictive material spill map 868 and functional predictive material spill control zone map 871 may be provided to control system 314, which generates control signals to control one or more of the controllable subsystems 316 based upon the functional predictive material spill map 868, the functional predictive material spill control zone map 871, or both.

The functional predictive material spill map 868 includes predictive values of material spill at different locations at the worksite. The predictive values are based on the predictive material spill model 861 and one or more of the terrain (or machine orientation) value from the terrain map 831, the speed value from the speed map 832, the crop moisture value from the crop moisture map 833, and the fill level value from the fill level map 835 at those different locations.

Figure 10A:
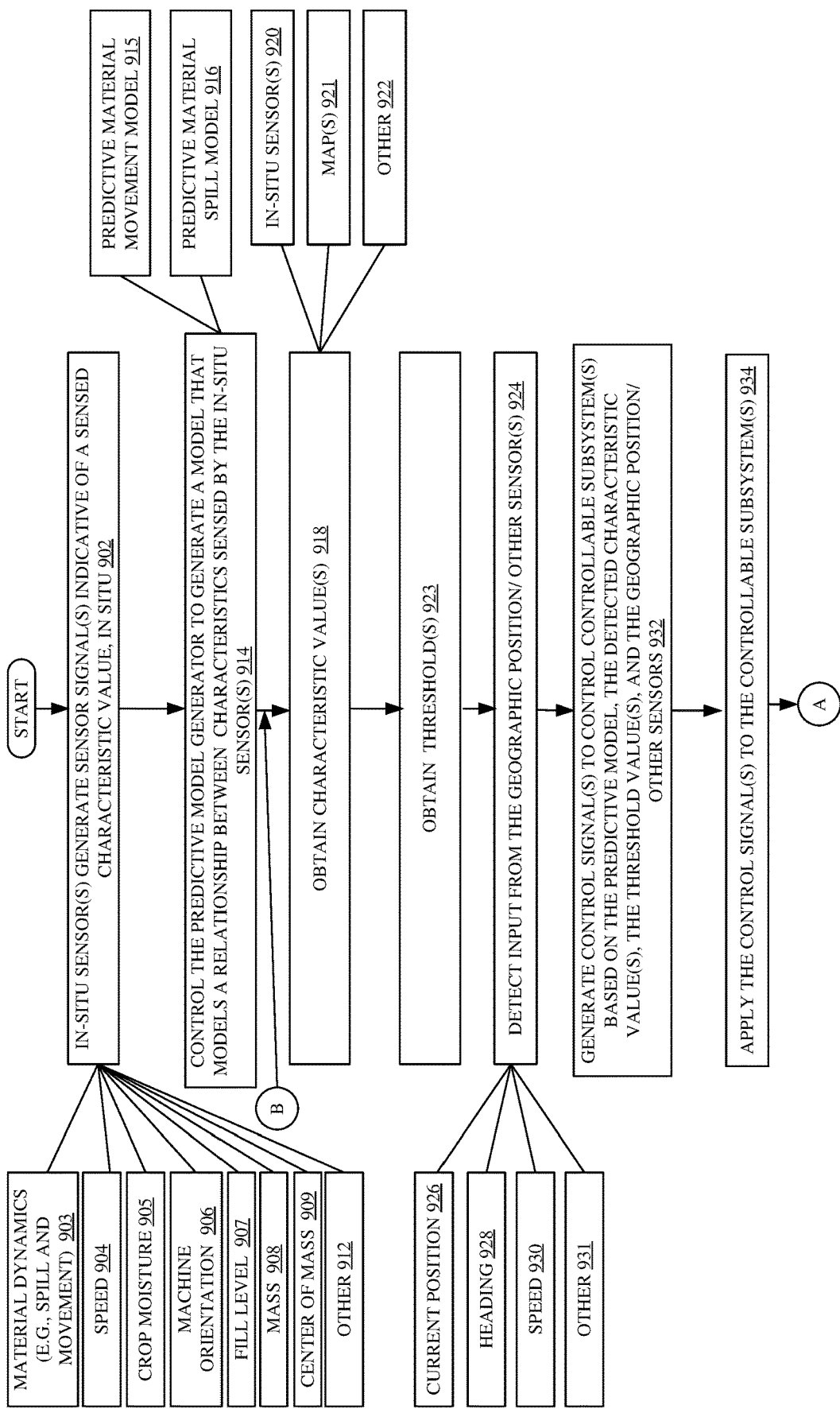
FIG. 10A-10B (collectively referred to herein as FIG. 10) show a flow diagram illustrating one example operation of an agricultural system in generating a model.
Figure 10B:
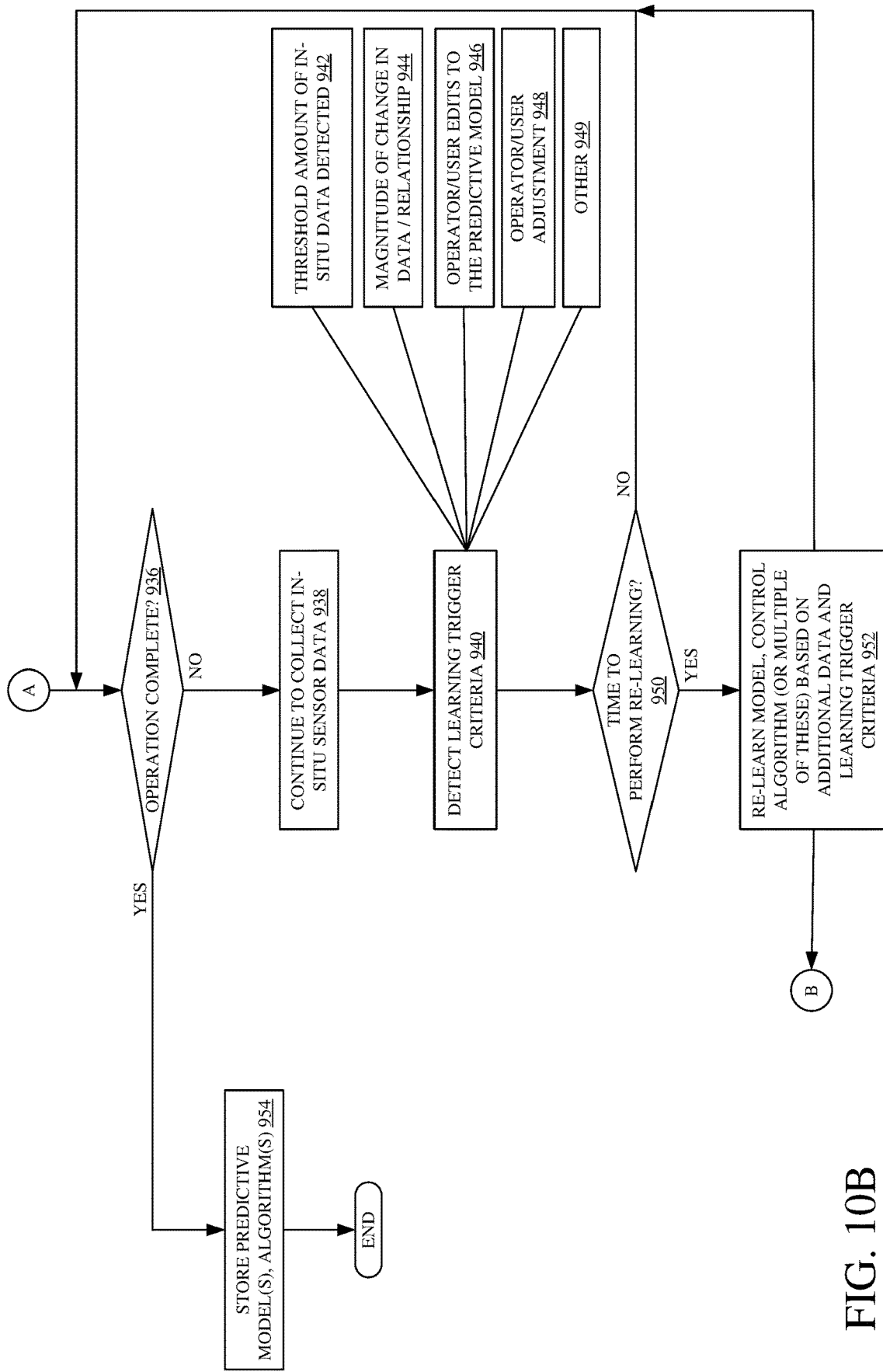

FIGS. 10A-10B (collectively referred to herein as FIG. 10) show a flow diagram illustrating one example of the operation of agricultural system architecture 300 in generating a predictive model.

At block 902, in-situ sensors 308 generate sensor signals indicative of one or more in-situ data values indicative of characteristics as the mobile machine 100 is operating at a worksite. Material dynamics sensors 179, such as material spill and movement sensors 180, generate sensor signals indicative of one or more in-situ data values indicative of material dynamics characteristics, such as material movement characteristics or material spill characteristics, as indicated by block 903. Heading/speed sensors 325 generate sensor signals indicative of one or more in-situ data values indicative of speed characteristic(s), such as one or more of travel speed, acceleration, and deceleration, as indicated by block 904. As described herein, in some examples, geographic position data generated by geographic position sensor 304 may also be used to generate one or more in-situ data values indicative of speed characteristic(s), such as one or more of travel speed, acceleration, and deceleration. Crop moisture sensors 326 generate sensor signals indicative of one or more in-situ data values indicative of moisture of crop material collected by mobile machine 100, as indicated by block 905. Machine orientation sensors 327 generate sensor signals indicative of machine orientation characteristics, such as one or more of roll, pitch, and yaw of the machine, as indicated by block 906. Fill level sensors 324 generate sensor signals indicative of a fill level of material receptacle 307, as indicated by block 907. As described herein, in some examples, material spill and movement sensors 180 may also generate sensor signals indicative of one or more in-situ data values indicative of fill level of material receptacle 307. Material spill and movement sensors 180 can generate sensor signals indicative of one or more in-situ data values indicative of a mass of material in material receptacle 307, as indicated by block 908. Material spill and movement sensors 180 can generate sensor signals indicative of one or more in-situ data values indicative of a center of mass of material in material receptacle 307, as indicated by block 909. Various other in-situ sensors can generate sensor signals indicative of various other in-situ data values indicative of various other characteristics, as indicated by block 912. In some examples, data from in-situ sensors 308 is georeferenced using position, heading, or speed data from geographic position sensor 304.

In one example, at block 914, predictive model generator 310 controls one or more of the material movement-to-machine orientation model generator 841, the material movement-to-speed model generator 842, the material movement-to-crop moisture model generator 843, the material movement-to-material mass model generator 844, the material movement-to-material center of mass model generator 845, and the material movement-to-fill level model generator 846 to generate a model that models the relationship between one or more of the in-situ machine orientation values, the in-situ speed values, the in-situ crop moisture values, the in-situ mass values, the in-situ center of mass values, and the in-situ fill level value and in-situ material movement values. Predictive model generator 310 generates a predictive material movement model 860 as indicated by block 915. Predictive material movement model 860 predicts material movement based on one or more of machine orientation characteristics, speed characteristics, crop moisture, material mass, material center of mass, and fill level.

In another example, at block 914, predictive model generator 310 controls one or more of the material spill-to-machine orientation model generator 847, the material spill-to-speed model generator 848, the material spill-to-crop moisture model generator 849, the material spill-to-material mass model generator 850, the material spill-to-material center of mass model generator 851, and the material spill-to-material fill level model generator 852 to generate a model that models the relationship between one or more of the in-situ machine orientation values, the in-situ speed values, the in-situ crop moisture values, the in-situ material mass values, the in-situ material center of mass values, and the in-situ material fill level values and in-situ material spill values. Predictive model generator 310 generates a predictive material spill model 861 as indicated by block 916. Predictive material spill model 861 predicts material spill based on one or more of machine orientation characteristics, speed characteristics, crop moisture, material mass, material center of mass, and fill level.

In some examples, the predictive material movement model 860 or the predictive material spill model 861, or both, is provided to control system 314 which generates control signals to control controllable subsystems 316 based on the predictive material movement model 860 or the predictive material spill model 861, or both. Thus, processing proceeds at block 918 where one or more characteristic values, such as one or more of speed values, crop moisture values, machine orientation values, fill level values, mass values, and center of mass values, are obtained. In some examples, one or more characteristic values can be detected by in-situ sensors 308 as indicated by block 920. The detected in-situ characteristic values can be input into the predictive material movement model 860 or the predictive material spill model 861, or both, to generate a predictive value of material movement or of material spill, or both, respectively. In some examples, one or more characteristic values can be provided by one or more maps as indicated by block 921. For example, some maps may include predictive values of machine speed characteristic, crop moisture, machine orientation, fill level, mass, or center of mass at different locations at the worksite. Thus, the values on the maps can be input into the predictive material movement model 860 or the predictive material spill model 861, or both, to generate a predictive value of material movement or of material spill, or both, respectively. The characteristic values can be obtained in various other ways, as indicated by block 922.

Thus, the control can be closed-loop in that the system, at block 918, receives characteristic values detected by the in-situ sensors 308 and generates control signals to optimize the operation of the mobile machine 100 based on the detected characteristic values and the output of the model. In other example, the control can be predictive in that the system, at block 918, receives characteristic values ahead of the machine as provided by a map, or another source, and predictively control operation of the mobile machine 100 based on the characteristic values ahead of the mobile machine and the output of the model.

In some examples, processing proceeds to block 923 where one or more threshold values are obtained. The threshold values can be provided by an operator 360 or user 364, can be stored in data store 302, or can be obtained in other ways. For example, one or more material dynamics threshold values, such as one or more of a material movement threshold value or a material spill threshold value can be obtained. The mobile machine 100 can be controlled based on the predictive material movement model 860 or the predictive material spill model 861, or both, to not exceed the material movement threshold value or the material spill threshold value, or both. For example, control system 314, at blocks 932 and 934, generates control signals and applies the control signals to control one or more controllable subsystems 316 based on the predictive material movement model 860 or the predictive material spill model 861, or both, and one or more of the characteristic values obtained at block 918 and the threshold values obtained at block 923. For example, control system 314 can generate control signals to control propulsion subsystem 350 to control a speed characteristic of mobile machine 100. In another example, control system 314 can generate control signals to control steering subsystem 352 to control a heading of mobile machine 100. In another example, control system 314 can generate control signals to control material transfer subsystem 341 to initiate or end a material transfer operation. In another examples, control system 314 can generate control signal to control a material transfer subsystem of another machine to control a material transfer operation (e.g., control the amount of material transferred).

Alternatively, or additionally, other threshold values can be obtained at block 923. For example, the operator or user of mobile machine 100 may provide a minimum and/or maximum travel speed, acceleration, or deceleration, at which mobile machine 100 can travel, and thus, where the speed characteristics of machine 100 can not be adjusted more, due to the speed characteristic threshold(s), other machine parameters can be controlled, such as the fill level of mobile machine 100, the travel path of mobile machine 100, as well as various other operating parameters, to satisfy the speed characteristic threshold(s) and to satisfy material movement or material spill, or both, levels (which may be indicated by a material movement threshold or a material spill threshold, or both). In some examples, processing proceeds to block 924 where input from geographic position sensor 304 and other in-situ sensors 308 are received by the control system 314. Particularly, at block 926, control system 314 detects an input from the geographic position sensor 304 identifying a geographic location of mobile machine 100. Block 928 represents receipt by the control system 314 of sensor inputs indicative of trajectory or heading of mobile machine 100, and block 930 represents receipt by the control system 314 of a speed of agricultural harvester 100. Block 931 represents receipt by the control system 314 of other information from various in-situ sensors 308. It may be that the mobile machine 100 has various latencies and that the various controllable subsystems 316 have certain responsiveness and thus the controllable subsystems 316 are controlled based on one or more of the geographic location, the travel speed, and the heading of the mobile machine 100 to control the controllable subsystems 316 to operate at the desired setting in a timely fashion, such as when mobile machine 100 reaches the area ahead of mobile machine 100 with the predictive characteristic value(s), as provided by the maps at block 921 (or other sources), that correspond to predicted material movement or the predicted material spill, or both. In some examples, such as where the control is closed-loop, obtaining a geographic position of the mobile machine 100 is not necessary or is not used in the generation of control signals.

Thus, in some examples, the mobile machine 100 can be controlled based on the predictive material movement model 860 or the predictive material movement model 861, or both, and one or more of the characteristic values obtained at block 918, the threshold values obtained at block 920, and the inputs at block 924, such as one or more of the geographic position, the heading, and the speed of the mobile machine 100. In such examples, control system 314, at blocks and 934, generates control signals and applies the control signals to control one or more controllable subsystems 316.

Thus, it can be seen, that in some examples, the predictive material movement model 860 or the predictive material spill model 861, or both, can be used in closed-loop control to control operating parameters of mobile machine 100 (or other vehicles 375) based on characteristic values currently being experienced by the mobile machine 100, such as those detected by in-situ sensors 308 at block 920. In other examples, the predictive material movement model 860 or predictive material spill model 861, or both, can be used in predictive control to control operating parameters of mobile machine 100 (or other vehicles 375) based on predictive characteristic values obtained, such as from maps at block 920 or from other sources.

It will be appreciated that the particular control signals that are generated, and the particular controllable subsystems 316 that are controlled, may vary based upon one or more different things. For example, the control signals that are generated and the controllable subsystems 316 that are controlled may be based on the type of predictive material movement model 860 or the type of predictive material spill model 861, or both, that is being used. Similarly, the control signals that are generated and the controllable subsystems 316 that are controlled and the timing of the control signals can be based on various latencies of mobile machine 100 and the responsiveness of the controllable subsystems 316.

These are merely some examples. Control system 314 can generate a variety of different control signals to control a variety of different controllable subsystems 316 based on the predictive material movement model 860 or the predictive material spill model 861, or both, and one or more of the characteristic values obtained at block 918, the threshold values obtained at block 920, and the input(s) from the geographic position sensor or in-situ sensors 308, such as one or more of the geographic position, the heading, and the speed of mobile machine 100.

At block 936, a determination is made as to whether the operation has been completed. If the operation is not completed, the processing advances to block 938 where in-situ sensor data from geographic position sensor 304 and in-situ sensors 308 (and perhaps other sensors) continue to be read.

In some examples, at block 940, agricultural system 300 can also detect learning trigger criteria to perform machine learning on one or more of the predictive material movement model 860 or the predictive material spill model 861, or both, one or more control algorithms implemented by the controllers in the control system 314, and other triggered learning.

The learning trigger criteria can include any of a wide variety of different criteria. Some examples of detecting trigger criteria are discussed with respect to blocks 942, 944, 946, 948, and 949. For instance, in some examples, triggered learning can involve recreation of a relationship used to generate a predictive model when a threshold amount of in-situ sensor data are obtained from in-situ sensors 308. In such examples, receipt of an amount of in-situ sensor data from the in-situ sensors 308 that exceeds a threshold triggers or causes the predictive model generator 310 to generate a new predictive model. Thus, as mobile machine 100 continues an operation, receipt of the threshold amount of in-situ sensor data from the in-situ sensors 308 triggers the creation of a new relationship represented by a new predictive material movement model 860 generated by predictive model generator 310 or triggers the creation of a new relationship represented by a new predictive material spill model 861 generated by predictive model generator 310, or both. Block 942 represents detecting a threshold amount of in-situ sensor data used to trigger creation of a new predictive model.

In other examples, the learning trigger criteria may be based on how much the in-situ sensor data from the in-situ sensors 308 are changing, such as over time or compared to previous values. For example, if variations within the in-situ sensor data (or the relationship between the in-situ sensor data) are within a selected range or is less than a defined amount, or below a threshold value, then a new predictive model is not generated by the predictive model generator 310. However, if variations within the in-situ sensor data are outside of the selected range, are greater than the defined amount, or are above the threshold value, for example, then the predictive model generator 310 generates a new predictive model 860 or 861, or both, using all or a portion of the newly received in-situ sensor data. At block 944, variations in the in-situ sensor data, such as a magnitude of an amount by which the data exceeds the selected range or a magnitude of the variation of the relationship between the in-situ sensor data, can be used as a trigger to cause generation of a new predictive model 860 or 861, or both. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 310 switches to a different set of sensor data (different from the originally selected set of sensor data), then switching to the different set may trigger re-learning by predictive model generator 310, control system 314, or other items. In another example, transitioning of mobile machine 100 to a different topography or to a different area of the worksite may be used as learning trigger criteria as well.

In some instances, operator 360 can also edit the predictive material movement model 860 or the predictive material spill model 861, or both, edit values in the sensor data, as well as input new values, such as based on operator observation. Block 946 shows that edited information can be used as learning trigger criteria.

In some instances, it may also be that operator 360 or user 366 observes that automated control of a controllable subsystem 316, is not what the operator or user desires. In such instances, the operator 360 or user 366 may provide a manual adjustment to the controllable subsystem 316 reflecting that the operator 360 or user 366 desires the controllable subsystem 316 to operate in a different way than is being commanded by control system 314. Thus, manual alteration of a setting by the operator 360 or user 366 can cause one or more of predictive model generator 310 to relearn a model and control system 314 to relearn a control algorithm or to perform machine learning on one or more of the controller components 329 through 337 in control system 314 based upon the adjustment by the operator 360 or user 366, as shown in block 948. Block 949 represents the use of other triggered learning criteria.

In other examples, relearning may be performed periodically or intermittently based, for example, upon a selected time interval such as a discrete time interval or a variable time interval, as indicated by block 950.

If relearning is triggered, whether based upon learning trigger criteria or based upon passage of a time interval, as indicated by block 950, then one or more of the predictive model generator 310 and control system 314 performs machine learning to generate a new predictive model and a new control algorithm, respectively, based upon the learning trigger criteria. The new predictive model and the new control algorithm are generated using any additional data that has been collected since the last learning operation was performed. Performing relearning is indicated by block 952.

If the operation has not been completed, operation moves from block 952 to block 918 such that operation of the mobile machine 100 can be controlled based on the new predictive model or the new control algorithm, or both.

If the operation has been completed, operation moves from block 952 to block 954 where the predictive material movement model 860, the predictive material spill model 871, and the control algorithm(s), are stored. The predictive model 850 may be stored locally on data store 302 or sent to a remote system using communication system 306 for later use.

Figure 11A:
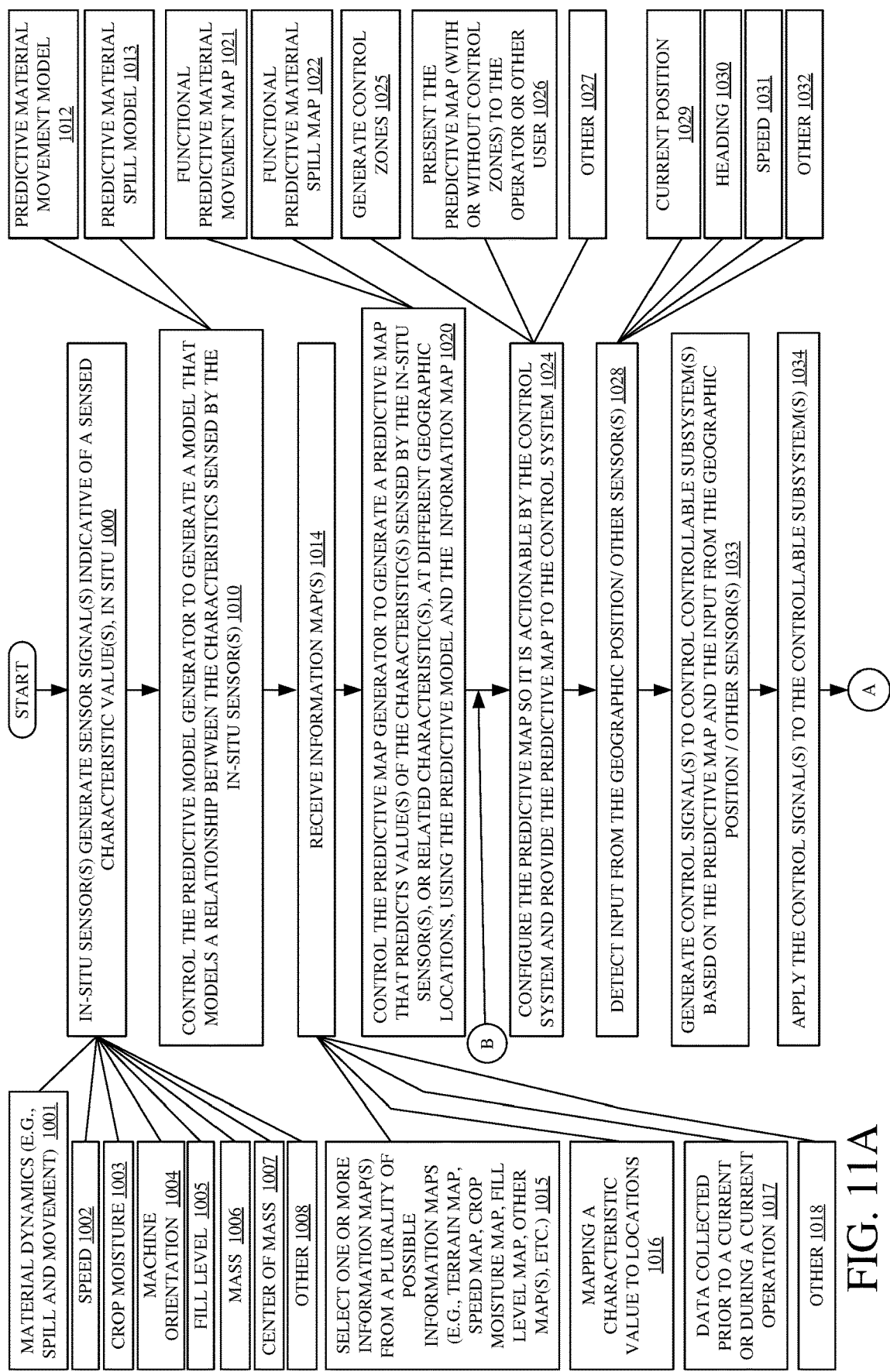
FIG. 11A-11B (collectively referred to herein as FIG. 11) show a flow diagram illustrating one example operation of an agricultural system in generating a map.
Figure 11B:
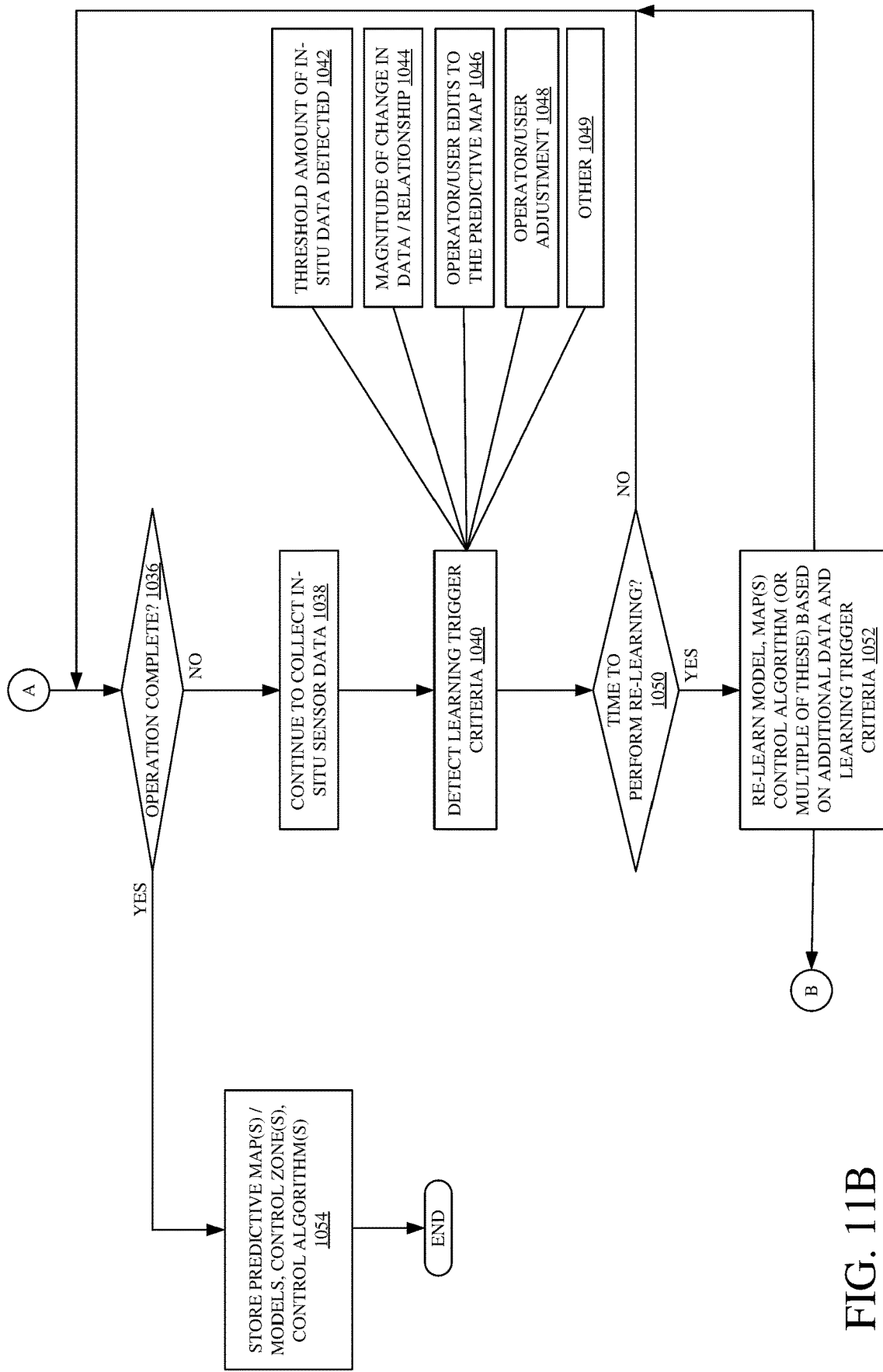

FIGS. 11A-11B (collectively referred to herein as FIG. 11) show a flow diagram illustrating one example of the operation of agricultural system architecture 300 in generating a predictive map.

At block 1000, in-situ sensors 308 generate sensor signals indicative of one or more in-situ data values indicative of characteristics as the mobile machine 100 is operating at a worksite. Material dynamics sensors 179, such as material spill and movement sensors 180, generate sensor signals indicative of one or more in-situ data values indicative of material dynamics characteristics, such as material movement characteristics or material spill characteristics, as indicated by block 1001. Heading/speed sensors 325 generate sensor signals indicative of one or more in-situ data values indicative of speed characteristic(s), such as one or more of travel speed, acceleration, and deceleration, as indicated by block 1002. As described herein, in some examples, geographic position data generated by geographic position sensor 304 may also be used to generate one or more in-situ data values indicative of speed characteristic(s), such as one or more of travel speed, acceleration, and deceleration. Crop moisture sensors 326 generate sensor signals indicative of one or more in-situ data values indicative of moisture of crop material collected by mobile machine 100, as indicated by block 1003. Machine orientation sensors 327 generate sensor signals indicative of machine orientation characteristics, such as one or more of roll, pitch, and yaw of the machine, as indicated by block 1004. Fill level sensors 324 generate sensor signals indicative of a fill level of material receptacle 307, as indicated by block 1005. As described herein, in some examples, material spill and movement sensors 180 may also generate sensor signals indicative of one or more in-situ data values indicative of fill level of material receptacle 307. Material spill and movement sensors 180 can generate sensor signals indicative of one or more in-situ data values indicative of a mass of material in material receptacle 307, as indicated by block 1006. Material spill and movement sensors 180 can generate sensor signals indicative of one or more in-situ data values indicative of a center of mass of material in material receptacle 307, as indicated by block 1007. Various other in-situ sensors can generate sensor signals indicative of various other in-situ data values indicative of various other characteristics, as indicated by block 1008. In some examples, data from in-situ sensors 308 is georeferenced using position, heading, or speed data from geographic position sensor 304.

In one example, at block 1010, predictive model generator 310 controls one or more of the material movement-to-machine orientation model generator 841, the material movement-to-speed model generator 842, the material movement-to-crop moisture model generator 843, the material movement-to-material mass model generator 844, the material movement-to-material center of mass model generator 845, and the material movement-to-fill level model generator 846 to generate a model that models the relationship between one or more of the in-situ machine orientation values, the in-situ speed values, the in-situ crop moisture values, the in-situ mass values, and the in-situ center of mass values, and the in-situ fill level values and in-situ material movement values. Predictive model generator 310 generates a predictive material movement model 860 as indicated by block 1012. Predictive material movement model 860 predicts material movement based on one or more of machine orientation characteristics, speed characteristics, crop moisture, material mass, material center of mass, and fill level.

Alternatively, or additionally, at block 1010, predictive model generator 310 controls one or more of the material spill-to-machine orientation model generator 847, the material spill-to-speed model generator 848, the material spill-to-crop moisture model generator 849, the material spill-to-material mass model generator 850, the material spill-to-material center of mass model generator 851, and the material spill-to-material fill level model generator 852 to generate a model that models the relationship between one or more of the in-situ machine orientation values, the in-situ speed values, the in-situ crop moisture values, the in-situ material mass values, the in-situ material center of mass values, and the in-situ material fill level values and in-situ material spill values. Predictive model generator 310 generates a predictive material spill model 861 as indicated by block 1013. Predictive material spill model 861 predicts material spill based on one or more of machine orientation characteristics, speed characteristics, crop moisture, material mass, material center of mass, and fill level.

At block 1014, agricultural system 300 receives one or more information maps 358. Examples of information maps 358 or receiving information maps 358 are discussed with respect to blocks 1015, 1016, 1017, and 1018. As discussed above, information maps 358 map values of a variable, corresponding to a characteristic, to different locations in the field, as indicated at block 1016. As indicated at block 1015, receiving the information maps 358 may involve selecting one or more of a plurality of possible information maps 358 that are available. For instance, one information map 358 may be a terrain map, such as terrain map 831. Another information map 358 may be a speed map, such as speed map 832. Another information map 358 may be a crop moisture map, such as crop moisture map 833. Another information map may be a fill level map, such as fill level map 835. Various other maps, such as other maps 837, are contemplated herein. The process by which one or more information maps 358 are selected can be manual, semi-automated, or automated. The information maps 358 can be based on data collected prior to a current operation, as indicated by block 1017. For instance, the data may be collected based on aerial images taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations may be outfitted with one or more sensors that generate sensor data indicative of one or more characteristics. For example, the sensed speed and orientation of mobile machine 100 operating at the worksite in a past year may be used as data to generate the information maps 358. In other examples, and as described above, the information maps 358 may be predictive maps having predictive values, such as a predictive speed map having predictive speed values, a predictive terrain map having predictive terrain values, a predictive crop moisture map having predictive crop moisture values, and a predictive fill level map having predictive fill level values. The predictive information map 358 can be generated by predictive map generator 312 based on a model generated by predictive model generator 310. The data for the information maps 358 or the information maps 358, or both, can be obtained by agricultural system 300 using communication system 306 and stored in data store 302. The data for the information maps 358 can be obtained by agricultural system 300 using communication system 306 in other ways as well, and this is indicated by block 1018 in the flow diagram of FIG. 11.

At block 1020, the relationship or model generated by predictive model generator 310 is provided to predictive map generator 312. Predictive map generator 312 controls predictive material dynamics map generator 451, such as predictive material movement map generator 855 or predictive material spill map generator 856, to generate a functional predictive material dynamics map 458, such as a functional predictive material movement map 870 as indicated by block 1021 or functional predictive material spill map 868 as indicated by block 1022. Functional predictive material movement map 870 predicts material movement (or sensor value(s) indicative of material movement) at different geographic locations in a worksite at which mobile machine is operating using the predictive material movement model 860 and one or more of the information maps, such as terrain map 831, speed map 832, crop moisture map 833, and fill level map 835. Functional predictive material spill map 868 predicts material spill (or sensor value(s) indicative of material spill) at different geographic locations in a worksite at which mobile machine 100 is operating using the predictive material spill model 861 and one or more of the information maps, such as terrain map 831, speed map 832, crop moisture map 833, and fill level map 835.

It should be noted that, in some examples, the functional predictive material movement map 870 may include two or more different map layers. Each map layer may represent a different data type, for instance, a functional predictive material movement map 870 that provides two or more of a map layer that provides predictive material movement based on terrain values from terrain map 831, a map layer that provides predictive material movement based on speed values from speed map 832, a map layer that provides predictive material movement based on crop moisture values from crop moisture map 833, and a map layer that provides predictive material movement based on fill level values from fill level map 835. In other examples, functional predictive material movement map 870 can include a map layer that provides predictive material movement based on two or more of terrain values from terrain map 831, speed values from speed map 832, crop moisture values from crop moisture map 638, and fill level values from fill level map 835.

It should be noted that, in some examples, the functional predictive material spill map 868 may include two or more different map layers. Each map layer may represent a different data type, for instance, a functional predictive material spill map 868 that provides two or more of a map layer that provides predictive material spill based on terrain values from terrain map 831, a map layer that provides predictive material spill based on speed values from speed map 832, a map layer that provides predictive material spill based on crop moisture values from crop moisture map 833, and a map layer that provides predictive material spill based on fill level values from fill level map 835. In other examples, functional predictive material spill map 868 can include a map layer that provides predictive material spill based on two or more of terrain values from terrain map 831, speed values from speed map 832, crop moisture values from crop moisture map 638, and fill level values from fill level map 835.

At block 1024, predictive map generator 312 configures the functional predictive material movement map 870 or the functional predictive material spill map 868, or both, so that the functional predictive material movement map 870 or the functional predictive material spill map 868, is actionable (or consumable) by control system 314. Predictive map generator 312 can provide the functional predictive material movement map 870 or the functional predictive material spill map 868, or both, to the control system 314 or to control zone generator 313, or both. Some examples of the different ways in which the functional predictive material movement map 870 or the functional predictive material spill map 868, or both, can be configured or output are described with respect to blocks 1024, 1025, 1026, and 1027. For instance, at block 1024 predictive map generator 312 configures functional predictive material movement map 870 so that functional predictive material movement map 870 includes values that can be read by control system 314 and used as the basis for generating control signals for one or more of the different controllable subsystems 316 of mobile machine 100. Alternatively, or additionally, at block 1024, predictive map generator 312 configures functional predictive material spill map 868 so that functional predictive material spill map 868 includes values that can be read by control system 314 and used as the basis for generating control signals for one or more of the different controllable subsystems 316 of mobile machine 100.

At block 1025, control zone generator can divide the functional predictive material movement map 870 into control zones based on the values on the functional predictive material movement map 870 to generate functional predictive material movement control zone map 873, as an example of a functional predictive material dynamics control zone map 459. Alternatively, or additionally, at block 1025, control zone generator can divide the functional predictive material spill map 868 into control zones based on the values on the functional predictive material spill map to generate functional predictive material spill control zone map 871, as an example of a functional predictive material dynamics control zone map 459. Contiguously-geolocated values that are within a threshold value of one another can be grouped into a control zone. The threshold value can be a default threshold value, or the threshold value can be set based on an operator input, based on an input from an automated system, or based on other criteria. A size of the zones may be based on a responsiveness of the control system 314, the controllable subsystems 316, based on wear considerations, or on other criteria.

At block 1026, predictive map generator 312 configures functional predictive material movement map 870 or functional predictive material spill map 868, or both, for presentation to an operator or other user. Alternatively, or additionally, at block 722, control zone generator 313 can configure functional predictive material movement control zone map 873 or functional predictive material spill control zone map 871, or both, for presentation to an operator or other user. When presented to an operator or other user, the presentation of the functional predictive map(s) 870, 868 or of the functional predictive control zone map(s) 871, 873, or both, may contain one or more of the predictive values on the functional predictive map(s) 870, 868 correlated to geographic location, the control zones of functional predictive control zone map(s) 871, 873 correlated to geographic location, and settings values or control parameters that are used based on the predicted values on predictive map(s) 870, 868 or control zones on predictive control zone map(s) 871, 873. The presentation can, in another example, include more abstracted information or more detailed information. The presentation can also include a confidence level that indicates an accuracy with which the predictive values on predictive map(s) 870, 868 or the control zones on predictive control zone map(s) 871, 873 conform to measured values that may be measured by sensors on mobile machine 100 as mobile machine 100 operates at the worksite. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of mobile machine 100 may be unable to see the information corresponding to the predictive map(s) 870, 868 or make any changes to machine operation. A supervisor, such as a supervisor at a remote location, however, may be able to see the predictive map(s) 870, 868 on the display but be prevented from making any changes. A manager, who may be at a separate remote location, may be able to see all of the elements on predictive map(s) 870, 868 and also be able to change the predictive map(s) 870, 868. In some instances, the predictive map(s) 870, 868 are accessible and changeable by a manager located remotely may be used in machine control. This is one example of an authorization hierarchy that may be implemented.

The predictive map 870 or predictive control zone map 873 or both can be configured in other ways as well, as indicated by block 1027. The predictive map 868 or predictive control zone map 871 or both can be configured in other ways as well, as indicated by block 1027.

At block 1028, input from geographic position sensor 304 and other in-situ sensors 308 are received by the control system 314. Particularly, at block 1029, control system 314 detects an input from the geographic position sensors 304 identifying a geographic location of mobile machine 100. Block 1030 represents receipt by the control system 314 of sensor inputs indicative of a trajectory or heading of mobile machine 100, and block 1031 represent receipt by the control system 314 of a speed of agricultural harvester 100. Block 1032 represents receipt by the control system 314 of other information from various in-situ sensors 308.

At block 1033, control system 314 generates control signals to control the controllable subsystems based on the functional predictive material movement map 870 or the functional predictive material movement control zone map 873, or both, and the input from the geographic position sensor 304 and any other in-situ sensors 308, such as heading and or speed inputs from heading/speed sensors 325. Alternatively, or additionally, at block 1033, control system 314 generates control signals to control the controllable subsystems based on the functional predictive material spill map 868 or the functional predictive material spill control zone map 871, or both, and the input from the geographic position sensor 304 and any other in-situ sensors 308, such as heading and or speed inputs from heading/speed sensors 325.

By way of example, propulsion controller 331 of control system 314 can generate control signals to control propulsion subsystem 350 to control one or more propulsion parameters of mobile machine 100, such as one or more of the speed at which the mobile machine travels, the deceleration of mobile machine 100, and the acceleration of mobile machine 100. For instance, functional predictive material movement map 870 or functional predictive material movement control zone map 873 may predict material movement in area(s) of the worksite ahead of or around mobile machine 100, in which case, propulsion controller 331 can generate control signals to control propulsion system 350 to control a propulsion parameter, such as travel speed, acceleration, deceleration, etc., at those area(s). In another example, functional predictive material spill map 868 or functional predictive material spill control zone map 871 may predict material spill in area(s) of the worksite ahead of or around mobile machine 100, in which case, propulsion controller 331 can generate control signals to control propulsion system 350 to control a propulsion parameter, such as travel speed, acceleration, deceleration, etc., at those area(s).

In another example, path planning controller 334 of control system 314 can generate control signals to control steering subsystem 352 to control a route parameter of mobile machine 100, such as one or more of a commanded path at the worksite over which mobile machine 100 travels, and the steering of mobile machine 100. For instance, functional predictive material movement map 870 or functional predictive material movement control zone map 873, or both, may predict material movement in area(s) of the worksite ahead of or around mobile machine 100, in which case, path planning controller 334 can generate control signals to control steering subsystem 352 to cause mobile machine 100 to avoid traveling those area(s) or to travel through them in a different manner, such as with limited steering angles. In another example, functional predictive material spill map 868 or functional predictive material spill control zone map 871, or both, may predict material spill in area(s) of the worksite ahead of or around mobile machine 100, in which case, path planning controller 334 can generate control signals to control steering subsystem 352 to cause mobile machine 100 to avoid traveling those area(s) or to travel through them in a different manner, such as with limited steering angles.

In another example, material transfer controller 335 of control system 314 can generate control signals to control material transfer subsystem 341 to initiate or end a material transfer operation. These are merely some examples. Control system 314 can generate a variety of different control signals to control a variety of different controllable subsystems 316 based on functional predictive material movement map 870 or functional predictive material movement control zone map 873, or both. Alternatively, or additionally, control system 314 can generate a variety of different control signals to control a variety of different controllable subsystem 316 based on functional predictive material spill map 868 or functional predictive material spill control zone map 871, or both.

At block 1036, a determination is made as to whether the operation has been completed. If the operation is not completed, the processing advances to block 1038 where in-situ sensor data from geographic position sensor 304 and in-situ sensors 308 (and perhaps other sensors) continue to be read.

In some examples, at block 1040, agricultural system 300 can also detect learning trigger criteria to perform machine learning on one or more of the functional predictive material movement map 870, functional predictive material movement control zone map 873, predictive material movement model 860, functional predictive material spill map 868, functional predictive material spill control zone map 871, predictive material spill model 861, the zones generated by control zone generator 313, one or more control algorithms implemented by the controllers in the control system 314, and other triggered learning.

The learning trigger criteria can include any of a wide variety of different criteria. Some examples of detecting trigger criteria are discussed with respect to blocks 1042, 1044, 1046, 1048, and 1049. For instance, in some examples, triggered learning can involve recreation of a relationship used to generate a predictive model when a threshold amount of in-situ sensor data are obtained from in-situ sensors 308. In such examples, receipt of an amount of in-situ sensor data from the in-situ sensors 308 that exceeds a threshold triggers or causes the predictive model generator 310 to generate a new predictive model that is used by predictive map generator 312. Thus, as mobile machine 100 continues an operation, receipt of the threshold amount of in-situ sensor data from the in-situ sensors 308 triggers the creation of a new relationship represented by a new predictive material movement model 860 generated by predictive model generator 310 or the creation of a new relationship represented by a new predictive material spill model 861 generated by predictive model generator 310, or both. Further, a new functional predictive material movement map 660, a new functional predictive material movement control zone map 661, or both can be generated using the new predictive material movement model 860. Additionally, or alternatively, a new functional predictive material spill map 868, a new functional predictive material spill control zone map 871, or both can be generated using the new predictive material spill model 861. Block 1042 represents detecting a threshold amount of in-situ sensor data used to trigger creation of a new predictive model.

In other examples, the learning trigger criteria may be based on how much the in-situ sensor data from the in-situ sensors 308 are changing, such as over time or compared to previous values. For example, if variations within the in-situ sensor data (or the relationship between the in-situ sensor data and the information in the one or more information maps 358) are within a selected range or is less than a defined amount, or below a threshold value, then a new predictive model is not generated by the predictive model generator 310. As a result, the predictive map generator 312 does not generate a new functional predictive map (e.g., 870 and/or 868), a new functional predictive control zone map (e.g., 871 and/or 873), or both. However, if variations within the in-situ sensor data are outside of the selected range, are greater than the defined amount, or are above the threshold value, for example, then the predictive model generator 310 generates a new predictive model (e.g., 860 and/or 861) using all or a portion of the newly received in-situ sensor data that the predictive map generator 312 uses to generate a new predictive map (e.g., 870 and/or 868) which can be provided to control zone generator 313 for the creation of a new predictive control zone map (e.g., 871 and/or 873). At block 1044, variations in the in-situ sensor data, such as a magnitude of an amount by which the data exceeds the selected range or a magnitude of the variation of the relationship between the in-situ sensor data and the information in the one or more information maps, can be used as a trigger to cause generation of one or more of a new predictive model (e.g., 860 and/or 861), a new predictive map (e.g., 870 and/or 868), and a new predictive control zone map (e.g., 871 and/or 873). Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 310 switches to a different information map (different from the originally selected information map), then switching to the different information map may trigger re-learning by predictive model generator 310, predictive map generator 312, control zone generator 313, control system 314, or other items. In another example, transitioning of mobile machine 100 to a different topography or to a different control zone may be used as learning trigger criteria as well.

In some instances, operator 360 or user 366 can also edit the functional predictive material map (e.g., 870 and/or 868) or functional predictive control zone map (e.g., 871 and/or 873), or both. The edits can change a value on the functional predictive map, change a size, shape, position, or existence of a control zone on functional predictive control zone map, or both. Block 1046 shows that edited information can be used as learning trigger criteria.

In some instances, it may also be that operator 360 or user 366 observes that automated control of a controllable subsystem 316, is not what the operator or user desires. In such instances, the operator 360 or user 366 may provide a manual adjustment to the controllable subsystem 316 reflecting that the operator 360 or user 366 desires the controllable subsystem 316 to operate in a different way than is being commanded by control system 314. Thus, manual alteration of a setting by the operator 360 or user 366 can cause one or more of predictive model generator 310 to relearn a model, predictive map generator 312 to regenerate a functional predictive map, control zone generator 313 to regenerate one or more control zones on a functional predictive control zone map, and control system 314 to relearn a control algorithm or to perform machine learning on one or more of the controller components 329 through 337 in control system 314 based upon the adjustment by the operator 360 or user 366, as shown in block 1048. Block 1049 represents the use of other triggered learning criteria.

In other examples, relearning may be performed periodically or intermittently based, for example, upon a selected time interval such as a discrete time interval or a variable time interval, as indicated by block 1050.

If relearning is triggered, whether based upon learning trigger criteria or based upon passage of a time interval, as indicated by block 1050, then one or more of the predictive model generator 310, predictive map generator 312, control zone generator 313, and control system 314 performs machine learning to generate a new predictive model, a new predictive map, a new control zone, and a new control algorithm, respectively, based upon the learning trigger criteria. The new predictive model, the new predictive map, the new control zone, and the new control algorithm are generated using any additional data that has been collected since the last learning operation was performed. Performing relearning is indicated by block 1052.

If the operation has not been completed, operation moves from block 1052 to block 1024 such that operation of the mobile machine 100 can be controlled based on the new predictive map, a new control zone, or a new control algorithm.

If the operation has been completed, operation moves from block 1052 to block 1054 where one or more of the functional predictive material movement map 870, functional predictive material movement control zone map 873, predictive material movement model 860, functional predictive material spill map 868, functional predictive material spill control zone map 871, predictive material spill model 861, control zone(s), and control algorithm(s), are store. The functional predictive map(s), functional predictive control zone map(s), predictive model(s), control zone(s), and control algorithm(s) may be stored locally on data store 302 or sent to a remote system using communication system 306 for later use.

The examples herein describe the generation of a predictive model and, in some examples, the generation of a functional predictive map based on the predictive model. The examples described herein are distinguished form other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or at the same worksite at a future time.

The revision of the model in response to new data may employ machine learning methods. Without limitation, machine learning methods may include memory networks, Bayes systems, decisions trees, Cluster Analysis, Eigenvectors, Eigenvalues and Machine Learning, Evolutionary and Genetic Algorithms, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to region or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value (e.g., detected material spill or material movement) varies from a predictive value of the characteristic (e.g., predictive material spill or material movement), such as by a threshold amount. This deviation may only be detected in areas of the field where the slope of the worksite is above a certain level. Thus, the revision to the predictive value is only applied to other areas of the worksite having slope above the certain level. In this simpler example, the predictive characteristic value and slope at the point the deviation occurred and the detected characteristic value and slope at the point the deviation occurred are used to generate a linear equation. The linear equation is used to adjust the predictive characteristic value in unharvested areas of the worksite in the functional predictive map as a function of slope and the predicted characteristic value. This results in a revised functional predictive map in which some values are adjusted while others remain unchanged based on selected criteria, e.g., slope as well as threshold deviation. The revised functional map is then used to generate a revised functional control zone map for controlling the mobile machine.

As an example, without limitation, consider an instance of the paradigm described herein which is parameterized as follows.

One or more maps of the field are obtained, such as one or more of a terrain map, a speed map, a crop moisture map, a fill level map, and another type of map;

In-situ material dynamics sensors the generate sensor data indicative of material dynamics values, such as one or more of material spill characteristic values and material movement characteristic values.

A predictive model generator generates one or more predictive models based on the one or more obtained maps and the in-situ sensor data, such as one or more of a predictive material spill model and a predictive material movement model.

A predictive map generator generates one or more functional predictive maps based on a model generated by the predictive model generator and the one or more obtained maps. For example, the predictive map generator may generate a functional predictive material spill map that maps predictive material spill characteristic values to one or more locations on the worksite based on a predictive material spill model and the one or more obtained maps. In another example, the predictive map generator may generate a functional predictive material movement map that maps predictive material movement characteristic values to one or more locations on the worksite based on a predictive material movement model and the one or more obtained maps.

Control zones, which include machine settings values, can be incorporated into the functional predictive material spill map or the functional predictive material movement map, or both, to generate a functional predictive material spill control zone map or a functional predictive material movement control zone map.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), the operator makes edits to the predictive map(s) or to a control algorithm, or both, a certain (e.g., threshold) amount of time elapses, as well as various other learning trigger criteria. The predictive model(s) are then revised based on the additional in-situ sensor data and the values from the obtained maps. The functional predictive maps or the functional predictive control zone maps, or both, are then revised based on the revised model(s) and the values in the obtained maps.

As another example, without limitation, consider an instance of the paradigm described herein which is parameterized as follows.

In-situ material dynamics sensors generate sensor data indicative of material dynamics values, such as one or more of material spill characteristic values and material movement characteristic values.

Other in-situ sensors generate sensor data indicative of other characteristic values, such as one or more of fill level values, speed values, crop moisture values, and machine orientation values.

A predictive model generator generates one or more predictive models based on the in-situ material dynamics sensor data and the other in-situ sensor data, such as one or more of a predictive material spill model and a predictive material movement model.

One or more maps of the field are obtained, such as one or more of a terrain map, a speed map, a crop moisture map, a fill level map, and another type of map.

A predictive map generator generates one or more functional predictive maps based on a model generated by the predictive model generator and the one or more obtained maps. For example, the predictive map generator may generate a functional predictive material spill map that maps predictive material spill characteristic values to one or more locations on the worksite based on a predictive material spill model and the one or more obtained maps. In another example, the predictive map generator may generate a functional predictive material movement map that maps predictive material movement characteristic values to one or more locations on the worksite based on a predictive material movement model and the one or more obtained maps.

Control zones, which include machine settings values, can be incorporated into the functional predictive material spill map or the functional predictive material movement map, or both, to generate a functional predictive material spill control zone map or a functional predictive material movement control zone map.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), the operator makes edits to the predictive map(s) or to a control algorithm, or both, a certain (e.g., threshold) amount of time elapses, as well as various other learning trigger criteria. The predictive model(s) are then revised based on the additional in-situ sensor data. The functional predictive maps or the functional predictive control zone maps, or both, are then revised based on the revised model(s) and the values in the obtained maps.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic and interactions. It will be appreciated that any or all of such systems, components, logic and interactions may be implemented by hardware items, such as processors, memory, or other processing components, some of which are described below, that perform the functions associated with those systems, components, or logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 12:
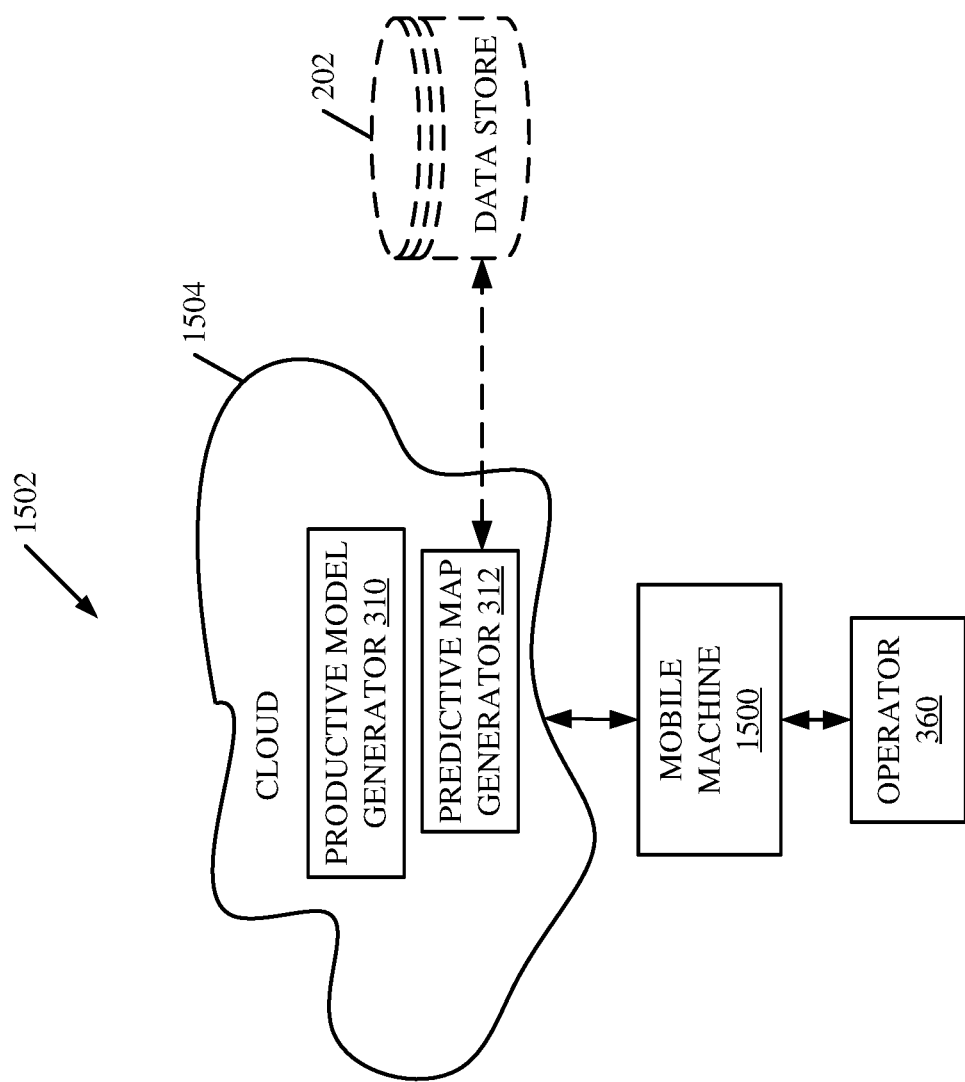
FIG. 12 is a block diagram showing one example of a mobile machine in communication with a remote server environment.

FIG. 12 is a block diagram of mobile machine 1500, which may be similar to mobile machine 100 shown in FIG. 3. The mobile machine 1500 communicates with elements in a remote server architecture 1502. In some examples, remote server architecture 1502 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 3 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 12, some items are similar to those shown in FIG. 3 and those items are similarly numbered. FIG. 12 specifically shows that predictive model generator 310 or predictive map generator 312, or both, may be located at a server location 1504 that is remote from the agricultural harvester 1500. Therefore, in the example shown in FIG. 12, agricultural harvester 1500 accesses systems through remote server location 1504. In other examples, various other items may also be located at server location 1504, such as data store 302, map selector 309, predictive model 311, functional predictive maps 263 (including predictive maps 264 and predictive control zone maps 265), control zone generator 313, control system 314, and processing system 338.

FIG. 12 also depicts another example of a remote server architecture. FIG. 12 shows that some elements of FIG. 3 may be disposed at a remote server location 1504 while others may be located elsewhere. By way of example, data store 302 may be disposed at a location separate from location 1504 and accessed via the remote server at location 1504. Regardless of where the elements are located, the elements can be accessed directly by mobile machine 1500 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the mobile machine 1500 comes close to the machine containing the information collection system, such as a fuel truck prior to fueling, the information collection system collects the information from the mobile machine 1500 using any type of ad-hoc wireless connection. The collected information may then be forwarded to another network when the machine containing the received information reaches a location where wireless telecommunication service coverage or other wireless coverage—is available. For instance, a fuel truck may enter an area having wireless communication coverage when traveling to a location to fuel other machines or when at a main fuel storage location. All of these architectures are contemplated herein. Further, the information may be stored on the mobile machine 1500 until the mobile machine 1500 enters an area having wireless communication coverage. The mobile machine 1500, itself, may send the information to another network.

It will also be noted that the elements of FIG. 3, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 1002 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 13:
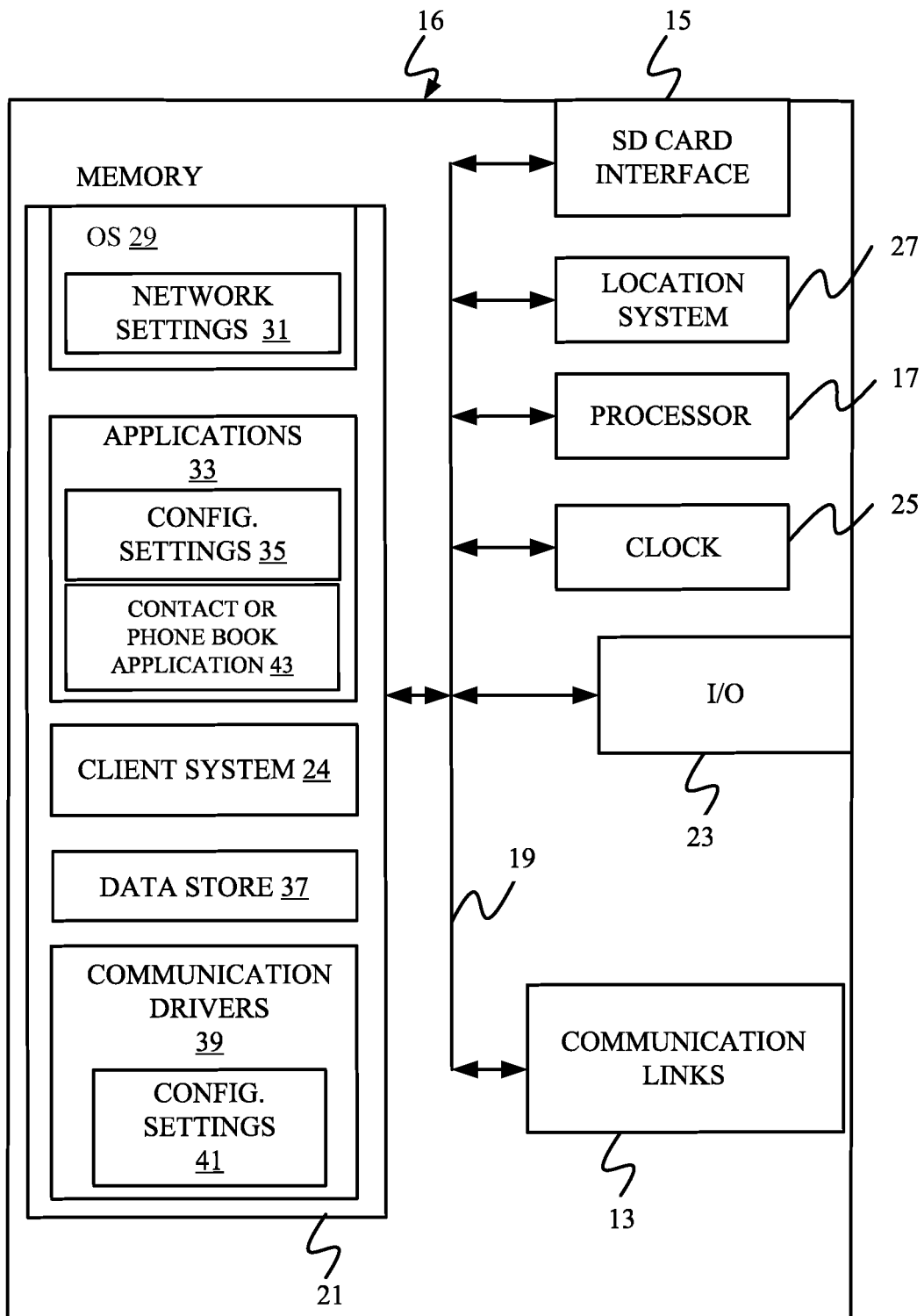
FIGS. 13-15 show examples of mobile devices that can be used in a mobile machine.
Figure 14:
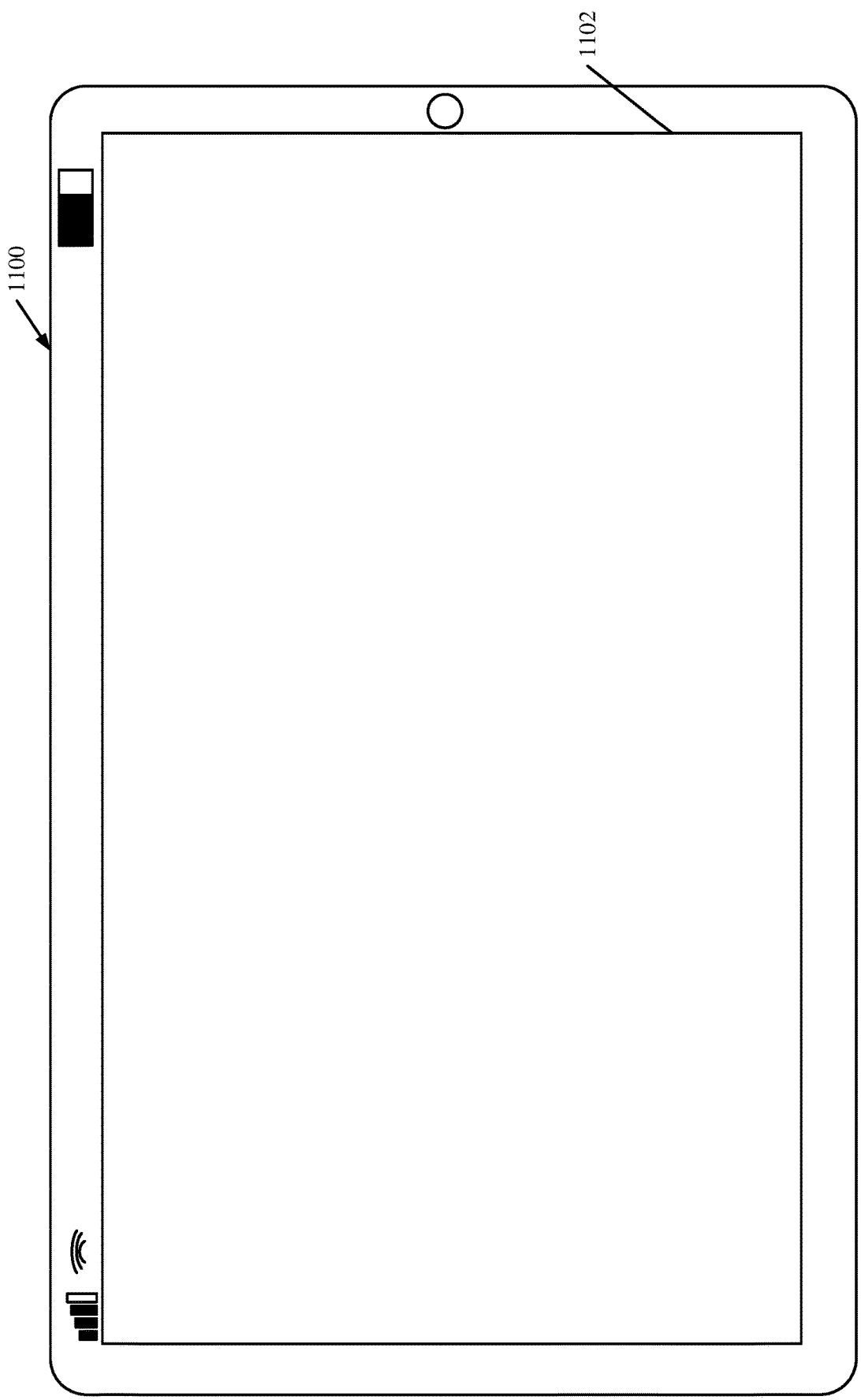
Figure 15:
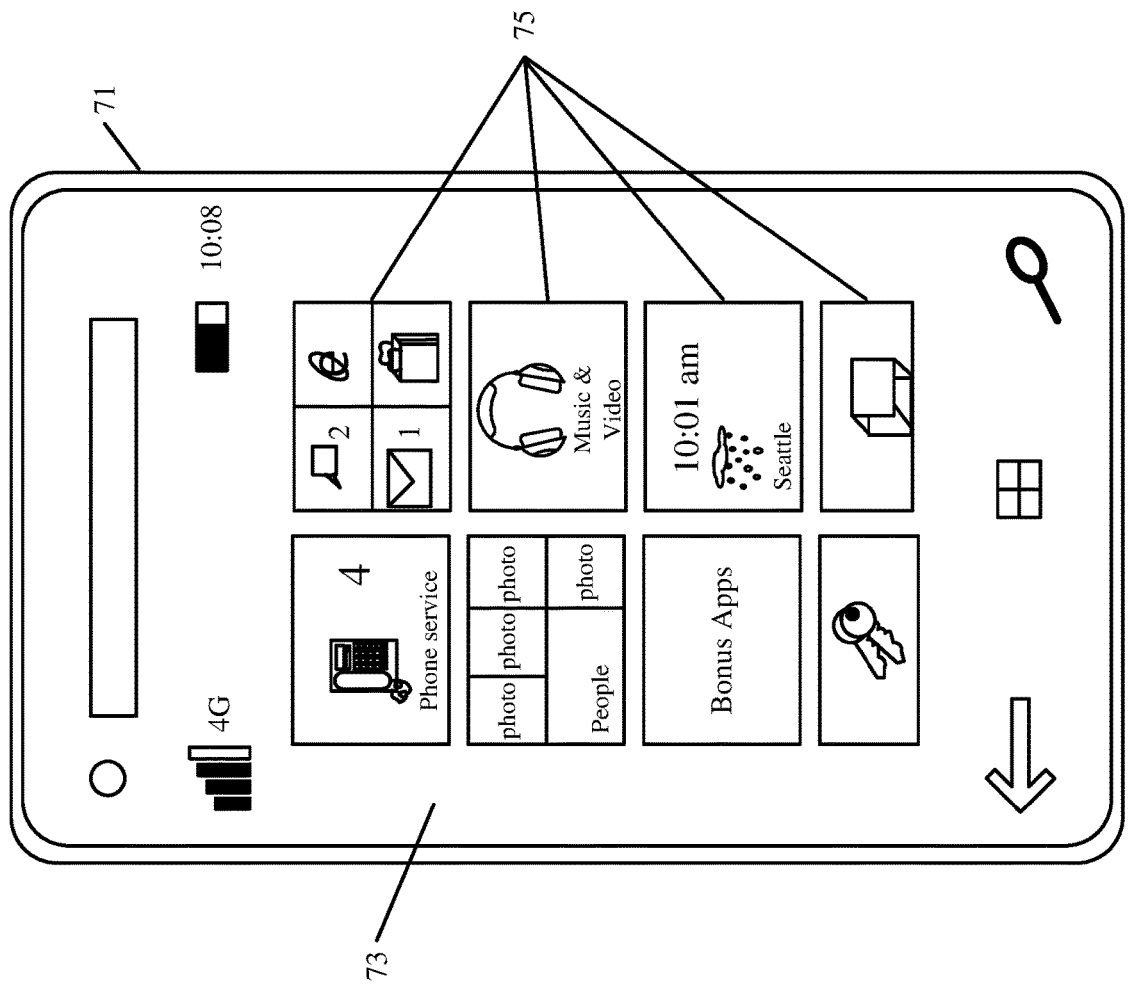

FIG. 13 is a simplified block diagram of one illustrative example of a handheld or mobile computing device that can be used as a user's or client's hand held device 16, in which the present system (or parts of it) can be deployed. For instance, a mobile device can be deployed in the operator compartment of mobile machine 100 for use in generating, processing, or displaying the maps discussed above. FIGS. 14-15 are examples of handheld or mobile devices.

FIG. 13 provides a general block diagram of the components of a client device 16 that can run some components shown in FIG. 3, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 14 shows one example in which device 16 is a tablet computer 1100. In FIG. 14, computer 1100 is shown with user interface display screen 1102. Screen 1102 can be a touch screen or a pen-enabled interface that receives inputs from a pen or stylus. Tablet computer 1100 may also use an on-screen virtual keyboard. Of course, computer 1100 might also be attached to a keyboard or other user input device through a suitable attachment mechanism, such as a wireless link or USB port, for instance. Computer 1100 may also illustratively receive voice inputs as well.

FIG. 15 is similar to FIG. 14 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 16:
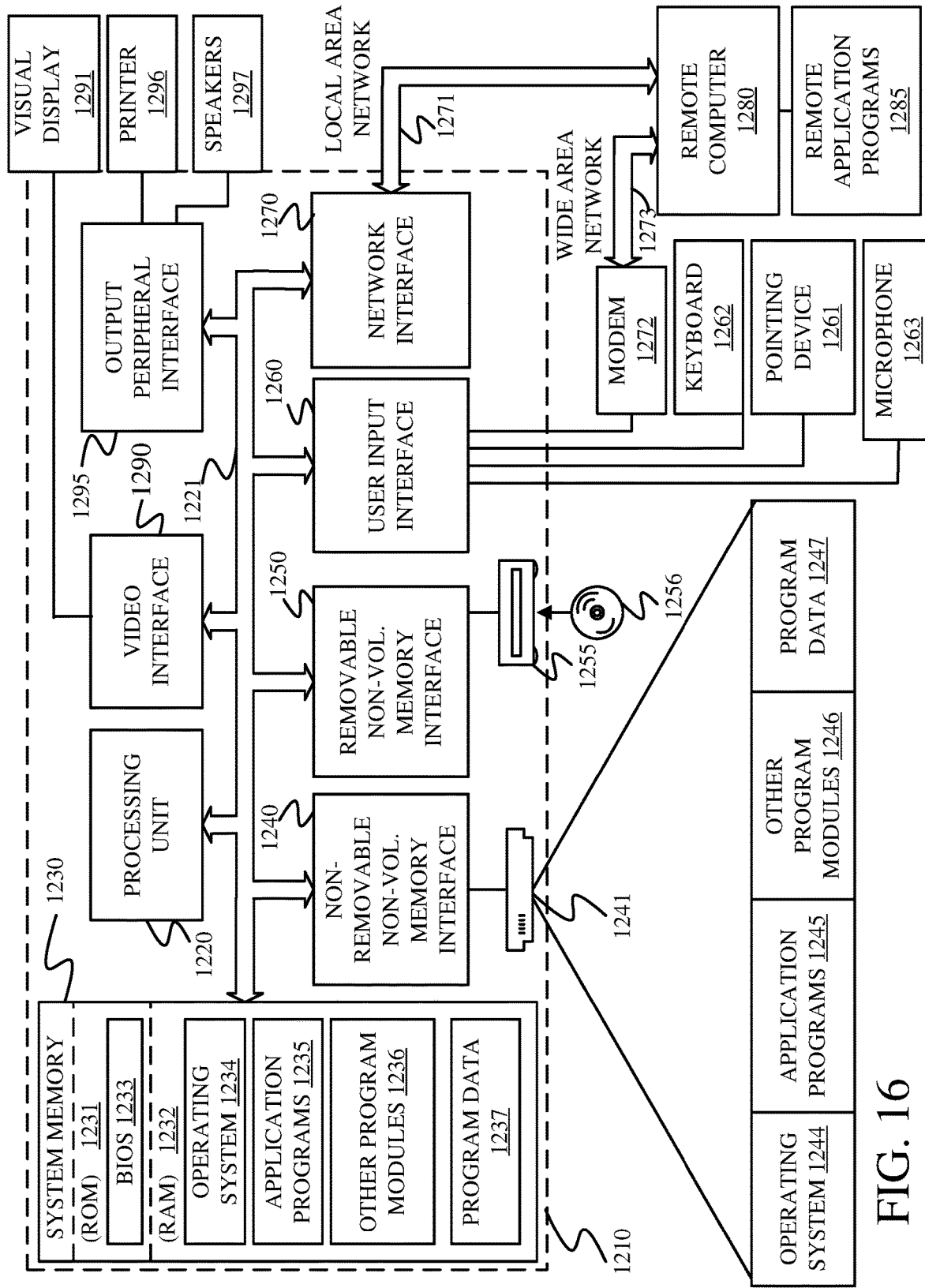
FIG. 16 is a block diagram showing one example of a computing environment that can be used in a mobile machine.

FIG. 16 is one example of a computing environment in which elements of FIG. 3 can be deployed. With reference to FIG. 16, an example system for implementing some embodiments includes a computing device in the form of a computer 1210 programmed to operate as discussed above. Components of computer 1210 may include, but are not limited to, a processing unit 1220 (which can comprise processors or servers from previous FIGS.), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. Memory and programs described with respect to FIG. 3 can be deployed in corresponding portions of FIG. 16.

Computer 1210 typically includes a variety of computer readable media. Computer readable media may be any available media that can be accessed by computer 1210 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1210. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1230 includes computer storage media in the form of volatile and/or nonvolatile memory or both such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data or program modules or both that are immediately accessible to and/or presently being operated on by processing unit 1220. By way of example, and not limitation, FIG. 16 illustrates operating system 1234, application programs 1235, other program modules 1236, and program data 1237.

The computer 1210 may also include other removable/non-removable volatile/nonvolatile computer storage media. By way of example only, FIG. 16 illustrates a hard disk drive 1241 that reads from or writes to non-removable, nonvolatile magnetic media, an optical disk drive 1255, and nonvolatile optical disk 1256. The hard disk drive 1241 is typically connected to the system bus 1221 through a non-removable memory interface such as interface 1240, and optical disk drive 1255 are typically connected to the system bus 1221 by a removable memory interface, such as interface 1250.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 1210. In FIG. 16, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237.

A user may enter commands and information into the computer 1210 through input devices such as a keyboard 1262, a microphone 1263, and a pointing device 1261, such as a mouse, trackball or touch pad. Other input devices (not shown) may include a joystick, game pad, satellite dish, scanner, or the like. These and other input devices are often connected to the processing unit through a user input interface 1260 that is coupled to the system bus, but may be connected by other interface and bus structures. A visual display 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 is operated in a networked environment using logical connections (such as a controller area network—CAN, local area network—LAN, or wide area network WAN) to one or more remote computers, such as a remote computer 1280.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. In a networked environment, program modules may be stored in a remote memory storage device. FIG. 16 illustrates, for example, that remote application programs 1285 can reside on remote computer 1280.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:
    an in-situ sensor that detects a machine speed characteristic value corresponding to a geographic location;
    a material spill sensor that detects a sensor value of a material spill corresponding to a grain tank of an agricultural harvesting machine, wherein
        the grain tank is configured to store grain,
        a transfer subsystem of the agricultural harvesting machine is configured to selectively transfer the grain, stored in the grain tank, to a location external to the agricultural harvesting machine, and
        the material spill characteristic represents spillage of at least a portion of the grain out of the grain tank;
    a predictive model generator that:
        identifies a relationship between machine speed characteristic values and values of the material spill characteristic based on the sensor value of the material spill characteristic detected by the material spill sensor corresponding to the geographic location and the detected machine speed characteristic value corresponding to the geographic location; and
        generates a predictive material dynamics model that models the relationship between the machine speed characteristic values and the values of the material spill characteristic based on the machine speed characteristic value detected by the in-situ sensor and the sensor value of the material spill characteristic detected by the material spill sensor, wherein the predictive material dynamics model receives an input machine speed characteristic value as a model input and generates a material spill characteristic value as a model output based on the relationship; and
    a control system that generates control signals to control a controllable subsystem of the agricultural harvesting machine based on the predictive material dynamics model.

2. The agricultural system of claim 1, wherein the in-situ sensor comprises a first in-situ sensor, and further comprising a second in-situ sensor that detects a machine orientation characteristic value corresponding to the geographic location, and wherein the predictive model generator is configured to identify a second relationship between machine orientation characteristic values and the values of the material spill characteristic based on the sensor value of the material spill characteristic detected by the material spill sensor corresponding to the geographic location and the detected machine orientation characteristic value corresponding to the geographic location, the predictive material dynamics model being configured to receive an input machine orientation characteristic value as a model input and generate a material spill characteristic value as a model output based on the second relationship.

3. The agricultural system of claim 1, wherein the in-situ sensor comprises a first in-situ sensor, and further comprising a second in-situ sensor that detects a crop moisture value corresponding to the geographic location, and wherein the predictive model generator is configured to identify a second relationship between crop moisture values and the values of the material spill characteristic based on the sensor value of the material spill characteristic detected by the material spill sensor corresponding to the geographic location and the detected crop moisture value corresponding to the geographic location, the predictive material dynamics model being configured to receive an input crop moisture value as a model input and generate a material spill characteristic value as a model output based on the second relationship.

4. The agricultural system of claim 1, wherein the in-situ sensor comprises a first in-situ sensor, and further comprising a second in-situ sensor that detects a material mass value corresponding to the geographic location, and wherein the predictive model generator is configured to identify a second relationship between material mass values and the values of the material spill characteristic based on the sensor value of the material spill characteristic detected by the material spill sensor corresponding to the geographic location and the detected material mass value corresponding to the geographic location, the predictive material dynamics model being configured to receive an input material mass value as a model input and generate a material spill characteristic value as a model output based on the second relationship.

5. The agricultural system of claim 1, wherein the in-situ sensor comprises a first in-situ sensor, and further comprising a second in-situ sensor that detects a material center of mass value corresponding to the geographic location, and wherein the predictive model generator is configured to identify a second relationship between material center of mass values and the values of the material spill characteristic based on the sensor value of the material spill characteristic detected by the material spill sensor corresponding to the geographic location and the material center of mass value corresponding to the geographic location, the predictive material dynamics model being configured to receive an input material center of mass value as a model input and generate a material spill characteristic value as a model output based on the second relationship.

6. The agricultural system of claim 1, wherein the in-situ sensor comprises a first in-situ sensor, and further comprising a second in-situ sensor that detects a fill level value corresponding to the geographic location, and wherein the predictive model generator is configured to identify a second relationship between fill level values and the values of the material spill characteristic based on the sensor value of the material spill characteristic detected by the material spill sensor corresponding to the geographic location and the detected fill level value corresponding to the geographic location, the predictive material dynamics model being configured to receive an input fill level value as a model input and generate a material spill characteristic value as a model output based on the second relationship.

7. The agricultural system of claim 1, wherein the in-situ sensor comprises a first in-situ sensor, and further comprising one or more of:
a machine orientation sensor that detects a machine orientation characteristic value corresponding to the geographic location;
a crop moisture sensor that detects, a crop moisture value corresponding to the geographic location;
a material mass value sensor that detects a material mass value corresponding to the geographic location;
a material center of mass sensor that detects
a material center of mass value corresponding to the geographic location; or a fill level sensor that detects a fill level value corresponding to the geographic location; and
wherein the predictive model generator is configured to identify a relationship between one or more of machine orientation characteristic values, crop moisture values, material mass values, material center of mass values, and fill level values and material spill characteristic values based on the sensor value of the material spill characteristic detected by the material spill sensor corresponding to the geographic location and one or more values detected by the one or more of a machine orientation sensor, a crop moisture sensor, a material mass sensor, a material center of mass sensor, or a fill level sensor.

8. The agricultural system of claim 1 and further comprising:
a predictive map generator configured to:
obtain an information map that includes values of machine speed corresponding to different geographic locations in a worksite; and
generate a predictive material dynamics map of the worksite that maps predictive values of the material spill characteristic to the different geographic locations in the worksite based on the values of machine speed in the information map and based on the predictive material dynamics model.

9. The agricultural system of claim 1, wherein the material spill sensor comprises an imaging sensor configured to generate image data representing presence of the grain outside of the grain tank.

10. The agricultural system of claim 1, wherein the grain tank is open to an environment external to the agricultural harvesting machine, and the agricultural harvesting machine is configured to temporarily store the grain in the grain tank during a loading phase and to transfer the grain from the grain tank during an unloading phase.

11. The agricultural system of claim 1, wherein
the sensor value corresponds to a first geographic location,
the in-situ sensor is configured to detect a second machine speed characteristic value of the corresponding to a second geographic location, and
the predictive material dynamics model is configured to receive an indication of the second sensor value as a model input and to generate a predicted material spill characteristic, as a model output, based on the machine speed characteristic value.

12. A computer implemented method of generating a predictive material dynamics model, the computer implemented method comprising:
detecting, with an in-situ sensor, a material mass value of a material mass corresponding to a geographic location;
detecting, with a material spill sensor, a sensor value of a material spill corresponding to a grain tank of an agricultural harvesting machine, wherein the grain tank is configured to store grain, and the material spill characteristic represents spillage of at least a portion of the grain out of the grain tank;

identifying a relationship between material mass values and values of the material spill characteristic based on the sensor value of the material spill characteristic detected by the material spill sensor corresponding to the geographic location and the detected material mass value corresponding to the geographic location;

generating the predictive material dynamics model that models the relationship between the material mass values and the values of the material spill characteristic based on the material mass value detected by the in-situ sensor and the sensor value of the material spill characteristic detected by the material spill sensor, wherein the predictive material dynamics model receives an input material mass value as a model input and generates a material spill characteristic value as a model output based on the relationship; and generating a control signal to control a controllable subsystem of the agricultural harvesting machine based on the predictive material dynamics model.

13. An agricultural system comprising:

an in-situ sensor that detects a first sensor value of a characteristic;

an imaging sensor that generates image data representing presence of grain outside of a grain tank of an agricultural harvesting machine, wherein
the grain tank is configured to store grain, and
a transfer subsystem of the agricultural harvesting machine is configured to selectively transfer the grain, stored in the grain tank, to a location external to the agricultural harvesting machine;

a predictive model generator that generates a predictive material dynamics model that models a relationship between values of the characteristic and values of a material spill characteristic representing spillage of at least a portion of the grain out of the grain tank, wherein the relationship is based on the first sensor value of the characteristic detected by the in-situ sensor and the image data representing presence of grain outside of the grain tank; and a control system that generates control signals to control a controllable subsystem of the agricultural harvesting machine based on the predictive material dynamics model.

* * * * *